US011694724B2

(12) United States Patent
Walecka et al.

(10) Patent No.: US 11,694,724 B2
(45) Date of Patent: Jul. 4, 2023

(54) GESTURE-ENABLED INTERFACES, SYSTEMS, METHODS, AND APPLICATIONS FOR GENERATING DIGITAL MUSIC COMPOSITIONS

(71) Applicant: MusicSketch, LLC, Atherton, CA (US)

(72) Inventors: John Lawrence Walecka, Atherton, CA (US); John Edward Walecka, San Francisco, CA (US); Aleksey Novicov, Palo Alto, CA (US); Michael Dewey Burks, Menlo Park, CA (US); Pablo Castellanos Macin, Mexico City (MX)

(73) Assignee: MusicSketch, LLC, Atherton, CA (US)

( * ) Notice: Subject to any disclaimer, the term of this patent is extended or adjusted under 35 U.S.C. 154(b) by 0 days.

(21) Appl. No.: 17/866,969

(22) Filed: Jul. 18, 2022

(65) Prior Publication Data

US 2023/0013536 A1 Jan. 19, 2023

Related U.S. Application Data

(60) Provisional application No. 63/319,201, filed on Mar. 11, 2022, provisional application No. 63/223,211, filed on Jul. 19, 2021.

(51) Int. Cl.
*G06F 3/048* (2013.01)
*G11B 27/031* (2006.01)
(Continued)

(52) U.S. Cl.
CPC ............ *G11B 27/031* (2013.01); *G06F 3/044* (2013.01); *G06F 3/0488* (2013.01)

(58) Field of Classification Search
CPC ...... G11B 27/031; G06F 3/044; G06F 3/0488
See application file for complete search history.

(56) References Cited

U.S. PATENT DOCUMENTS 6,810,272 B2 * 10/2004 Kraft ...................... G06F 3/018
345/157
7,608,775 B1 * 10/2009 Evans ................. G10H 1/0008
84/611

(Continued)

OTHER PUBLICATIONS

ForScore, retrieved from the Internet, Aug. 12, 2022, URL <https://forscore.co/>, 5 pages.

(Continued)

*Primary Examiner* — Aleksey Olshannikov
(74) *Attorney, Agent, or Firm* — Bryan Cave Leighton Paisner LLP

(57) ABSTRACT

This disclosure is directed to systems, methods, apparatuses, and techniques that utilize enhanced gesture-based input mechanisms to facilitate rapid creation and editing of digital music compositions. These technologies can be specially designed and configured to optimize creation, editing, and/or sharing of digital music compositions on mobile electronic devices that include capacitive sensing mechanisms. The technologies include multi-gesture functionalities that enable users to view and access various notation customization features in a compact space of a mobile device display. Additionally, the technologies encompass improved data storage models that enable underlying notation data to be accessed in multiple operational modes, and permit frequencies or pitches of notations to be accurately generated and incorporated into audio signals.

16 Claims, 42 Drawing Sheets

(51) Int. Cl.
*G06F 3/044* (2006.01)
*G06F 3/0488* (2022.01)

(56) References Cited

U.S. PATENT DOCUMENTS

| | | | |
|---|---|---|---|
| 8,692,099 | B2 | 4/2014 | Sitrick |
| 8,921,677 | B1 | 12/2014 | Severino |
| 9,093,055 | B2 | 7/2015 | Daisy |
| 9,183,755 | B2 | 10/2015 | Shi |
| 10,657,934 | B1 | 5/2020 | Kolen et al. |
| 2007/0221043 | A1 | 9/2007 | Hao |
| 2013/0133506 | A1* | 5/2013 | Daisy ............... G09B 15/00 84/483.2 |
| 2014/0041512 | A1* | 2/2014 | Mastran ............ G09B 15/023 84/483.2 |
| 2014/0069262 | A1 | 3/2014 | Cheever et al. |
| 2015/0095822 | A1 | 4/2015 | Feis et al. |

OTHER PUBLICATIONS

Noteflight—Online Music Notation Software, retrieved from the Internet, Aug. 2, 2022, URL <https://www.noteflight.com/>, 1 page.
Maestro—Music Composer—Apps on Google Play, retrieved from the Internet, Aug. 12, 2022, URL <https://play.google.com/store/apps/details?id=com.futuresculptor.maestro&hl=en_US&gl=US>, 5 pages.
Score Creator write music—Apps on Google Play, retrieved from the Internet, Aug. 12, 2022, URL <https://play.google.com/store/apps/details?id=com.sc.scorecreator&hl=en_US&gl=US>, 4 pages.
Music Writer—Music Composer—Apps on Google Play, retrieved from the Internet, Aug. 12, 2022, URL <https://play.google.com/store/apps/details?id=com.musicappdevs.musicwriter&hl=en_US&gl=US>, 5 pages.
A-Score Music Composer—Apps on Google Play, retrieved from the Internet, Aug. 12, 2022, URL <https://play.google.com/store/apps/details?id=com.philblandford.ascore&hl=en_US&gl=US>, 4 pages.
Ensemble Composer—Apps on Google Play, retrieved from the Internet, Aug. 12, 2022, URL <https://play.google.com/store/apps/details?id=com.lotuz.musiccomposer&hl=en_US&gl=US>, 4 pages.
WriteMusic—Make music notation easy & fun—Apps on Google Play, retrieved from the Internet, Aug. 12, 2022, URL <https://play.google.com/store/apps/details?id=com.iwritemusicapp.iwritemusic_android&hl=en_US&gl=US>, 4 pages.
Notation Pad—Sheet Music Score Composer—Apps on Google Play, retrieved from the Internet, Aug. 12, 2022, URL <https://play.google.com/store/apps/details?id=com.lotuz.NotationPad&hl=en_US&gl=US>, 4 pages.
Symphony Pro 6, retrieved from the Internet, Aug. 12, 2022, URL <https://symphonypro.net/static/v5_release/sp5/index.html>, 14 pages.
Musical Note Pad Free—Apps on Google Play, retrieved from the Internet, Aug. 12, 2022, URL <https://play google.com/store/apps/details?id=org.emzi.musicalnotepad.main&hl=en>, 4 pages.
Staffpad—Make beautiful music, retrieved from the Internet, Aug. 12, 2022, URL <https://www.staffpad.net/>, 23 pages.
Notion on the App Store, retrieved from the Internet, Aug. 12, 2022, URL <https://apps.apple.com/us/app/notion/id475820434>, 3 pages.
Online collaborative music notion software—Flat, retrieved from the Internet, Aug. 12, 2022, URL <https://flat.io>, 17 pages.
MusicSML for Exchanging Digital Sheet Music, retrieved from the Internet, Aug. 12, 2022, URL <https://www.musicxml.com>, 1 page.

* cited by examiner

GESTURE-ENABLED INTERFACES, SYSTEMS, METHODS, AND APPLICATIONS FOR GENERATING DIGITAL MUSIC COMPOSITIONS

CROSS-REFERENCE TO RELATED APPLICATIONS

This application claims benefit of, and priority to, U.S. Provisional Application No. 63/223,211 filed on Jul. 19, 2021 and U.S. Provisional Application No. 63/319,201 filed on Mar. 11, 2022. The contents of the aforementioned applications is herein incorporated by reference in their entireties.

TECHNICAL FIELD

This disclosure is related to music composition applications, platforms, systems, methods, and computer program products. In certain embodiments, the technologies described herein can include enhanced gesture-based functionalities and features that enable digital music compositions to be rapidly created and/or edited in an intuitive manner. In some embodiments, these technologies can be optimized for usage on mobile electronic devices having capacitive sensing mechanisms to facilitate rapid definition of digital music compositions.

BACKGROUND

Effectively implementing a music composition application that enables the creation and playback of digital music compositions can be a complex and technically challenging task. This complexity can be attributed, at least in part, to the large quantity and variation of notations that can be used to convey desired music compositions. For example, in addition to specifying notes, each note can be varied in numerous ways (e.g., by varying note heads, note stems, note flags, accidentals, etc.). Many other notations (e.g., rests, clefs, chords, triplets, beaming, time signatures/meters, etc.) also must be accounted for along with all possible variations of these notations. Thus, providing a music composition application that facilitates rapid generation of digital music compositions while accounting for these voluminous notation variations can be technically challenging.

Most existing music composition applications were originally designed for use on desktop computing devices. To the extent that some of these desktop composition applications have been extended to mobile devices, creating or editing music compositions with these applications is difficult, time-consuming, and requires in-depth knowledge of the underlying software. One cause for these difficulties stems from the music composition applications originally being designed with interfaces and notation selection functions that accommodate desktop computers, which are typically connected to large display monitors, mouse devices, and keyboard devices. Simply extending these desktop compositions applications to a mobile device environment is not adequate given the relatively small displays of mobile electronic devices (e.g., smart phones) and the input mechanisms (e.g., touchscreens) that these devices use to receive selections.

The smaller display screens and input mechanisms typically utilized by mobile electronic devices make it difficult to present options for precisely selecting and defining the voluminous notation variations typically utilized to compose music compositions. For example, many music desktop composition applications require users to navigate through a hierarchy of menus, interfaces, and options to precisely input accurate information that reflects desired notation types (e.g., to incorporate appropriate note heads, flags, and stems, rests, time signatures, and/or other notations). Simply resizing a desktop music composition application of this nature to fit a smaller mobile device display exacerbates the difficulty of composing, and significantly increases the time required to create music compositions (e.g., by requiring such navigation and selections to be made via a touchscreen device with a relatively small display).

While it may be tedious and undesirable to navigate through various menus, interfaces, and menus to customize music notations even on desktop computing devices, such many be tolerable on desktop computing devices that are connected to large displays, as well as input devices such as mouse devices and keyboards. However, the difficulties are worsened on mobile electronic devices to point where a feasibility threshold is breached, which makes in impractical or unfeasible to compose music compositions on mobile electronic devices. For these and other reasons, existing music compositions do not provide an adequate framework for creating and editing music compositions in a mobile environment.

BRIEF DESCRIPTION OF DRAWINGS

To facilitate further description of the embodiments, the following drawings are provided, in which like references are intended to refer to like or corresponding parts, and in which.

Figure 1A:
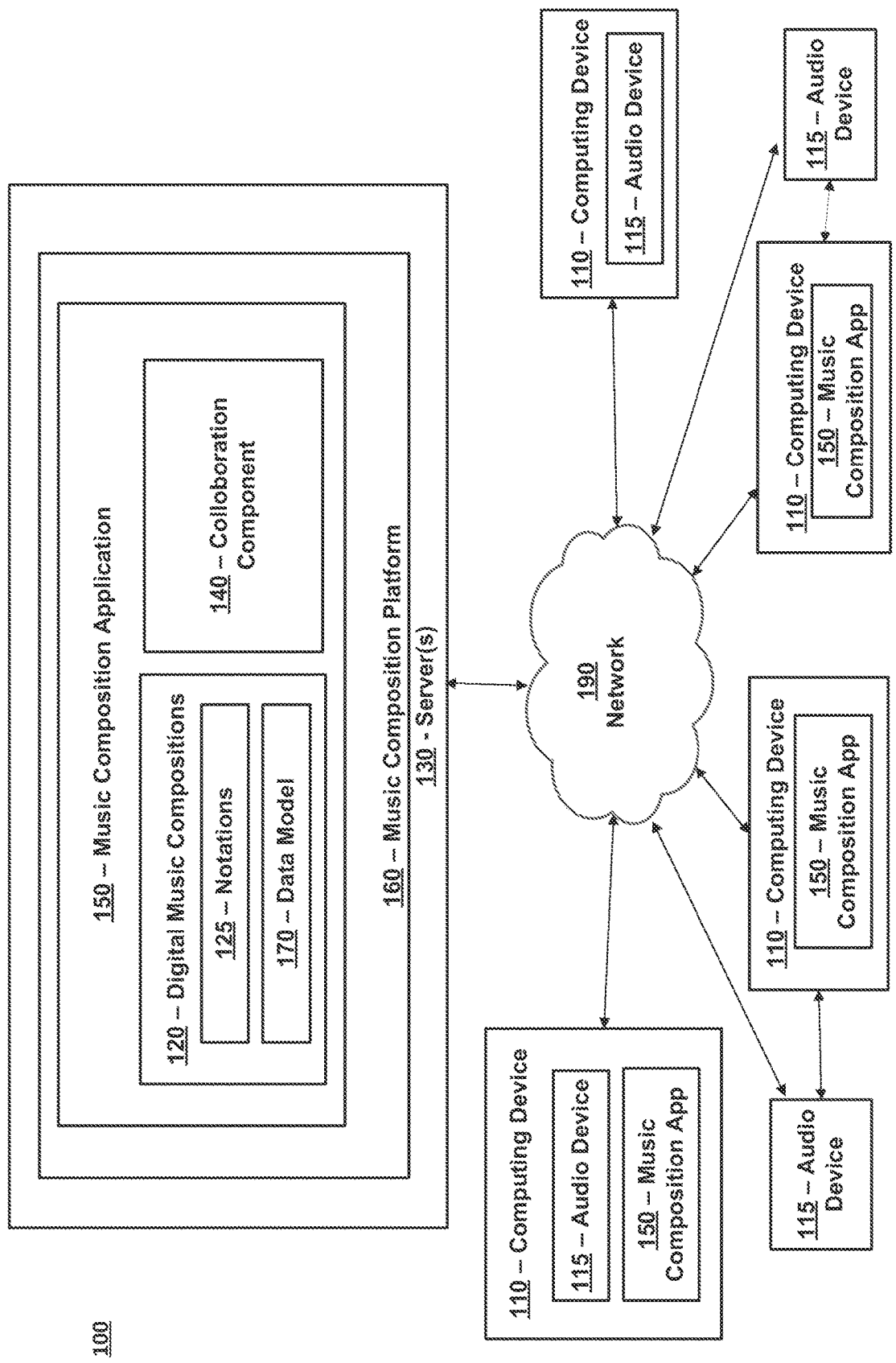
FIG. 1A is a block diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION OF EXEMPLARY EMBODIMENTS

The present disclosure relates to systems, methods, apparatuses, and techniques for providing improved music composition applications. In certain embodiments, the music composition applications can be specially designed and configured to optimize creation, editing, and/or sharing of music compositions on mobile electronic devices. The functionalities and interfaces provided by the music composition applications facilitate rapid creation and/or editing of digital music compositions in mobile environments. These functionalities and interfaces also can be beneficial for creating digital music compositions in desktop environments and/or other computing environments.

As explained in further detail below, the music composition applications can present specially configured interfaces that present notation selection options in a compact and intuitive manner, thereby occupying minimal space on a display screen and enabling users to quickly learn and utilize the music composition applications. Additionally, the music composition applications can be further optimized by configuring the music composition applications to detect various gestures (e.g., tap, tap and hold, swipe, scroll, and/or other gestures) that facilitate rapid entry and customization of notations via touch screen input devices.

In certain embodiments, the music composition applications can be configured to compose digital music compositions in multiple operational modes including, but not limited to, a direct input board (DIBO) operational mode and a keyboard operational mode. In the DIBO operational mode, the music composition applications can allow inputs (e.g. gestures) to be received via an input staff interface for creating and/or editing a digital music composition. The input staff interface directly integrates note selection options onto lines and spaces of a musical staff or stave, thereby permitting users to visualize and select (e.g., using various gestures) the exact note that will be added to a digital music composition and where the note will appear on a staff of the music composition. Additionally, this interface compacts the presentation of various note selection options in manner that is particularly advantageous for electronic mobile devices.

In certain embodiments, the digital music compositions can present an output staff interface that displays a measure of a digital music composition that is currently being created or edited. In certain embodiments, the output staff interface includes lines and spaces that correspond directly to the lines and spaces included on the input staff interface, thereby enabling users to rapidly add notations to the output staff interface by selecting the note selection options incorporated into corresponding lines and spaces of the input staff. The output staff interface can be interactive to permit users to select notations for editing and/or modification.

The input staff interface also can include a ledger line extender feature that enables users to access additional notes above and below those that are originally displayed on the input staff interface. The ledger line extender feature can be activated in response to an input (e.g., a tap gesture) being received on one or more ledger line extender options located adjacent to the input staff. Activation of the ledger line extender feature can permit users to scroll (e.g., using a scroll or swipe gesture) to desired notes located above and below those which are originally displayed on the input staff. Additional note selection options can be presented on the lines and spaces located above and below the input staff to permit users to quickly access and select notes in octaves above and below the input staff Additionally, the ledger line extender feature can present the lines, spaces, and note selection options in an accordion-like manner on a display device. For example, the accordion-like functionality of the ledger line extender feature can cause the lines, spaces, and note selection options on a portion of the input staff to expand, while simultaneously causing the lines, spaces, and note selection options on another portion of the input staff to contract or condense. In doing so, the ledger line extender feature compactly displays and presents the lines, spaces, and note selection options on a fixed size space of a touch screen display (or other display), which can be particularly advantageous in scenarios where the music composition applications are being executed by mobile electronic devices and/or other computing devices.

In the keyboard operational mode, a digital keyboard may be displayed and users can create and/or edit digital music compositions by selecting digital keys included on a digital keyboard. The music composition applications can provide other operational modes as well, and users can switch between the various operational modes to create and edit digital music compositions.

The music composition applications can utilize a data model that enables the storage of staff notations in a useful format that permits the notations to be accessed and compatible across various operational modes (e.g., such as the DIBO operational mode and keyboard operational mode). Additionally, the data model can store information that is used to determine how staff notes are displayed, and rules to determine appropriate pitches that are to be output when the staff notes are played back. Separating the data used to determine how a staff note is displayed from particular sounds of the staff note enables the underlying music composition data to be used across multiple operational modes and permits the music composition applications to precisely output accurate pitches in all operational modes. Further details of exemplary data models are described in further detail below.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
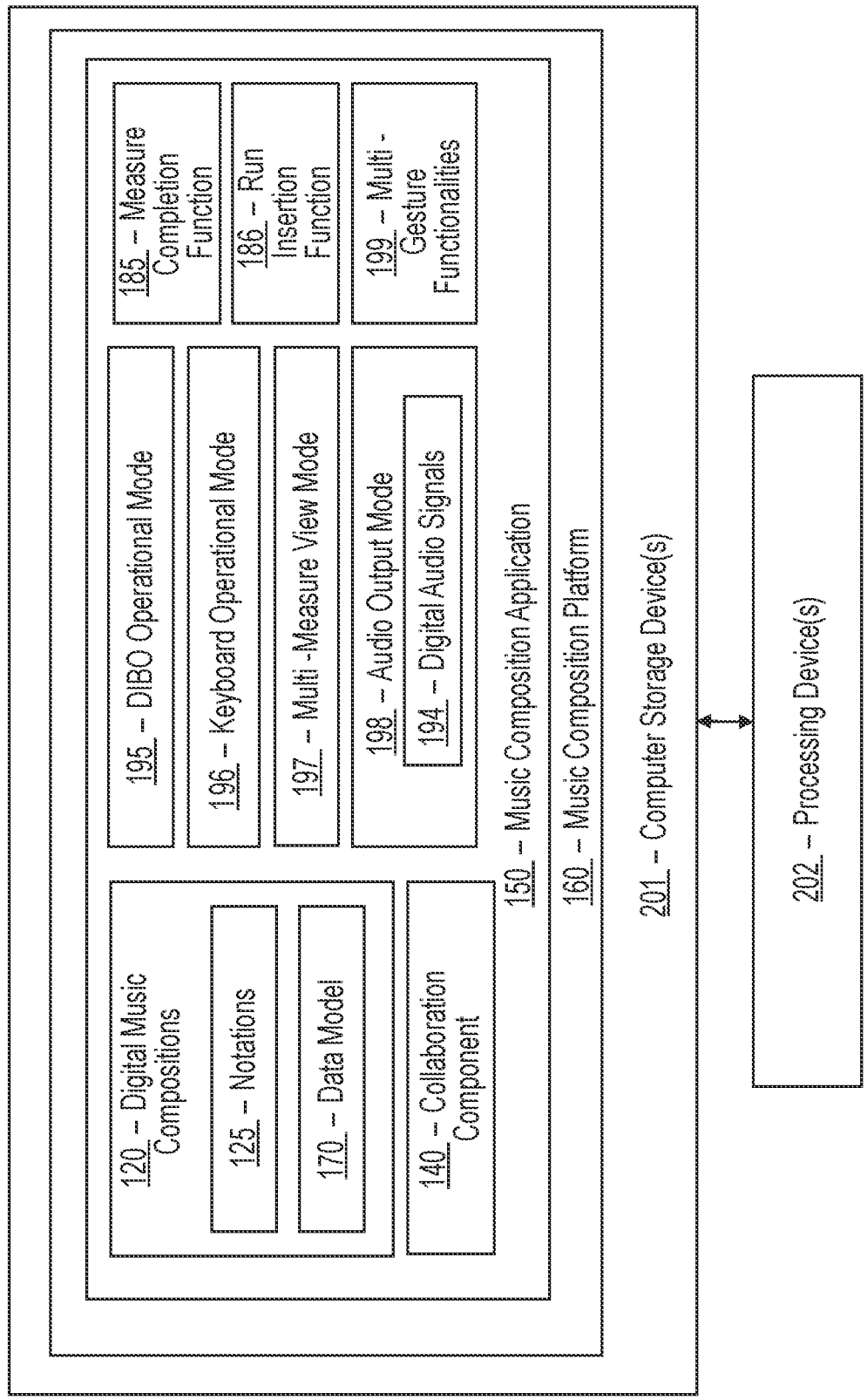
FIG. 1B is a block diagram illustrating exemplary features of a music composition platform in accordance with certain embodiments.

FIG. 1A is a block diagram of an exemplary system 100 according to certain embodiments. FIG. 1B is a block diagram illustrating exemplary features of a music composition platform in accordance with certain embodiments.

The system 100 comprises one or more computing devices 110 and one or more servers 130 that are in communication over a network 190. Each of the computing devices 110 can store and execute a music composition application 150, and each can include and/or be in communication with one or more audio devices 115. A music composition platform 160 can be stored on, and executed by, the one or more servers 130. The one or more servers 130 and/or music composition platform 160 also can include and/or execute one or music composition applications 150. The system 100 can include any number (e.g., one or multiple) of computing devices 110, audio devices 115, servers 130, music composition applications 150, and music composition platforms 160.

As described throughout this disclosure, the music composition applications 150 can be configured to provide specifically configured interfaces and functionalities that enable rapid generation of digital music compositions 120. The music composition applications 150 also store notations 125 associated with the music composition applications 150 in accordance with a data model 170 that enables the music compositions 120 to be created and/or edited in different operational modes.

The network 190 may represent any type of communication network, e.g., such as one that comprises the Internet, a cellular network, a telecommunications network, a private intranet, a virtual private network (VPN), a local area network (e.g., a Wi-Fi® network), a personal area network (e.g., a Bluetooth® network), a wide area network, an intranet, a television network, and/or other types of networks.

All the components illustrated in FIG. 1A, including the computing devices 110, audio devices 115, servers 130, music composition applications 150, and music composition platforms 160 can be configured to communicate directly with each other and/or over the network 190 via wired or wireless communication links, or a combination of the two. Each of these components (e.g., each of the computing devices 110, audio devices 115, servers 130, etc.) also can be equipped with one or more communication devices (e.g., transceiver devices and/or wire-based communication devices or interfaces), one or more computer storage devices (e.g., computer storage device 201 in FIG. 1B), and one or more processing devices (e.g., computer storage device 202 in FIG. 1B) that are capable of executing computer program instructions. Each of these components also can include, or be connected to, one or more display devices (e.g., liquid crystal displays or LCDs, light emitting diode or LED displays, plasma displays, touchscreen displays, and/or other types of displays) and/or one or more input devices (e.g., keyboards, mouse devices, capacitive sensing devices, joysticks, gamepads, gaming controllers, track balls, microphones, touchpads, optical sensing devices, scanners, mechanical switches and buttons, camera devices, video devices, etc.).

The one or more processing devices 202 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices 201 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums.

In certain embodiments, the computing devices 110 may represent or include mobile electronic devices (e.g., smart phones, tablet devices, personal digital assistants, tablet devices, wearable devices, and/or any other device that is mobile in nature). Additionally, or alternatively, the computing devices 110 can include desktop computers, laptop computers, gaming consoles (e.g., PlayStation®, Nintendo®, Xbox® and/or other gaming consoles) and/or other types of electronic devices. The one or more servers 130 may generally represent any type of computing device, including any of the computing devices 110 mentioned in this disclosure. In certain embodiments, the one or more servers 130 comprise one or more mainframe computing devices that are configured to communicate with the computing devices 110 and/or music composition applications 150 (and/or other applications and devices) over the network 190 (e.g., over the Internet and/or a cellular network in some scenarios).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, Calif., United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android® operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of be mounted to, worn by, and/or fixed to an individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise a head mountable wearable user computer device (e.g., one or more head mountable displays, one or more eyeglasses, one or more contact lenses, one or more retinal displays, etc.) and/or a limb mountable wearable user computer device (e.g., a smart watch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the computing devices 110 can permit users to specify inputs or selections via the music composition applications 150 to create and/or edit the music compositions 120. For scenarios involving a computing device that represents a mobile electronic device, the inputs or selections may be provided using gestures on a touch screen display and/or other input devices included on the mobile electronic devices. For scenarios involving a computing device that represents a desktop computer (or other similar device), the inputs or selections may alternatively, or additionally, be provided via keyboards, mouse devices, and/or other input devices.

In certain embodiments, the music composition applications 150 can be installed on the computing devices 110 as local applications. Additionally, or alternatively, the music composition applications 150 can be installed on the one or more servers 130, and the music composition applications 150 can be accessed (e.g., via a web browser) by the computing devices 110 over the network 190. For example, in some cases, the music composition platform 160 can provide the music composition applications 150 disclosed herein as a software-as-a-service and/or web-based application. Additionally, or alternatively, the music composition applications 150 can be installed on both the computing devices 110 and the servers 130 hosting the music composition platform 160. For example, the music composition applications 150 can be installed as front-applications that communicate with one or more back-end applications stored on the one or more servers 130 and/or music composition platform 160. The music composition applications 150 can be installed and/or executed in other configurations and arrangements as well. Regardless of the particular arrangement, it should be recognized that any functionality of the music composition applications 150 described herein can be executed by the computing devices 110, servers 130, and/or a combination of the two.

In certain embodiments, the music composition platform 160 can represent an online platform that communicates with the computing devices 110 over the network 190, and provides various functions that support the functionality of the music composition applications 150 installed on the computing devices 110. For example, the music composition platform 160 can provide support functions related to verifying login requests, storing digital music compositions 120 created using the music composition applications 150, facilitating or authorizing requests to share digital music compositions 120, and/or other related functions.

The music composition applications 150 can enable users to create and/or edit any type of digital music composition 120 including, but not limited to, any type of instrumental and/or vocal music composition. In certain embodiments, the digital music compositions 120 created or edited using the music composition applications 150 can include musical notations 125 and other music-related elements. For example, in some cases, the music composition applications 150 can enable users to add, edit, delete, and/or specify notations 125 indicating notes, melodies, phrases, rhythms, lyrics, and/or harmonies. In certain embodiments, the music composition applications 150 can enable users to generate digital music compositions 120 comprising electronic sheet music and/or scores that include notations 125.

As explained in further detail below, the music composition applications 150 can permit users to specify various types of notations 125 to create the digital music compositions 120. Exemplary musical notations 125 can include symbols and/or representations indicating staff notes (e.g., including note heads, note stems, and note flags), rests, clefs, chords, triplets, beaming, time signatures/meters, octaves/scale, tempo, accidentals (e.g. flats and sharps), measures, scores, pitches, rhythms, and/or any other musical elements associated with a vocal or instrumental musical piece.

Accurately denoting notations 125 for a digital music composition 120 can be complex due, at least in part, to the large number of notations 125 that are available and the large number of variations that are possible for each notation 125. One problem associated with traditional composition applications is that they do not enable users to rapidly select and customize desired notations 125. This is especially true for traditional composition applications that are used on mobile electronic devices, which often have diminished display space and touch screen input devices.

As explained in further detail below, in certain embodiments, the functionality and interfaces provided by the music composition applications 150 (e.g., provided to users via the computing devices 110) can be optimized to enable creation and editing of digital music compositions 120 on mobile electronic devices and/or touch screen devices in a user-friendly and expedited manner. In certain embodiments, the music composition applications 150 can permit creation and editing of compositions in multiple input operational modes (e.g., including, but not limited to, the direct input board mode 195, keyboard input mode 196, and multi-measure view mode 197 described below).

In certain embodiments, the music composition application 150 can present one or more interfaces in a direct input board (or DIBO) operational mode 195 that present note selection options directly on a staff representation, and the note selection options can be selectable using one or more gestures (e.g., tap gestures) and/or other selection means. In some embodiments, one or more gestures (e.g., swipe or scroll gestures) also may be utilized to activate a ledger line extender function that enables easy and quick expansion of the notes and/or octaves that are available for selection on the interface. As explained in further detail below, the interfaces presented in the DIBO operational mode 195 can combine optimized interface layouts with user-friendly gesture functionality to facilitate creation of digital music compositions 120. The DIBO interface layout and functionality can be particularly advantageous for creating or editing compositions 120 on mobile electronic devices. The DIBO interface layout and functionality also can be beneficial on desktop computing devices and/or other types of computing devices.

In certain embodiments, the music composition application 150 can present one or more interfaces in a keyboard operational mode 196 that present permits presents a digital keyboard comprising a plurality of digital keys. Staff notes and/or other notations can be added to digital music compositions, at least in part, by selecting the digital keys and/or other customization options presented in the interfaces. Additional details of the DIBO operational mode 195 and keyboard operational modes 196 are described in further detail below with reference to FIGS. 3-33.

In certain embodiments, the music composition applications 150 can store the digital music compositions 120 and/or associated notations 125 in accordance with a data model 170 that permits the notations 125 and underlying data associated with the digital music compositions 120 to be accessed across multiple operational modes. The data model 170 also can enable the music composition applications 150 to determine and output (e.g., via an audio device 115) appropriate pitches for staff notes included in the digital music composition. Further details of the data model 170 are described below with reference to FIGS. 39, 40A-40C and 41.

In certain embodiments, the music composition applications 150 each can include a collaboration component 140. The collaboration component 140 can enable users to share, edit, modify, supplement, and/or otherwise collaborate on digital music compositions 120. For example, a first user of a computing device 110 can create a new digital music composition 120 and share that music digital composition 120 with one or more additional users. The shared music composition 120 can then be accessed by the one or more additional users using their respective computing devices 110, and the one or more additional users can edit, modify, delete, supplement, add comments, and/or otherwise collaborate on the shared music composition 120 (e.g., by adding, removing, and/or editing notations 125). The collaboration component 140 can permit users to collaborate on digital music compositions 120 in other ways as well.

The music compositions 120 created using the music composition applications 150 can be output and/or played using one or more audio devices 115. The audio devices 115 may include speakers, audio cards, and/or types of devices that generate or output audio signals 194. The audio devices 115 can be integrated into the computing devices 110 and/or can communicate with the computing devices 110 (e.g., via a wired and wireless connections over a LAN and/or PAN). In the case of the latter, the computing devices can stream or otherwise provide audio to the audio devices 115 to enable listening of the digital music compositions 120.

While certain portions of this disclosure may describe usage of the music composition applications 150 on mobile electronic devices, it should be understood the music composition applications 150 (and their corresponding functionality) can be executed by any type of computing device 110 including, but not limited to the computing devices 110 described above.

Figure 2:
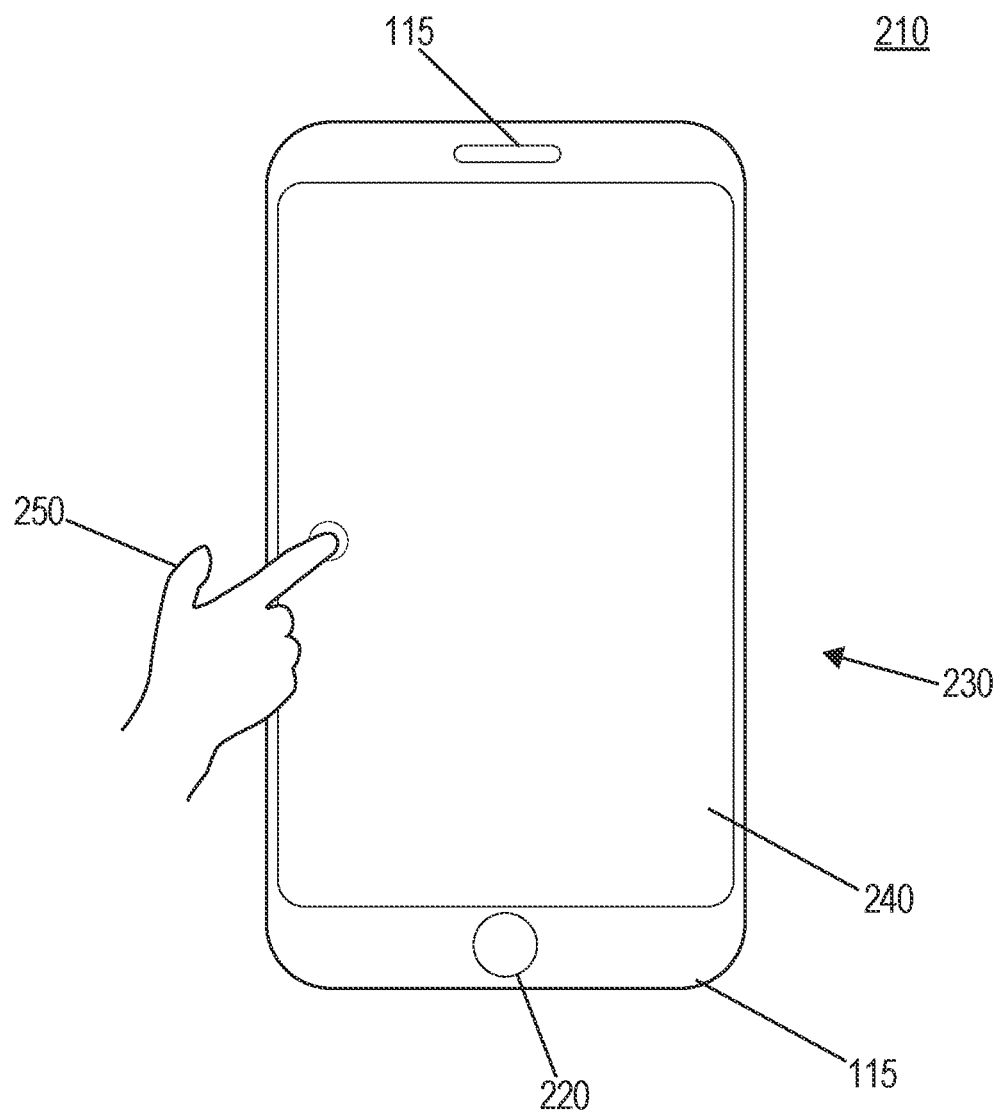
FIG. 2 is an exemplary electronic mobile device in accordance with certain embodiments.

FIG. 2 discloses an exemplary mobile electronic device 210 according to certain embodiments. The mobile electronic device 210 can include, inter alia, one or more audio devices 115, one or more input buttons 220, and one or more touch screen displays 230, each of which includes a capacitive sensing medium 240. In some cases, users or operators of the mobile electronic device 210 may utilize various gestures 250 to make selections and provide inputs via the one or more touch screen displays 230 included on the mobile electronic device 210. Other input mechanisms (e.g., mouse devices, keyboards, input buttons 220, etc.) also may be utilized to make selections and provide inputs.

In certain embodiments, each of the one or more touch screen displays 230 can include both a display (e.g., an LCD or liquid crystal display) device and capacitive sensing medium 240 that is configured to detect touches and gestures 250. In some cases, the capacitive sensing medium 240 can be configured to detect the location where the touch screen display 230 is engaged or touched by an object (e.g., a user's figurer or stylus), the time and duration of each engagement or touching of the touch screen display 230, and/or the pressure exerted each instance the touch screen display 230 is engaged or touched. The capacitive sensing medium 240 also can to generate signals indicating the same. The capacitive sensing medium 240 can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium 240 can be configured to detect various types of gestures 250. Exemplary gestures 250 that may be utilized to provide inputs via the capacitive sensing medium 240 and/or touch screen displays 230 can include:

(1) Tap Gestures: Touch or tap one finger on the touch screen display 230.
(2) Touch and Hold Gestures: Touch the touch screen display 230 and hold in place for a predetermined period of time (e.g., 1-3 seconds).
(3) Swipe Gestures: Touch the touch screen display 230, and move or drag a finger in a direction across touch screen display 230.
(4) Scroll Gestures: Move or drag one finger across the touch screen display 230 without lifting, and capable of moving bi-directionally (e.g., up and down or side to side).
(5) Zoom Gestures: Place two fingers on the touch screen display 230 near each other and spread them apart to zoom in, or move them toward each other to zoom out.

Other types of gestures 250 also may be utilized to provide inputs and selections via the capacitive sensing medium 240 and/or touch screen displays 230. It should be understood that any portion of this disclosure that describes selections, inputs, or the like being received on an interface can be provided by usage of one or more of the aforementioned gestures 250.

In comparison to many traditional desktop computer monitors, the touch screen displays 230 on mobile electronic devices 210 are often smaller in size (e.g., 3-7 inches when measured diagonally across the touch screen displays 230). Additionally, unlike many desktop computing devices, the primary means to provide inputs to the electronic mobile devices 210 is often by receiving inputs, selections, and/or gestures 250 via the touch screen displays 230.

As explained in further detail below, the music composition applications 150 can be configured to provide interfaces that are optimized for the smaller displays of mobile electronic devices 210, and which utilize gesture-based input functionality to easily define notations and digital music compositions 120. This can significantly increase usability of the music composition applications 150 in comparison to other traditional applications, which commonly attempt to transition a desktop composition application to a mobile environment. In many cases, the interfaces and functionality of the music composition applications 150 described herein prevent cluttering of the interfaces with voluminous selection options, avoid navigating through extensive menu hierarchies, and capitalize on the usage of gestures 250 to facilitate rapid entry of notations 125 used to create and edit digital music compositions 120.

The exemplary mobile electronic device 210 illustrated in FIG. 2 is provided as an example of a mobile electronic device 210, but it should be recognized that mobile electronic devices 210 can have other configurations and functionalities. For example, in some cases, mobile electronic devices may include mechanical keyboards (e.g., mechanical QWERTY keyboards), mechanical scrollers, and/or other input buttons 220 to provide inputs or make selections. Additionally, as mentioned above, the mobile electronic devices 210 can include wearable devices and/or other devices that are portable or transportable in nature. The mobile electronic devices 210 can be varied in other ways as well.

It should be understood that any portion of this disclosure that describes a function as being performed on a mobile electronic device 210 can additionally, or alternatively, be executed by other types of computing devices 110 (e.g., desktop computer devices, laptops, etc.). Moreover, any portion of this disclosure that describes usage of gestures 250 (e.g., to make selections) can additionally, or alternatively, be performed by generating or providing inputs through other types of input devices (e.g., keyboards, mouse devices, etc.).

FIGS. 3-38 are exemplary interfaces 300 that can be displayed by music composition applications 150 according to certain embodiments. It should be recognized that the music composition applications 150 can generate additional interfaces 300 other than those explicitly shown, and that the interfaces 300 illustrated in the drawings can be modified in various ways (e.g., sections, representations, and input options can be presented in other layouts and can be supplemented with additional features).

As explained below, the music composition applications 150 can be configured or operated in various operational modes, including the DIBO operational mode 195, keyboard operational mode 196, multi-measure view mode 197, and audio output mode 198 described herein. Exemplary details of these operational modes and other features of the digital create music compositions 120 are described below.

Figure 29:
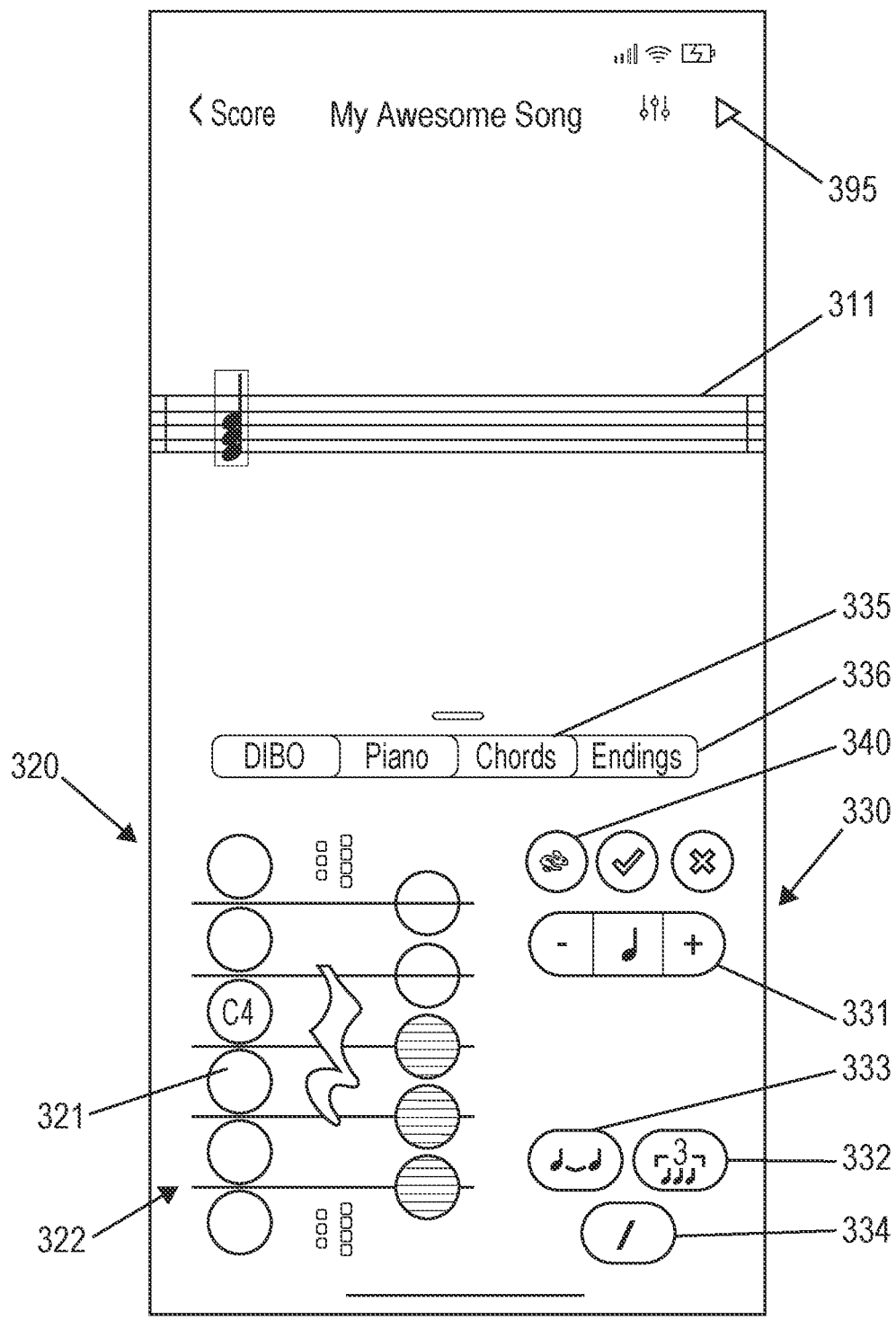
FIG. 29 is another exemplary layout for interface when a music composition application is configured in a DIBO operational mode according to certain embodiments.
Figure 30:
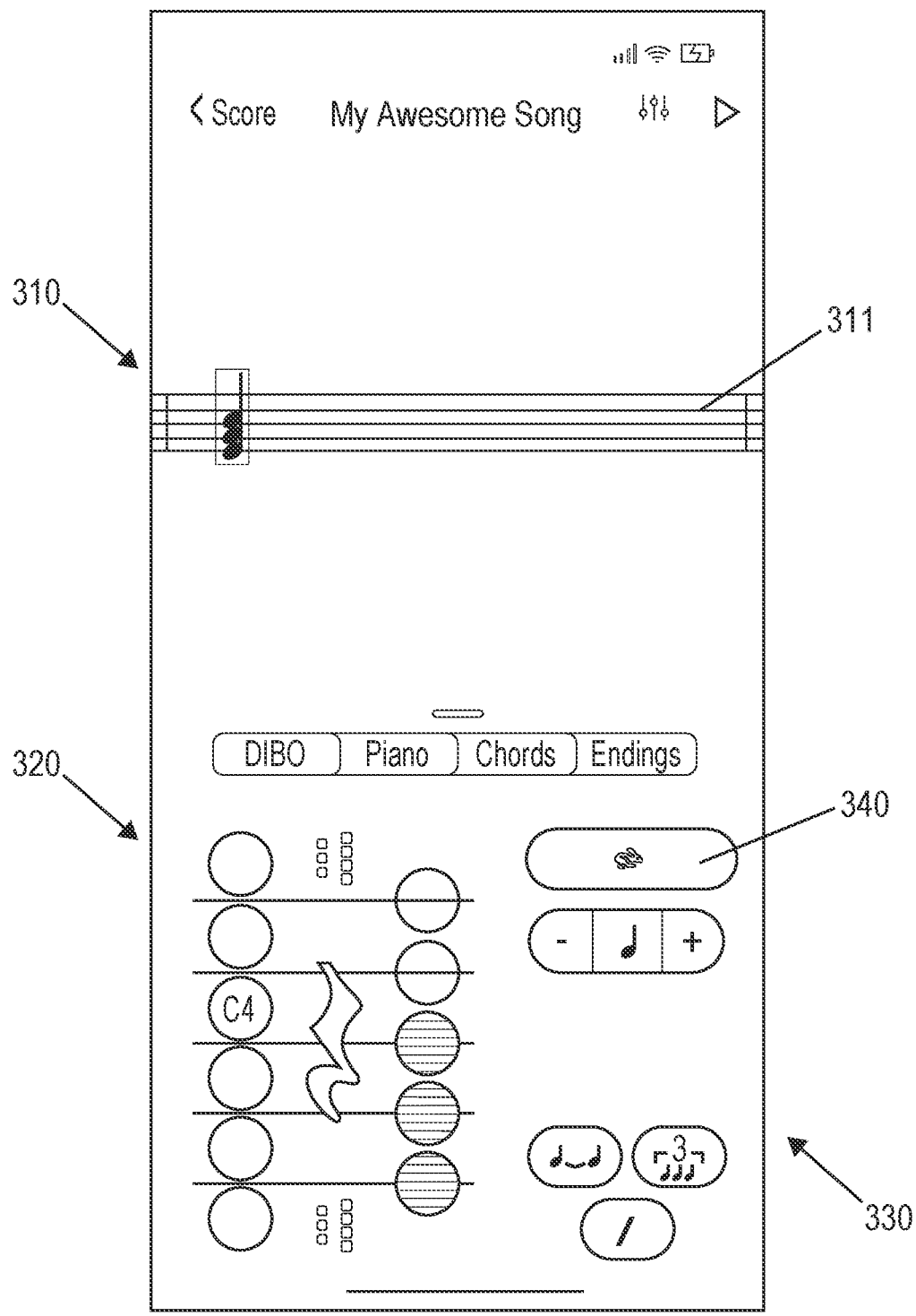
FIG. 30 is another exemplary layout for interface when a music composition application is configured in a DIBO operational mode according to certain embodiments.
Figure 31:
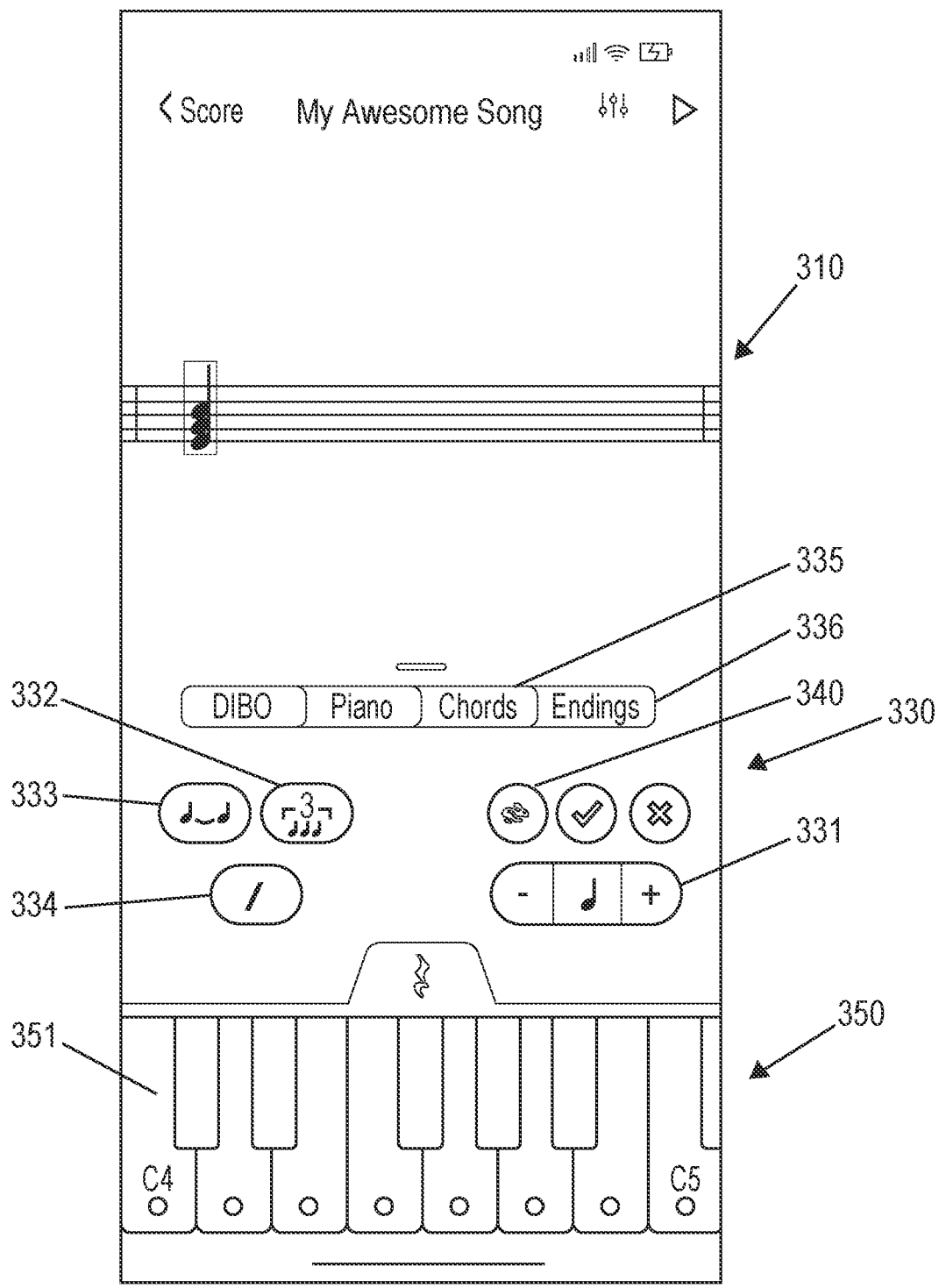
FIG. 31 is another exemplary layout for interface when a music composition application is configured in a keyboard operational mode according to certain embodiments.
Figure 32:
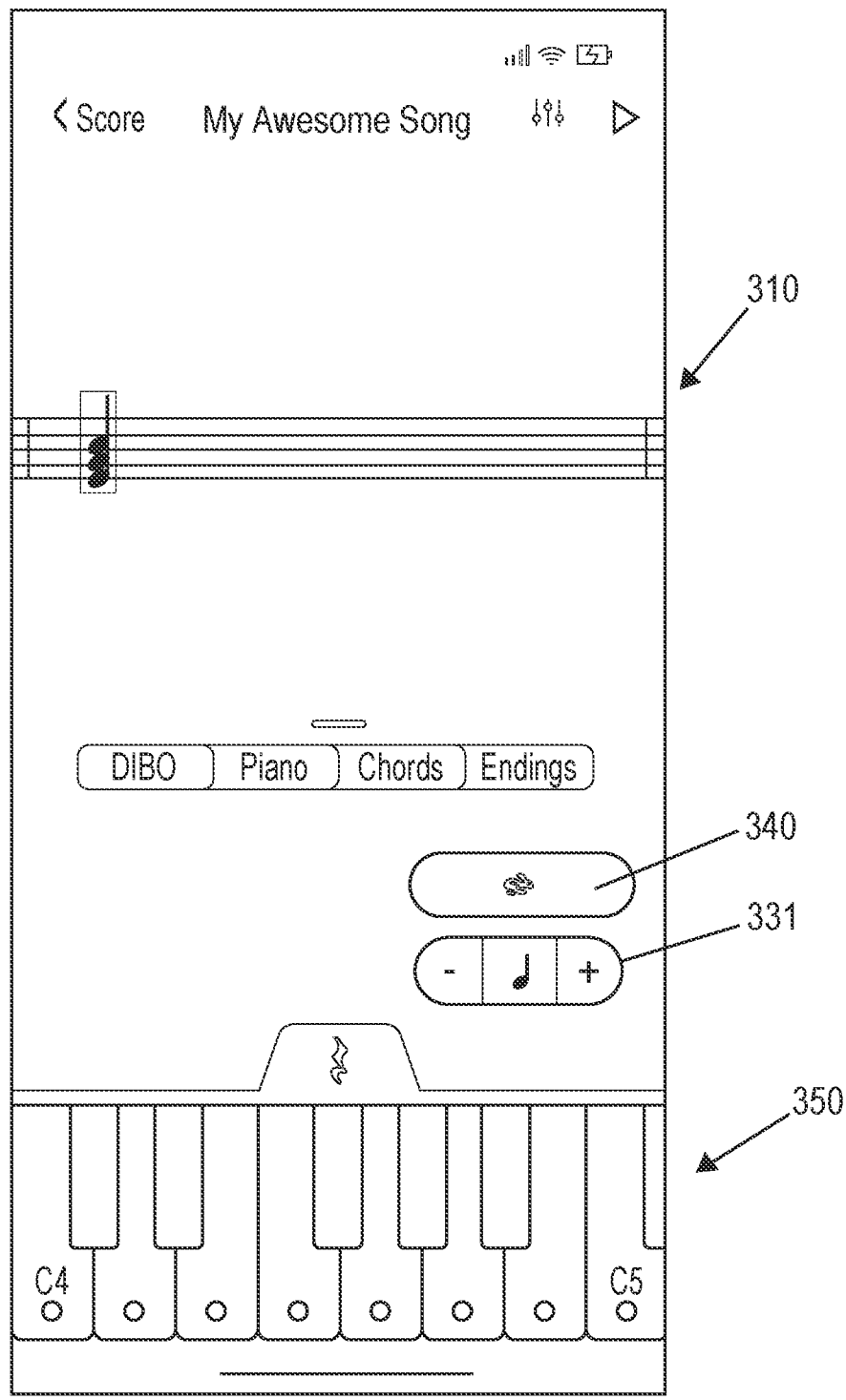
FIG. 32 is another exemplary layout for interface when a music composition application is configured in a keyboard operational mode according to certain embodiments.

FIGS. 3-19 disclose exemplary interfaces and features that may be displayed when the music composition applications 150 are operated in the DIBO operational mode 195. FIGS. 29-30 disclose alternative layouts for interfaces presented in the DIBO operational mode 195. FIGS. 20-25 and 27-28 disclose exemplary interfaces and features that may be displayed when the music composition applications 150 are operated in the multi-measure view mode 197. FIG. 26 discloses an exemplary interface that may be displayed when the music composition applications 150 are operated in the keyboard operational mode 196. FIGS. 31 and 32 disclose an alternative layout for interfaces that are configured in the keyboard operational mode 196.

Figure 3:
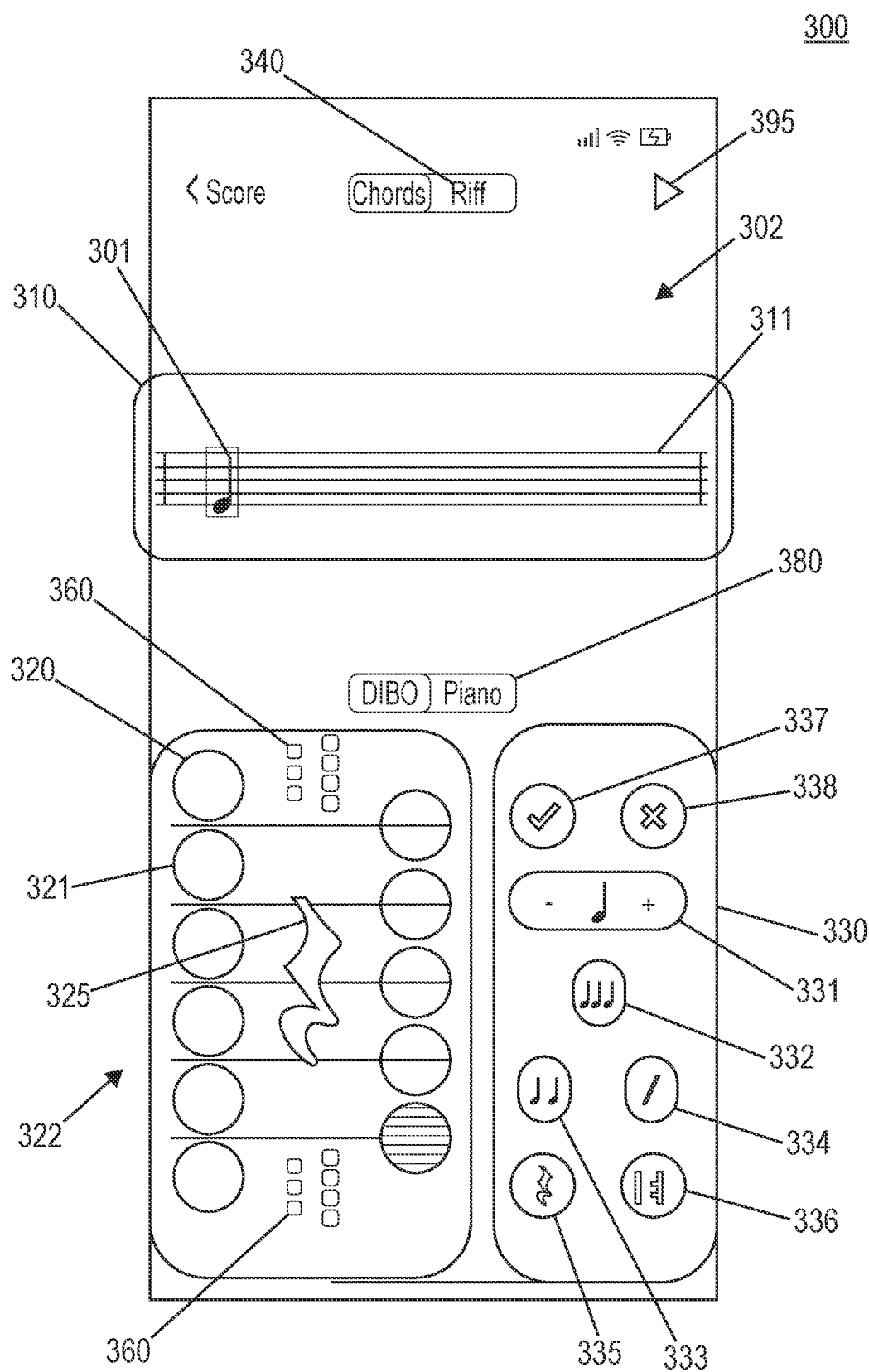
FIG. 3 is an exemplary interface that may be displayed when a music composition application is configured in a DIBO operational mode according to certain embodiments.

FIG. 3 illustrates an exemplary interface 300 that can be displayed when a music composition application 150 is configured in the DIBO operational mode 195 according to certain embodiments. The interface 300 includes, inter alia, an output staff interface 310, an input staff interface 320, and an actions section 330.

The output staff interface 310 includes an output staff 311 (e.g. having five lines separated by spaces between the lines). The output staff interface 310 also displays and visualizes notations 125 (e.g., notes 301, rests, chords, etc.) for a musical composition 120 that is being created or edited. The notations 125 can be defined or added to the output staff 311 using the inputs (e.g., gestures 250) received via the input staff interface 320 and the actions section 330. Notations 125 can be continuously added to the output staff 311 to create a digital music composition 120.

In certain embodiments, the output staff 311 displays a current measure 302 that is being created or edited by a user. Each measure 302 may represent a section of notations 125 located between or within a pair of bar notations, and each measure 302 can be associated with a particular time signature. The output staff interface 310 can be interactive to permit users to activate or select (e.g., using a tap gesture or other input) the notations 125 on the staff for editing, deleting, and/or customizing. A notation 125 can be highlighted (e.g., using a background color) to indicate to the user which notation 125 is currently activated or selected. Similarly, a staff note 301 or other notation 125 that is currently activated or selected can be deactivated or deselected by selecting the staff note 301 or notation 125 a second time (e.g., again, using a tap gesture or other input).

In many scenarios involving a digital music composition 120 that includes more than one measure 302, a user can scroll left and right (e.g., by performing a scroll or swipe gesture on the touch screen display 230) to access and view all of the measures 302 associated with the digital music composition 120. For example, in some cases, a user can scroll left to view previous measures and scroll right to return to the last measure 302 that was created. When the user scrolls to a desired measure 302, the user is able to edit the measure (e.g., by selecting notes 301 or other notations 125 and providing inputs via the input staff interface 320 and/or actions section 330). If there is no existing measure 302 to the right of a current measure 302 that is displayed on the output staff 311, a new measure 302 can be created and added to the digital music composition 120 when a user scrolls to the right. In some embodiments, the interface 300 permits new measures 302 to created without completing a previous measure 302.

In certain embodiments, a time value of a final note in a measure 302 will automatically be limited to the remaining time available in a measure 302 based on a time signature associated with the musical composition 120 and/or measure 302. The duration option 331 may display or indicate any remaining time value. Upon completion of a measure 302, the confirm option 337 may turn green (or emphasized in other ways) to indicate that the time value of the current measure 302 is complete. In response to a user selecting the confirm option 337 (e.g., using a tap gesture), the completed measure 302 can slide left on the output staff 311 and the user can be presented with a new measure 302.

The input staff interface 320 allows for selection of notes 301 and other notations 125 in an efficient and user-friendly manner by integrating note selection options 321 directly onto a representation of musical staff. For example, as illustrated in FIG. 3, note selection options 321 are integrated with an input staff 322 comprising a plurality of lines and a plurality of spaces between the lines (e.g., five lines separated by spaces). Note selection options 321 are located on each of the lines and each of the spaces located between the lines. Each of the lines and spaces (and corresponding notes) included in the input staff 322 corresponds to the lines and spaces included on the output staff 311 included in the output staff interface 310. In response to a user selecting a note selection option 321 (e.g., using a tap gesture or other input), a corresponding note 301 or notation 125 can be added to the output staff 311 included in the output staff interface 310.

Figure 12:
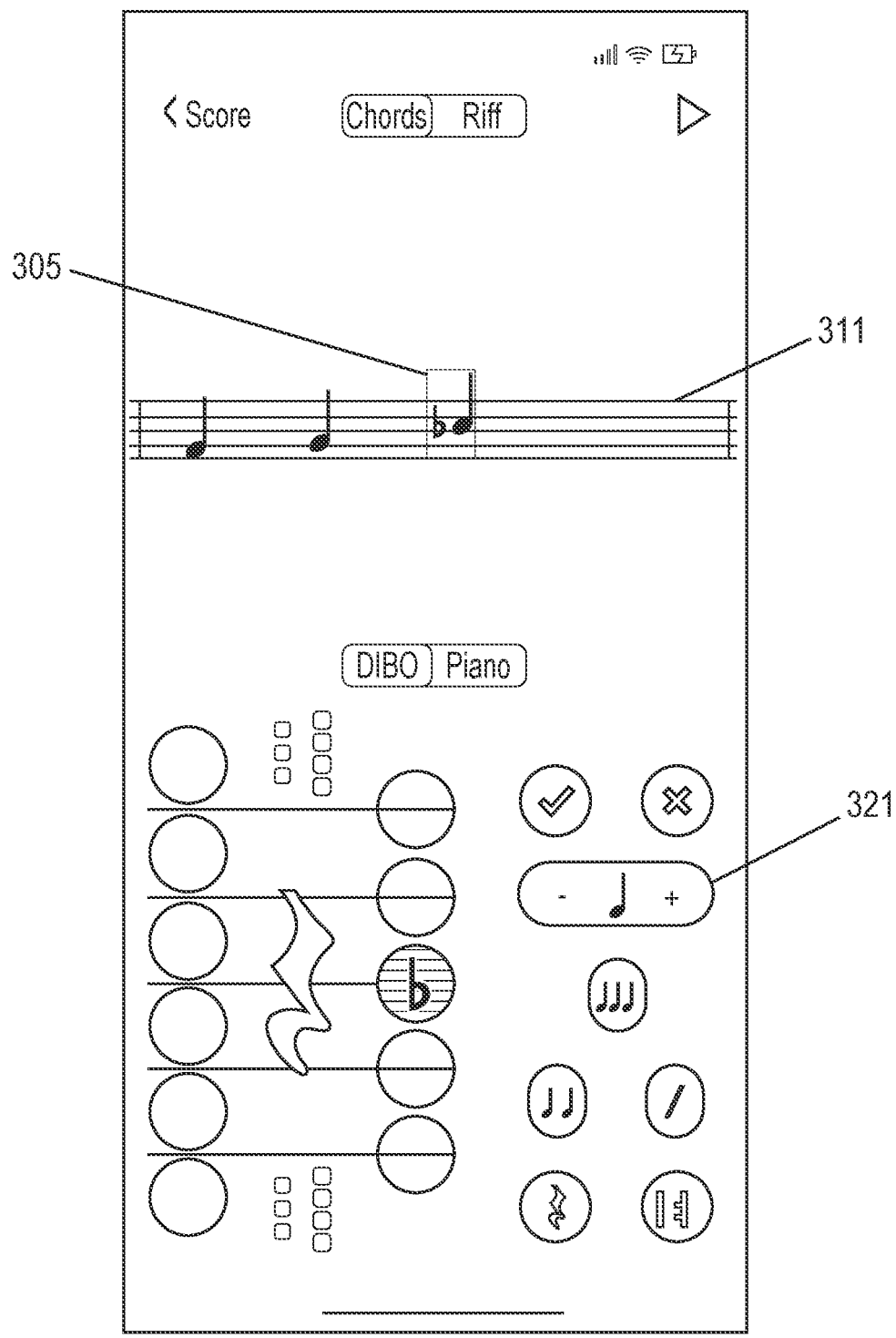
FIG. 12 is an exemplary interface illustrating entry of accidentals according to certain embodiments.
Figure 13:
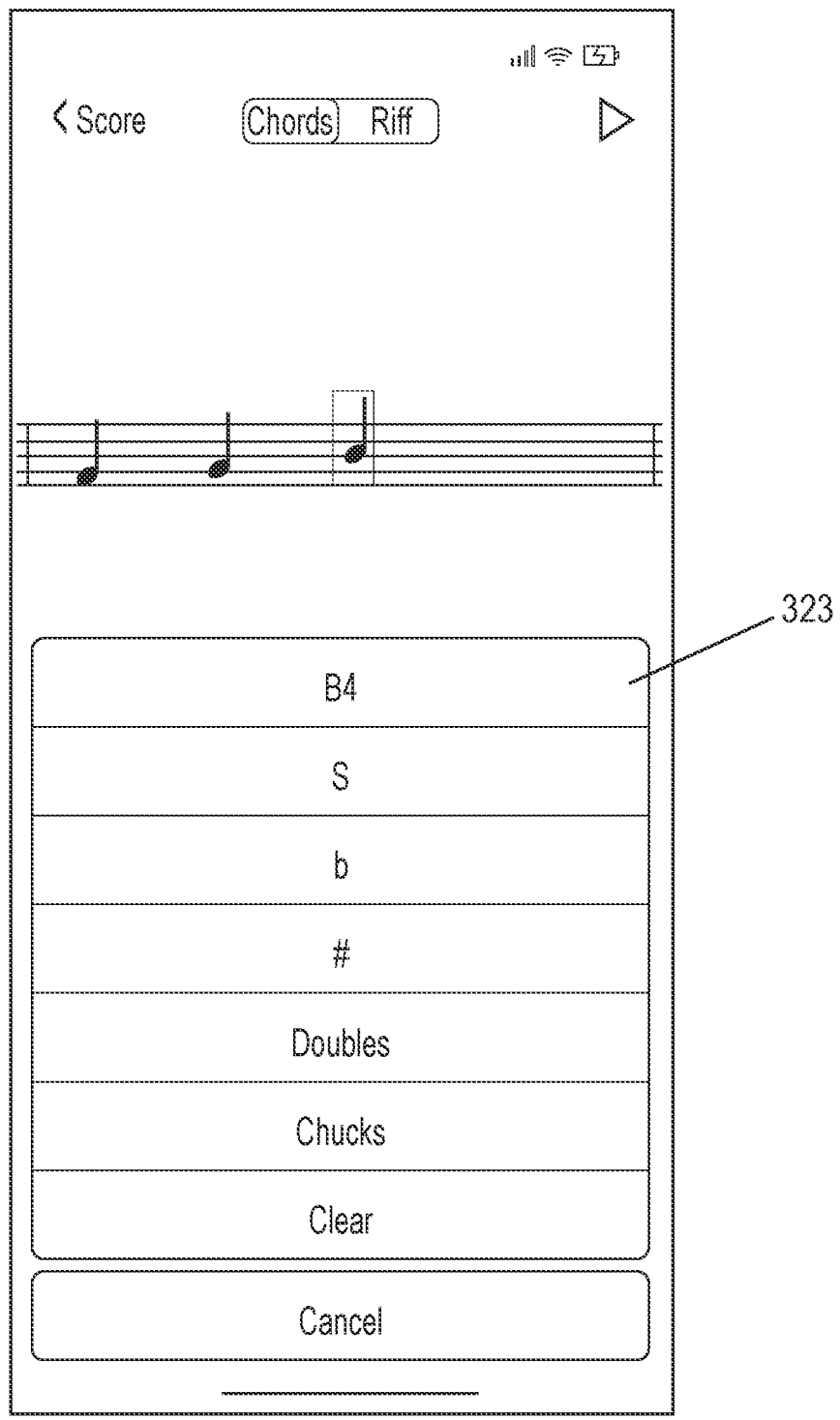
FIG. 13 is an exemplary interface illustrating a menu of accidentals options according to certain embodiments.

In certain embodiments, users can utilize different types of gestures 250 to manipulate the note selection options 321. For example, in certain embodiments, performing a tap gesture on a note selection option 321 may cause a corresponding staff note 301 to be added to the output staff 311. Additionally, if the user performs a tap and hold gesture, this can enable the user to specify an accidental for the corresponding staff note 301. In some cases, performing a tap and hold gesture will present a menu of possible accidentals that can then be selected by the user (e.g., as shown in FIGS. 12 and 13). This is one example of a multi-gesture functionality 199, which is incorporated into the note selection options 321 in this scenario.

By incorporating the note selection options 321 directly onto a musical staff (e.g., represented by the input staff 322), users are able to intuitively visualize the exact staff note 301 that will be added to a digital music composition 120 and where the staff note 301 will appear on the output staff 311 displayed in the output staff interface 310. This permits users to easily and quickly select and add staff notes 301 (e.g., using tap gestures and/or other inputs) when creating and/or editing a digital music composition 120. Additionally, configuring the note selection options 321 with multi-gesture functionalities 199 that vary based on different types of input gestures 250 (e.g., a tap gesture to add a note 301 and a tap and hold gesture to add an accidental) provides a compact input mechanism that can be well suited for mobile electronic devices 210 (and/or other computing devices 110).

The input staff interface 320 also can include a rest input option 325 that enables users to select and add various types of rests to the digital music composition 120. In response to selecting the rest input option 325, a rest notation may be added to the output staff 311 and the rest input option 325 may be highlighted in the input staff interface 320. A user can change the duration associated with the rest notation using the duration option 331 in the actions section 330 (e.g., by selecting the minus option to decrease the duration and the plus option to increase the duration). In certain embodiments, in response to changing the duration of a rest, the symbol associated with the rest may be changed accordingly in the output staff 311 (e.g., may be changed to symbols indicating long, breve, semibreve, minim, crotchet, quaver, semiquaver, demisemiquaver, and hemidemisemiquaver).

The input staff interface 320 also includes ledger line extender options 360 located above and below the input staff 322. The ledger line extender options 360 enable users to easily access additional staff notes above and below the current the notes that are represented by the input staff 322. In response to selecting a ledger line extender option 360 (e.g., using a tap gesture), the range of staff notes available for selection can expand and a user can scroll (e.g., using a scroll gesture to scroll upwards and/or downwards) to desired notes. In this manner, the ledger line extender options 360 facilitate presentation of, and access to, all available notes in a compact portion of the interface 300, which can particularly beneficial when music composition applications 150 are executed on mobile electronic devices 210 (and other types of computing devices 110). Further details of the ledger line extender options 360 are provided below.

The actions section 330 on the interface 300 in FIG. 3 can include the following selectable options: a duration option 331; a triplet option 332; a tie option 333; a note repeat option 334; a chord option 335; a repeats and ending option 336; a confirm option 337; and a cancel option 338. The actions section 330 can include additional options as well. In many scenarios, each of the options can be selected and manipulated using gestures 250 received via a touch screen device 230 and/or using inputs received in other ways (e.g., mouse devices).

The duration option 331 can be configured to permit users to adjust (e.g., increase and decrease) the durations associated with notations 125 (e.g., staff notes, rests, etc.). The triplet option 332 can enable users to add triplet notations to the output staff 311 and/or musical composition 120 being created or edited. The tie option 33 can enable users to add tie notations between staff notes 301 on the output staff 311. The note repeat option 334 enables users to add a notation 125 for a note repeat symbol to the output staff 311 and/or musical composition 120 being created or edited. The chord option 335 can enable users to add chord notations to the output staff 311 and/or musical composition 120 being created or edited. The repeats and ending option 336 permits users to add start repeat notations and end repeat notations to the output staff 311 and/or musical composition 120 being created or edited. Additional details associated with each of these options are described below.

The confirm option 337 enables users to confirm the entry or finalization of various notations 125 and other composition options (e.g., notes, measures, chords, start and end repeats, etc.). For example, when a user has finished customizing a staff note 301 (e.g., by adding an appropriate duration, accidental, etc.), the confirm option 337 can be selected to add the notation to the output staff 311 included the output staff interface 310. Conversely, the cancel option 338 can be selected to delete or remove a selected notation 125 from the output staff 311 in the output staff interface 310, or to cancel edits made to notations 125.

The interface 300 also includes an entry mode option 340 that permits a user to switch or toggle between a riff entry mode and a chord entry mode. The riff entry mode can enable users to rapidly add single or individual notes 301 to the output staff 311 by selecting corresponding note selection options 321 on the input staff 322. For example, in response to selection of a note selection option 321 when the riff entry mode is activated, a corresponding note may be instantly added to the output staff 311 and the cursor on the output staff 311 may automatically advance to the next time point to allow for entry of another individual note 301. In some embodiments, the user is not required to select the confirm option 337 to append notes 301 to the output staff 311 when creating or editing the digital music composition 120 in the riff entry mode. In certain embodiments, the users may be permitted to adjust the duration of notes 301 (e.g., using duration option 331) in the riff entry mode, but some or all of the other customization options (e.g., triplet option 332, tie option 333, chord option 335, repeats and ending option 336, etc.) may be deactivated.

In the chord entry mode, the user has access to more granular options and functionality to define notations 125 for the music compositions 120 (e.g., triplet option 332, tie option 333, chord option 335, repeats and ending option 336, etc.). In some embodiments, the chord entry mode may be the default mode for creating or editing notations 125 for a digital music composition 120. A user can switch or transition to the riff entry mode to rapidly add individual notes when desired, and can switch or transition back to the chord entry mode when more granular control and customization is desired.

The interface 300 further includes a mode selection option 380 to switch or toggle between the DIBO operational mode 195 and the keyboard operational mode 196. In creating a digital music composition 120, staff notes 301 and/or other notations 125 can be created and editing using either or both of the operational modes. Further details of the keyboard operational mode are described below (e.g., with reference to FIG. 26). As explained in other portions of this disclosure, the music composition applications 150 utilize a specially designed data model to store notations 125 for digital music compositions 120, and the data model allows the notations 125 to be compatible across both the DIBO operational mode 195 and the keyboard operational mode 196.

In certain embodiments, the staff notes 301 and/or other notations 125 can be configured with multi-gesture functionalities 199. For example, as mentioned above, performing a first gesture (e.g., a tap gesture) on staff notes 301 or notations 125 with activate the staff notes 301 or notations 125 for editing, while performing a second gesture on the staff notes 301 or notations 125 can permit staff notes 301 and/or other notations 125 included on the output staff 311 to be copied and pasted. For example, in some cases, performing a gesture (e.g., a tap and hold gesture) on a notation 125 will cause a menu or overlay to appears that presents an option for copying the notation 125. The menu or overlay also may present other options (e.g., for pasting a previously copied notation at that time point and/or editing the notation). The copy option can then be selected to copy the notation (including its underlying data structure that stores information used to display the notation and/or determine a pitch for the notation).

The user may then select a time point or location on the output staff 311 where the user desires to paste the notation 125. For example, a user may perform a gesture (e.g., a tap and hold gesture) at any desired location in any existing measure 302. This may cause a menu or overly to appear that presents a paste option, which can be selected to paste a previously copied staff note 301 and/or notation 125. Any data associated with a staff note 301 or other notation 125 (e.g., including the notation display data and pitch data described below) that is copied can be included in the new staff note 301 or notation 125 that is pasted.

Thus, many other features presented by the music composition applications, the staff notes 301 and/or notations can be configured with multi-gesture functionality 199, which condenses the presentation of options presented on the interface 300. In this example, a first gesture (e.g., a tap gesture) may be performed on notations 125 included in the output staff to activate the notations 125 for editing, and a second gesture (e.g., a tap and hold gesture) may be performed on the notations 125 to enable copying and pasting of the notations 125. Other examples of multi-gesture functionalities 199 are described throughout this disclosure.

The interface 300 further includes an audio mode option 395 that enables a currently selected digital music composition 120 to be played or output via an audio device 115 (e.g., an audio device 115 included on a mobile electronic device 210, computing device 110, and/or external speaker). The audio mode option 395 can allow a user to listen to a current staff note 301 and/or measure 302 that is displayed on the interface 300. The audio mode option 395 also can allow the user to listen to a selected music composition 120 in its entirety.

Figure 4:
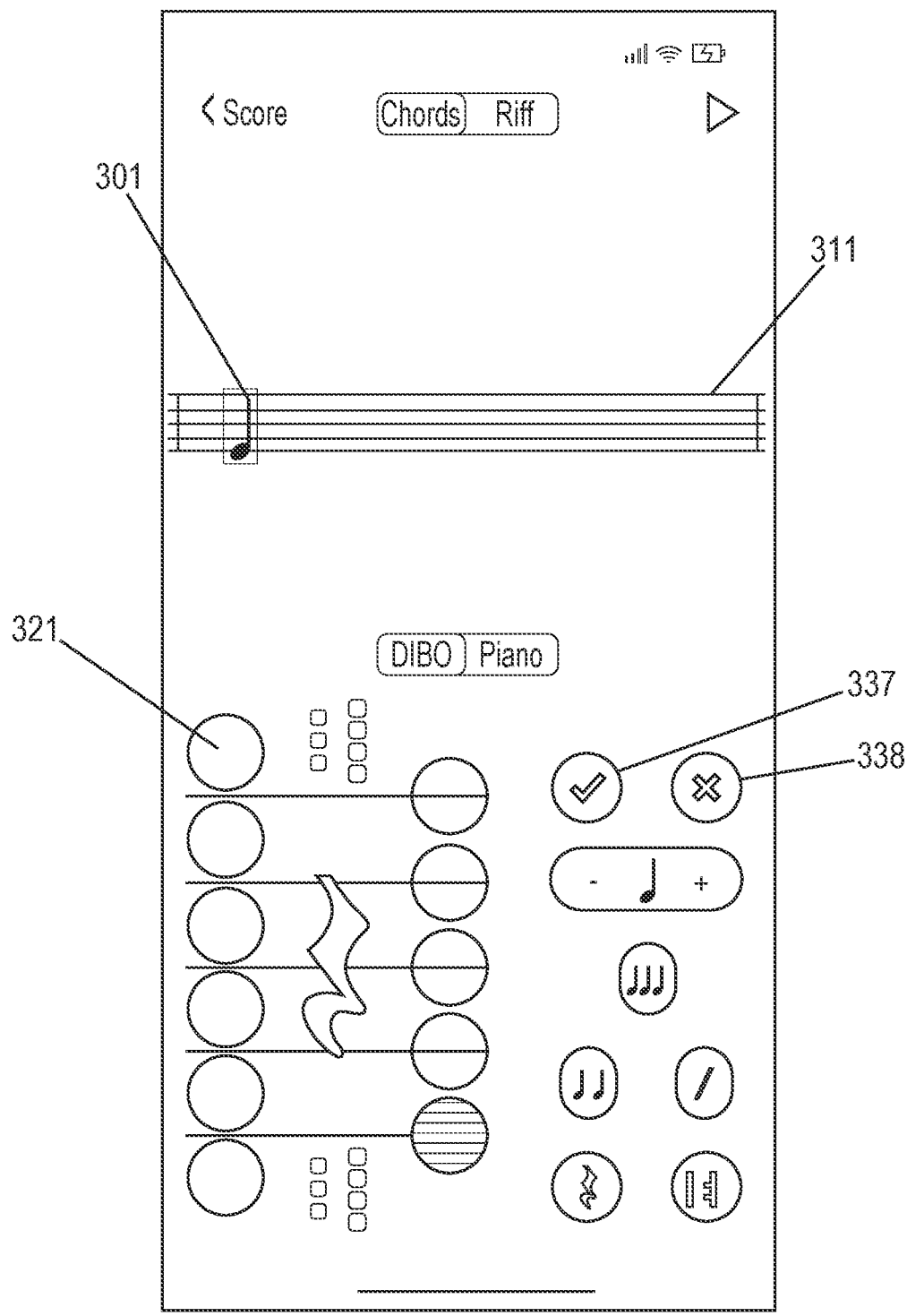
FIG. 4 is an exemplary interface that demonstrates entry of notes when a music composition application is configured in a DIBO operational mode according to certain embodiments.
Figure 5:
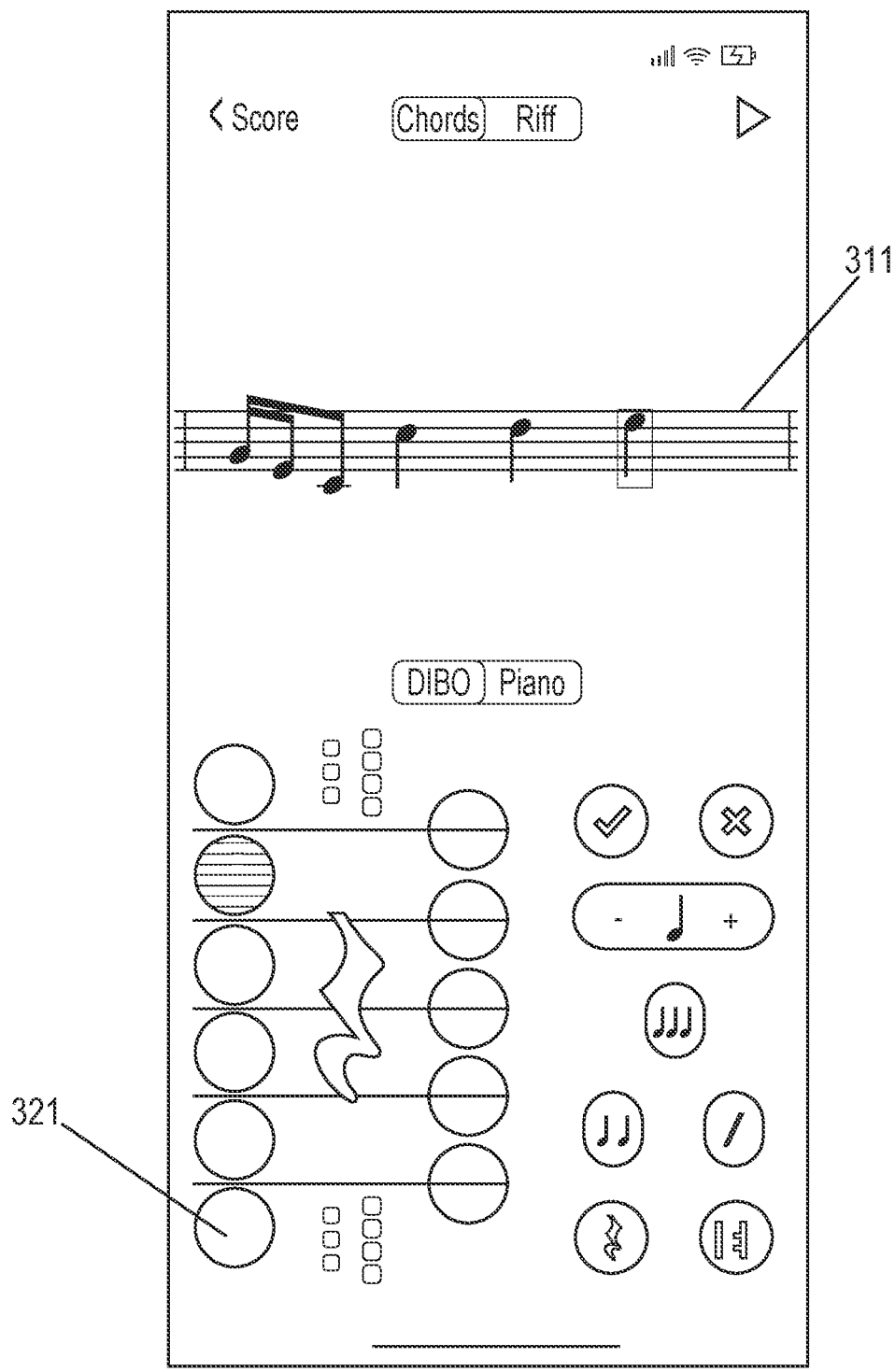
FIG. 5 is an exemplary interface that demonstrates entry of notes when a music composition application is configured in a DIBO operational mode according to certain embodiments.

FIGS. 4 and 5 are exemplary interfaces 300 demonstrating how notes 301 can be added to a current measure 302 according to certain embodiments. As mentioned above, note selection options 321 overlay the lines and spaces of the input staff 322 included in the input staff interface 320, and the lines and spaces correspond to the same lines and spaces (e.g., the same notes) included on the output staff 311 displayed in the output staff interface 310. The note selection options 321 can be selected (e.g., using a tap gesture and/or other input) to add notes 301 to the output staff 311.

For example, in FIG. 4, the note selection option 321 corresponding note E4 in the G clef (or treble clef) has been selected and a corresponding note has been added to the output staff 311 included in the output staff interface 310. The note displayed on the output staff 311 is highlighted to indicate to the user which note is currently being added or edited. The note selection option 321 corresponding note E4 can remain highlighted while the note 301 is being customized and/or while the note 301 displayed on the output staff 311 is highlighted. Users can customize the note 301 by adding accidentals and using the options presented in the actions section 330. When the user is finished customizing or defining the note 301, the confirm option 337 can be selected to append the staff note 301 to the output staff 311, and the user can begin adding a new notation 125 to the output staff 311. Alternatively, the user can select the cancel option 338 to remove the note 301 from the output staff 311.

Figure 6:
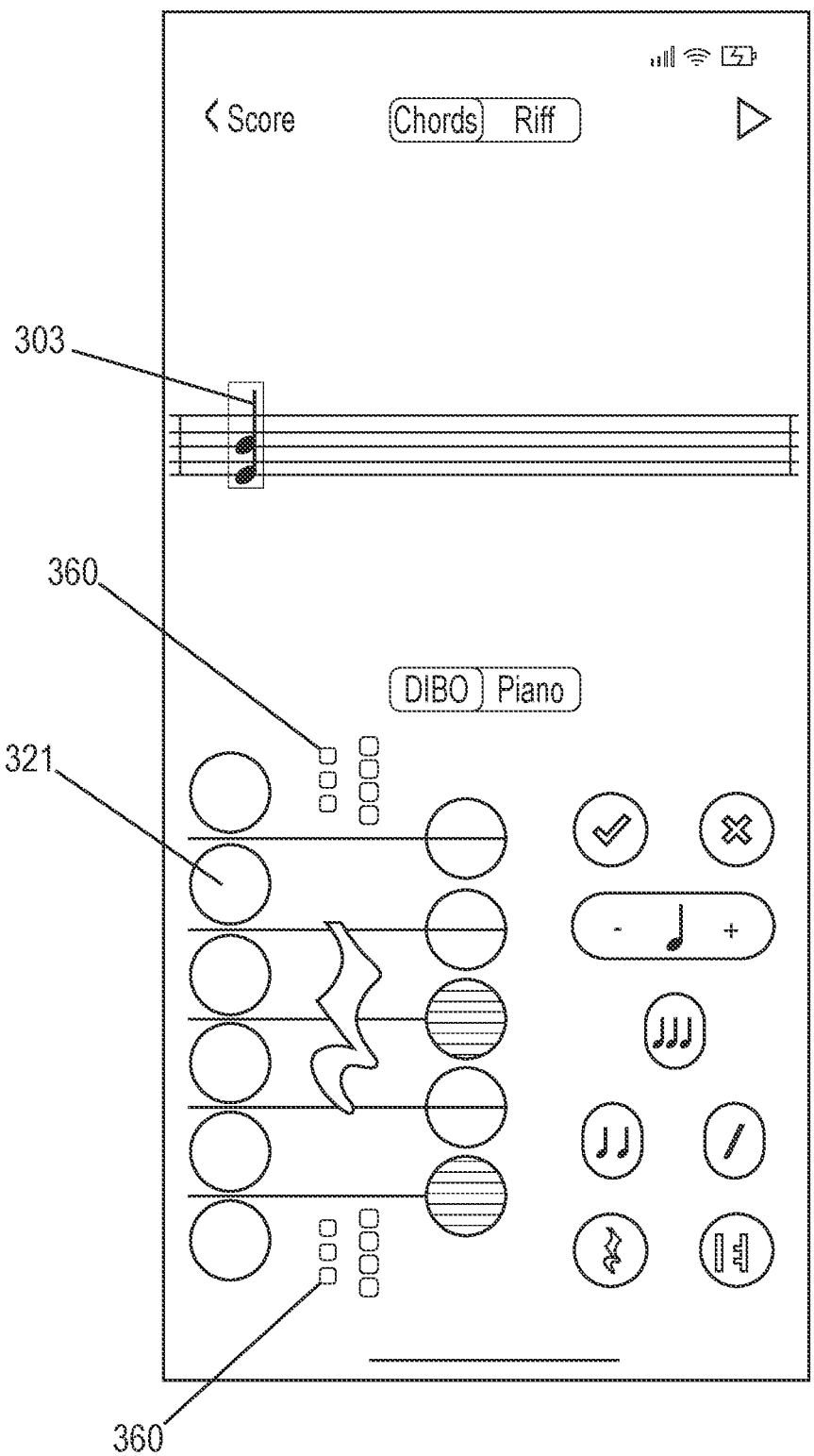
FIG. 6 is an exemplary interface that demonstrates entry of chords when a music composition application is configured in a DIBO operational mode according to certain embodiments.
Figure 7:
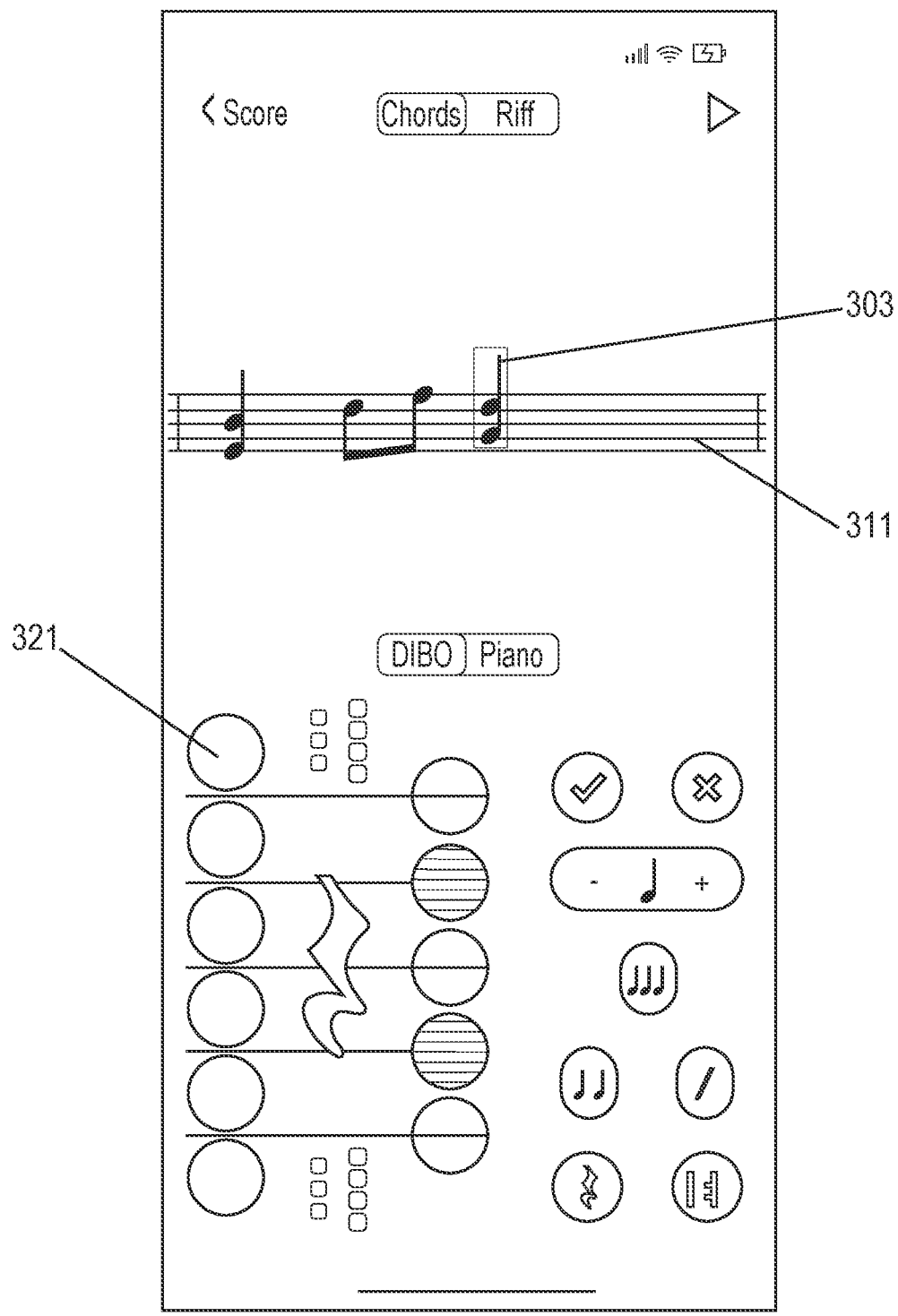
FIG. 7 is an exemplary interface that demonstrates entry of chords when a music composition application is configured in a DIBO operational mode according to certain embodiments.

FIGS. 6 and 7 are exemplary interfaces 300 illustrating how notations 125 for chords 303 can be added to a measure 302 and/or musical composition 120 according to certain embodiments. The chord notations may be utilized to indicate time points in the measure in which two or more staff notes 301 are to be played simultaneously. Chords 303 can be created by selecting (e.g., using tap gestures) multiple note selection options 321. For example, in creating a chord 303 comprising two notes, a user initially can tap a first note selection option 321 and that note selection option 321 will remain highlighted. Thereafter, the user can select a second note selection option 321, which will also be highlighted. Additional notes can be added to chords 303 by selecting more than two note selection options 321 in a similar manner.

If desired, the user can utilize the ledger line extender options 360 to scroll to access notes that are not currently displayed on the input staff 322 and/or input staff interface 320. The ledger line extender options 360 enable users to define chords 303 that can span the entire range of available notes. After a user is finished defining the chord 303, the user can select the confirm option 337 to commit it to the output staff 311 included in the output staff interface 310.

Figure 8:
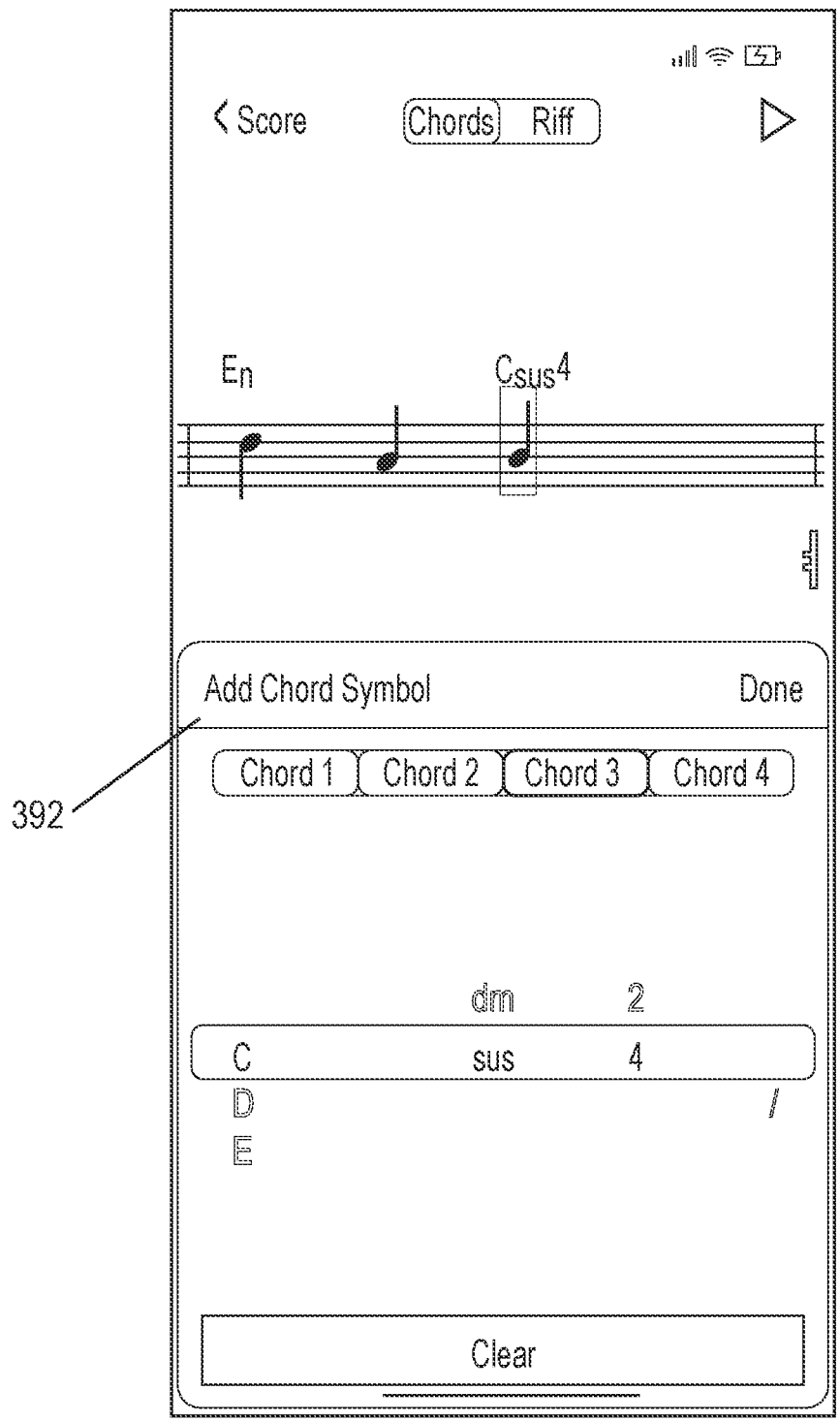
FIG. 8 is an exemplary interface illustrating the functionality of a chord picker option according to certain embodiments.

FIG. 8 is an exemplary interface 300 illustrating the functionality of the chord option 335 according to certain embodiments. The chord option 335 provides users with another mechanism for creating and/or editing chords 303 by defining chord symbols associated with chords 303. In response to selecting the chord option 335 (e.g., using a gesture 250 and/or other input), a tray or menu 392 may be presented that enables a user to select the chord symbols for defining a chord 303. The menu 392 can allow the user to view and select all possible chord symbols that are available. The chord symbols made available for selection via the menu 392 can be based on established notation rules.

When the user has finalized the chord symbol selections, the user may select a confirm option 337 to add or append a corresponding chord 303 to the output staff 311. In certain embodiments, the chord symbols selected by the user may appear above the chord 303 that is added to the output staff (e.g., in the beat location of a measure 302). For example, for a measure 302 having 4/4 time, the chord symbols may be placed above each quarter note.

Figure 9:
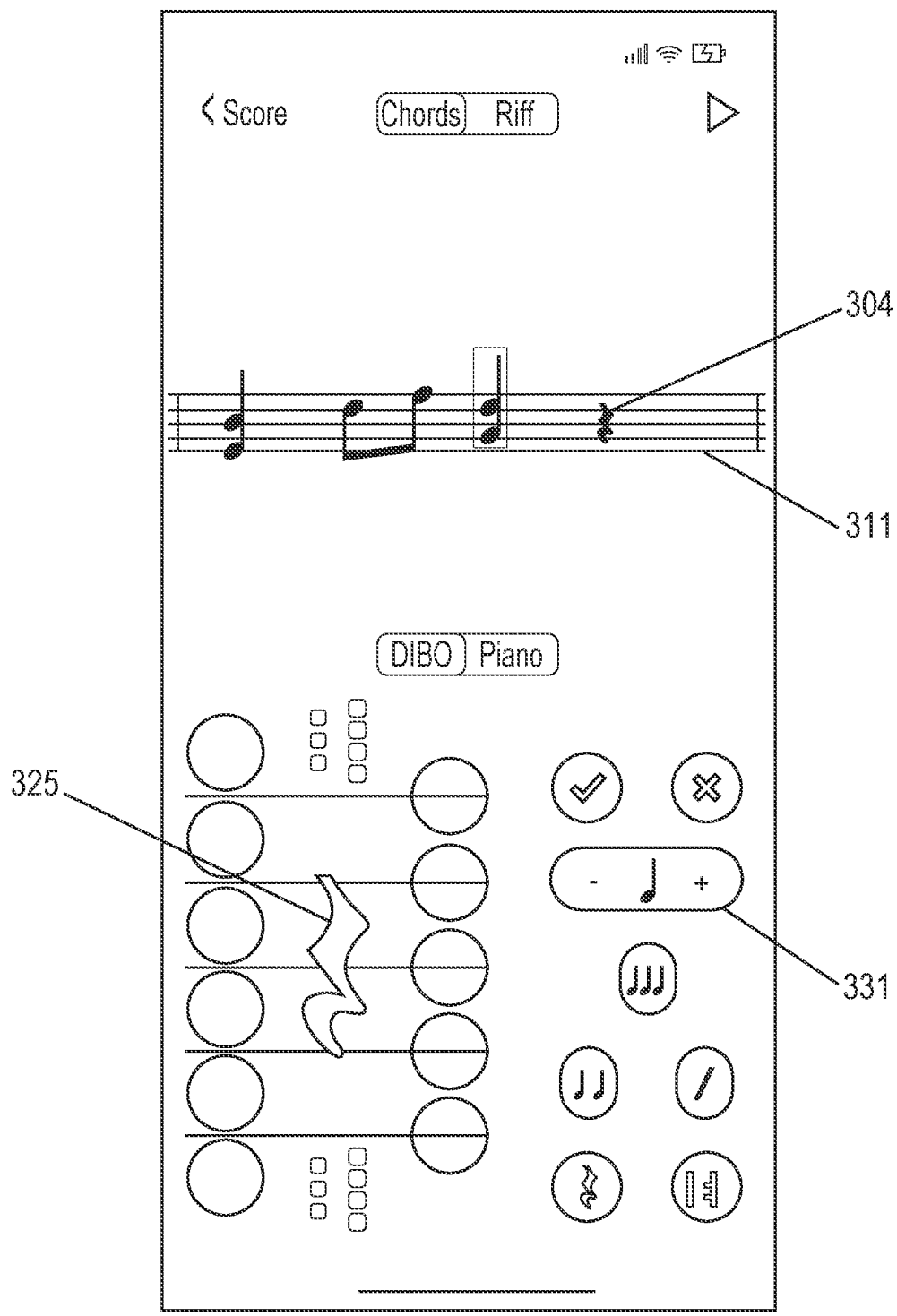
FIG. 9 is an exemplary interface that demonstrates entry of rests when a music composition application is configured in a DIBO operational mode according to certain embodiments.

FIG. 9 is an exemplary interface 300 illustrating how rests 304 can be added to a measure 302 and/or musical composition 120 according to certain embodiments. In certain embodiments, a rest input option 325 is integrated into the input staff 322 and/or input staff interface 320 in a central location that is easily accessible and adjacent to the note selection options 321. In response to a user selecting the rest input option 325 (e.g., using a tap gesture or other input), a notation 125 for a rest 304 may be added to the output staff 311.

After a rest 304 is added to the output staff 311 or selected for editing, the notation for the rest 304 can be highlighted to indicate to the user the active notation. A user can change the duration associated with the rest notation using the duration option 331 in the actions section 330. For example, a user can select the minus symbol on the duration option 331 to decrease the duration of the rest 304 and/or select the plus symbol on the duration option 331 to increase the duration or the rest 304. In response to changing the duration of a rest 304, the symbol associated with the rest may be changed accordingly in the output staff 311 (e.g., may be changed to symbols indication long, breve, semibreve, minim, crotchet, quaver, semiquaver, demisemiquaver, and hemidemisemiquaver).

Figure 10:
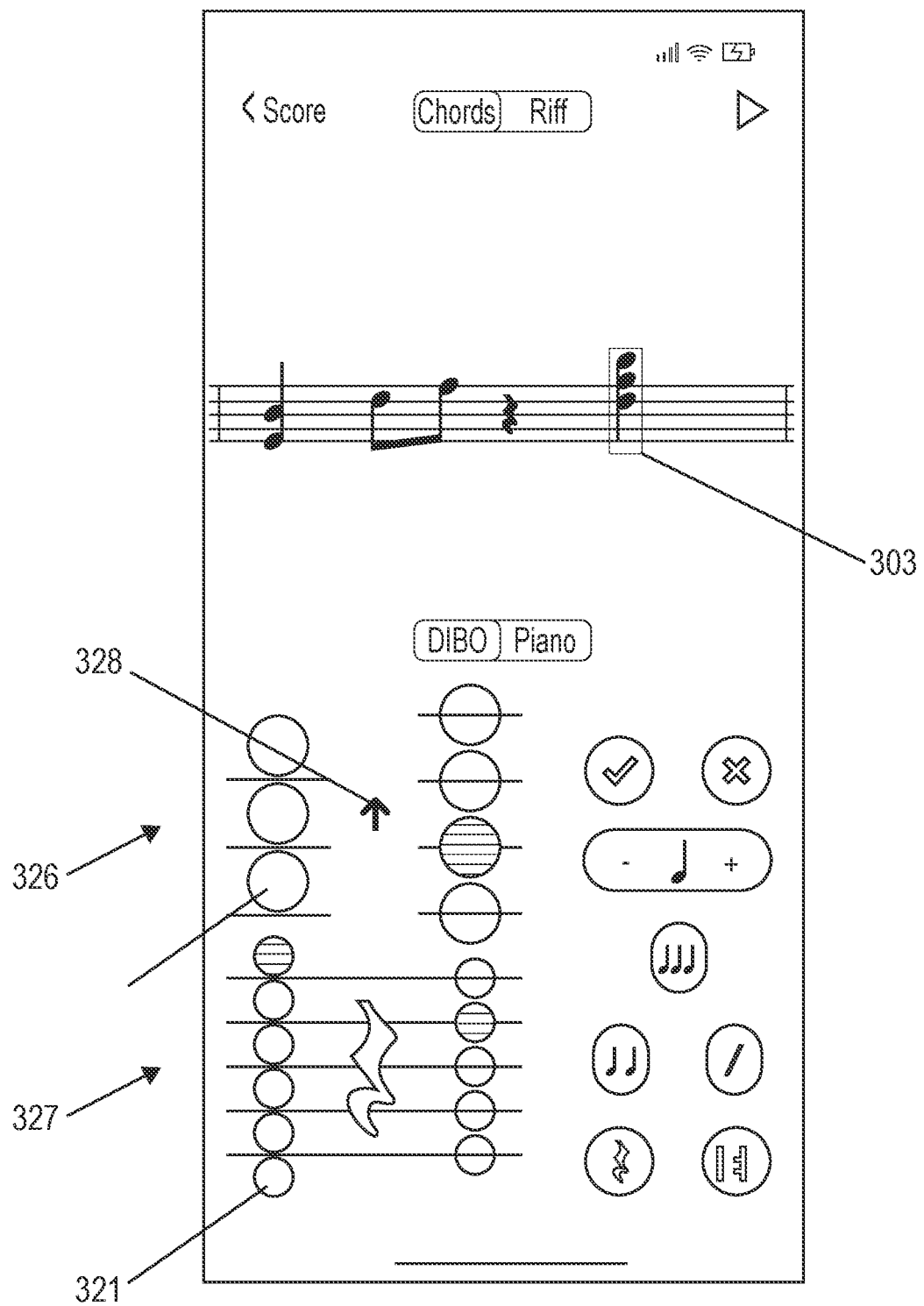
FIG. 10 is an exemplary interface illustrating usage of ledger line extender options that may be presented when a music composition application is configured in a DIBO operational mode according to certain embodiments.

FIG. 10 is an exemplary interface 300 illustrating the functionality of the ledger line extender options 360 according to certain embodiments. As mentioned above, the ledger line extender options 360 can be selected to enable access to additional notes (and corresponding note selection options 321) above and below the range of notes that are displayed on the input staff 322. In certain embodiments, the ledger line extender options 360 can provide access to any and all notes (e.g., all eighty-eight notes corresponding to piano keys and/or other ranges of notes).

In the example illustrated in FIG. 10, a ledger line extender option 360 located above the input staff 322 has been selected, thereby causing an upward expansion of the staff representation and permitting access to additional notes above the input staff 322. Selection of the ledger line extender option 360 located below the staff representation can similarly cause a downward expansion of the staff representation to provide access to additional notes below the staff representation (e.g., as illustrated in FIG. 40B). Once a ledger line extender option 360 is selected (e.g., using a tap gesture and/or other input), the staff representation becomes scrollable to allow users to freely navigate to notes above and below those notes that were originally displayed on the staff representation.

A user can perform gestures 250 (e.g., scroll or swipe gestures) on the staff representation to view and access any available note. Additionally, or alternatively, a user can select (e.g., using a tap gesture and/or other input) arrows 328 displayed in the expanded staff representation to navigate upward or downward to notes. In FIG. 10, an upward arrow 328 is presented because a ledger line extender option 360 located above the staff representation was selection. A similar downward arrow 328 may be displayed in response to section of a ledger line extender option 360 located below the staff representation.

In certain embodiments, the input staff 322 included on the input staff interface 320 is configured to be scrollable in an accordion-like manner when a ledger line extender option 360 is activated or selected. For example, the accordion functionality can cause the lines, spaces, and note selection options 321 on a first portion 326 of the input staff 322 to expand, while simultaneously causing the lines, spaces, and note selection options 321 on a second portion 327 of the input staff 322 to contract or condense. The accordion type scrollability of the input staff 322 enables users to view and access greater numbers of notes in a compact space of a display (e.g., a touch screen 230), and to expand the portions of the input staff 322 the user is currently viewing. Moreover, all of the note selection options 321 can presented and accessed within a fixed size space (e.g., within the fixed sized dimensions of the input staff interface 320). In many cases, this accordion-like functionality can be advantageous when the music composition applications 150 are being utilized on mobile electronic devices 210 (and other computing devices 110) that have smaller display screens.

The exemplary interface 300 in FIG. 3 also demonstrates how the ledger line extender options 360 can enable chords 303 to be easily defined across a wide range of notes. For example, to create a chord 303, a user may initially select one or more note selection options 321 included on an initial range of notes presented on the input staff 322 before a ledger line extender option 360 is activated. The user may then activate or select a ledger line extender option 360 to access notes above or below the input staff 322. The user can then scroll (e.g., using a scroll gesture, swipe gesture and/or other input) to the desired note and select one or more additional note selection options 321 to supplement the chord 303 with additional notes.

Figure 11:
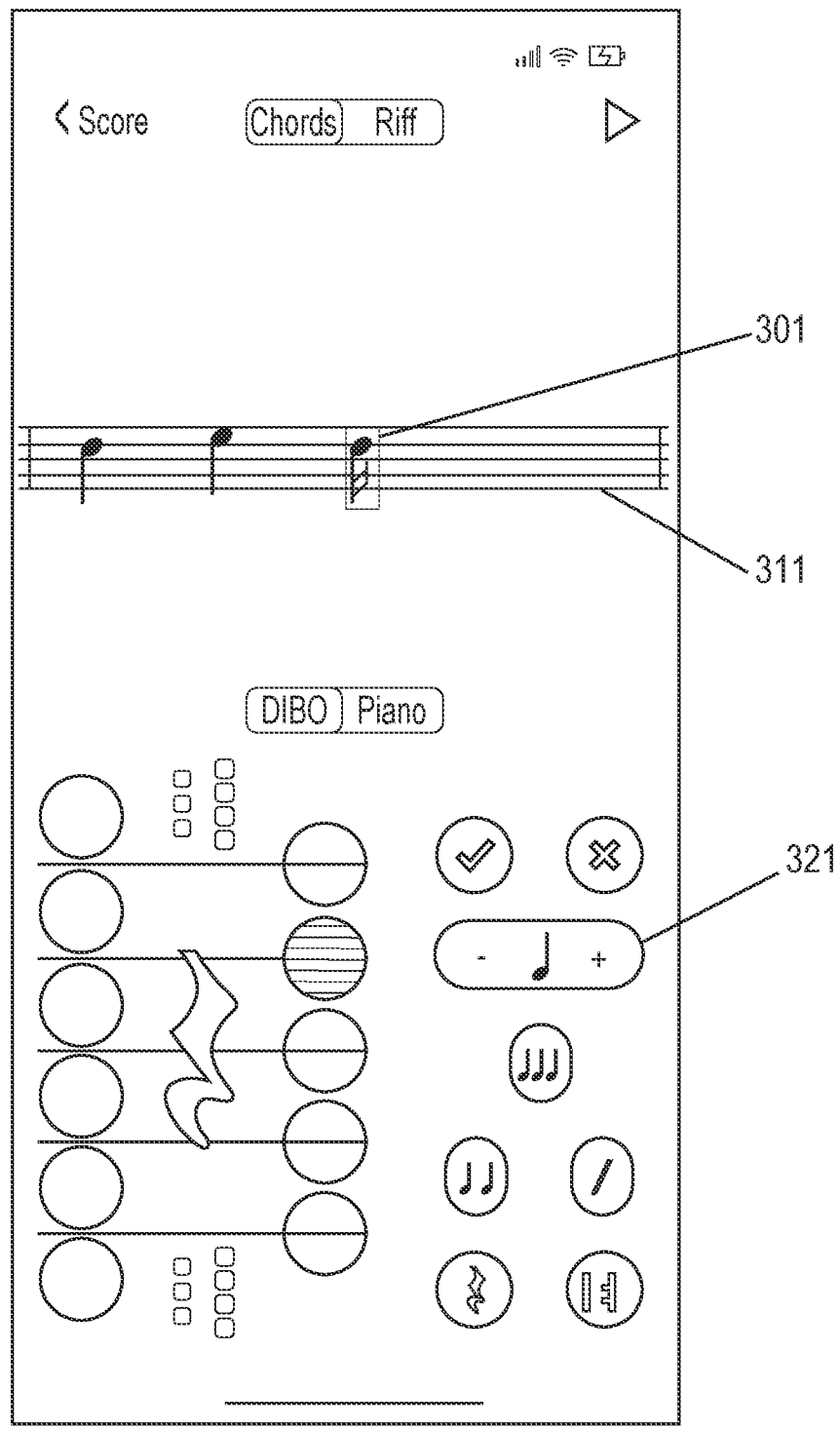
FIG. 11 is an exemplary interface illustrating the functionality of a duration option according to certain embodiments.

FIG. 11 is an exemplary interface 300 illustrating the functionality of the duration option 331 according to certain embodiments. As mentioned above, the duration option 331 can permit users to adjust (e.g., increase and decrease) the durations associated with notations 125 (e.g., staff notes, rests, etc.). For example, a duration of a current notation 125 that is selected on the output staff 311 can be decreased by selecting a minus symbol on the duration option 331 or increased by selecting a plus symbol on the duration option 331. The appearance of the notation 125 can be altered on the output staff 311 to reflect its corresponding duration. In the example illustrated in FIG. 11, the duration option 331 has been selected to adjust the duration of a note 301 and the appearance of the note 301 is altered with an appropriate notation to reflect its corresponding time value (e.g., a sixteenth note).

FIGS. 12 and 13 are exemplary interfaces 300 illustrating how notations 125 for accidentals 305 (e.g. flats and sharps) can be added to staff notes 301 according to certain embodiments. In this example, a user can add an accidental 305 by performing a tap and hold gesture (and/or providing any other input) on a note selection option 321. This may cause a menu 323 to appear (e.g., as shown in FIG. 13) that provides a listing of options that include all possible accidentals 305 for the note corresponding to the selected note selection option 321. A user may then select (e.g., using a tap gesture and/or other input) an option from the menu 323 to add a corresponding accidental 305 to the note. Additionally, the note selection option 321 that was selected may be modified to display the particular accidental 305 that was selected from the menu 323.

As mentioned above, the music composition applications 150 and/or corresponding interfaces 300 can detect the type of gesture 250 performed on the note selection options 321 to activate different types of functions. For example, in certain embodiments, a first gesture 250 (e.g., a tap gesture) performed on a note selection option 321 may cause a corresponding note 301 to be added to the output staff 311, while a second gesture 250 (e.g., a tap and hold gesture) can enable the user to specify an accidental 305 for the corresponding note 301. Configuring the note selection options 321 to perform different functions based on the type of gesture 250 that is detected can be beneficial by compacting the options presented on the interface and enabling rapid entry of notations 125. This compact interface functionality can be particularly useful in scenarios where music composition applications 150 are utilized by mobile electronic devices 210 and/or other types of computing devices 110.

Figure 14:
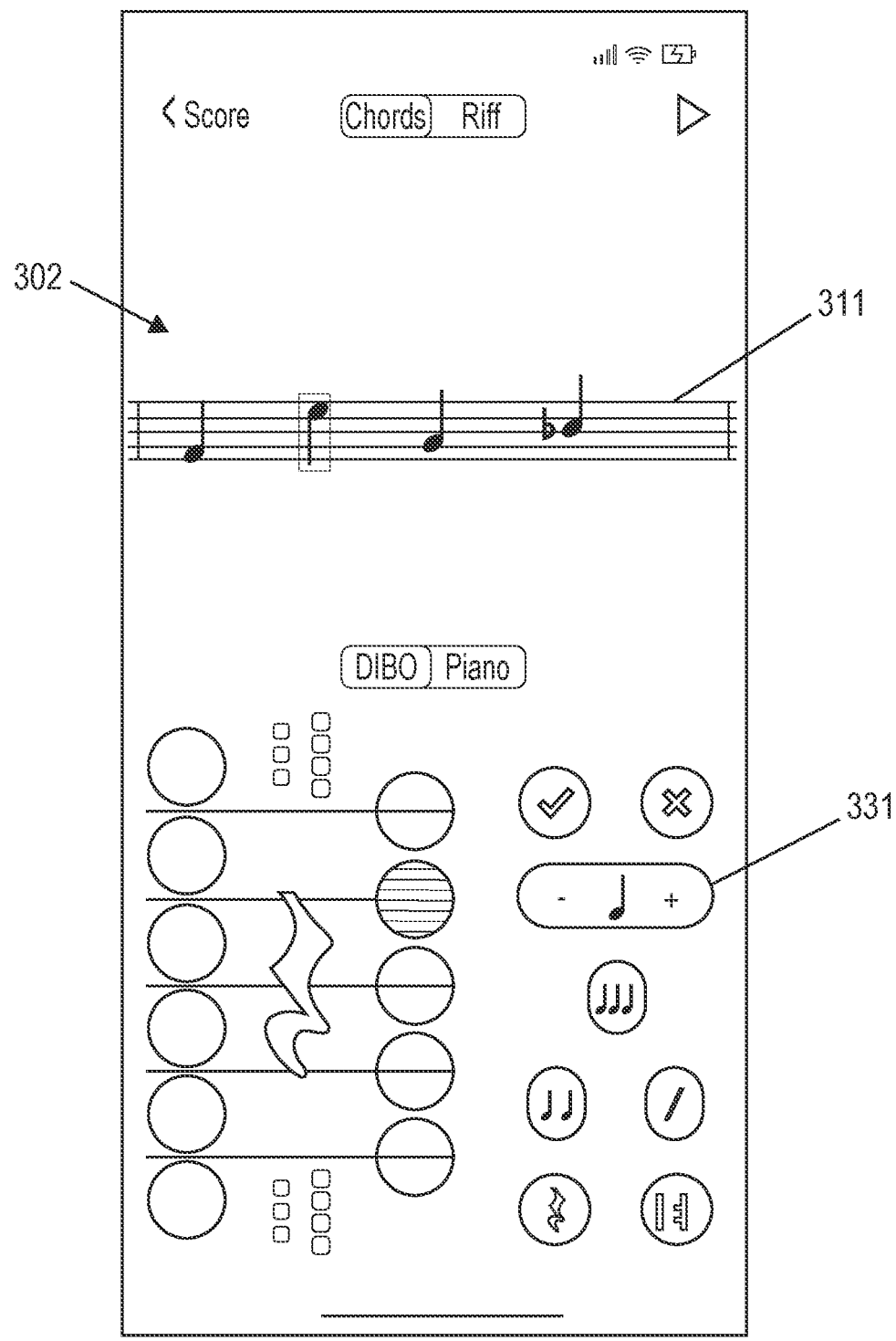
FIG. 14 is an exemplary interface illustrating a measure completion function that may be incorporated into a music composition application according to certain embodiments.

FIG. 14 is an exemplary interface 300 demonstrating a measure completion function 185 that may be executed in the background of the music composition applications 150 according to certain embodiments. As user is defining notations 125 for a measure 302, the measure completion function 185 can be configured to ensure that the time durations associated with the staff notes 301 and/or notations 125 are consistent with a time signature for a digital music composition 120. For example, in some scenarios, the measure completion function 185 can calculate the duration of a measure 302 across all notations 125 included in a measure 302, and limit the time duration of a final note being added to the remaining time available in the measure 302 as defined by the time signature.

In certain embodiments, the measure completion function 185 can cause the duration option 331 to display the remaining time available for a measure. Additionally, or alternatively, the measure completion function 185 can deactivate an increase option (e.g., the plus symbol) on the duration option 331 to prevent additional time from being added to a staff note 301 or notation 125 associated with a measure 302.

In certain embodiments, the confirm option 337 will automatically turn green (or otherwise highlighted) upon completion of a measure 302 (e.g., when there is no available time available for the measure 302). In response to selecting the confirm option 337 (e.g., using a tap gesture and/or other input), the completed measure 302 slides left on the output staff 311 and the next measure 302 appears on the output staff 311.

Figure 15:
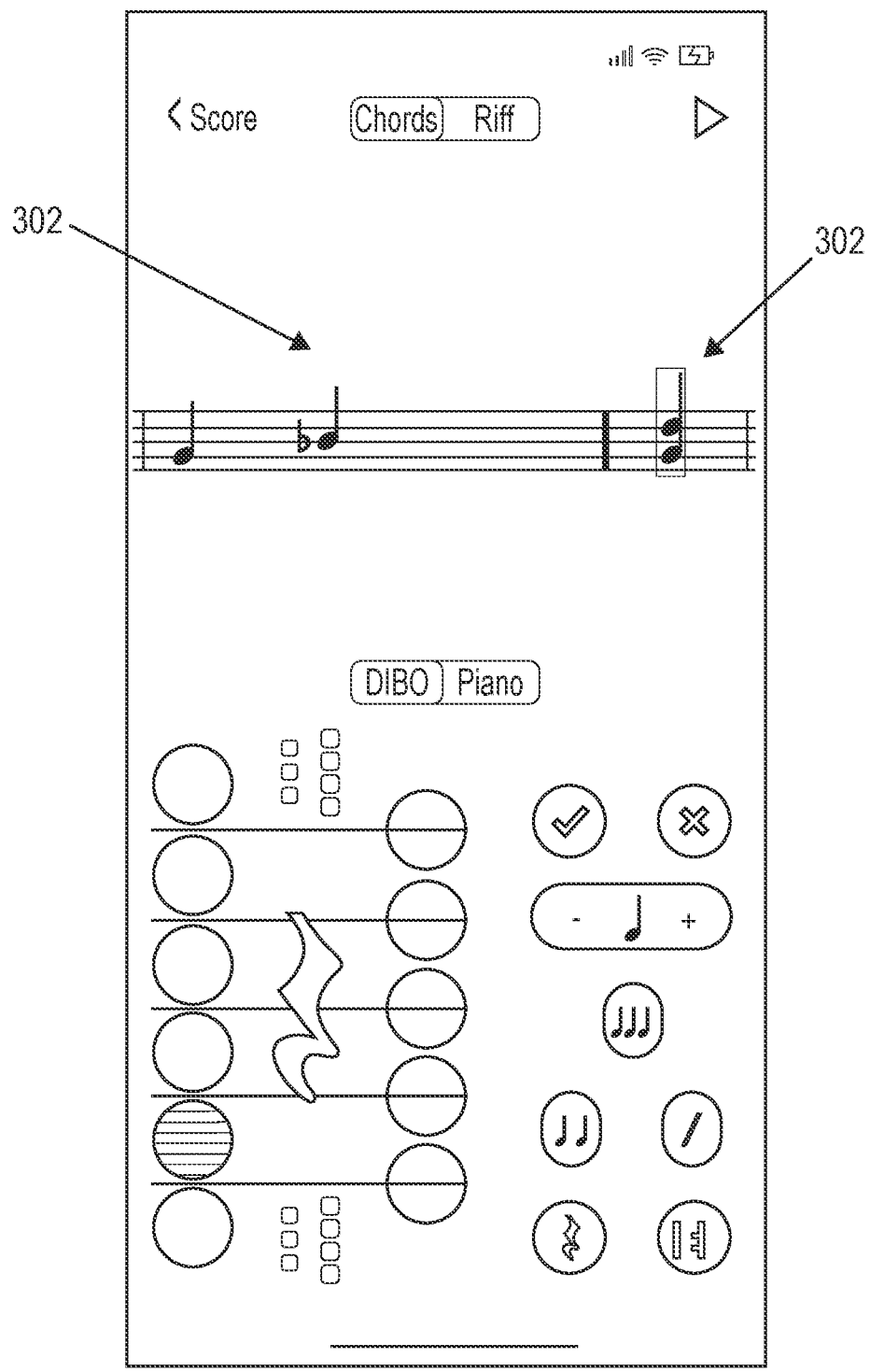
FIG. 15 is an exemplary interface illustrating how a user can navigate and access measures included in a digital music composition according to certain embodiments.

FIG. 15 is an exemplary interface 300 demonstrating how a user can scroll through measures 302 included in a multi-measure music composition 120. In this exemplary interface, a user is scrolling to the left to access a measure 302 located to the right of the current measure.

In certain embodiments, the output staff 311 included in the output staff interface 310 displays a single measure 302 and a time, and a user can perform a gesture 250 (e.g., a swipe or scroll gesture) to access preceding or subsequent measures 302. For example, in some cases, a user may swipe in a first direction (e.g., rightward) to access previous measures 302 and may swipe in a second direction (e.g., leftward) to access subsequent measures 302. If an existing measure does not exist to the right of a current measure 302, a new measure can be created and added to the digital music composition 120.

Figure 20:
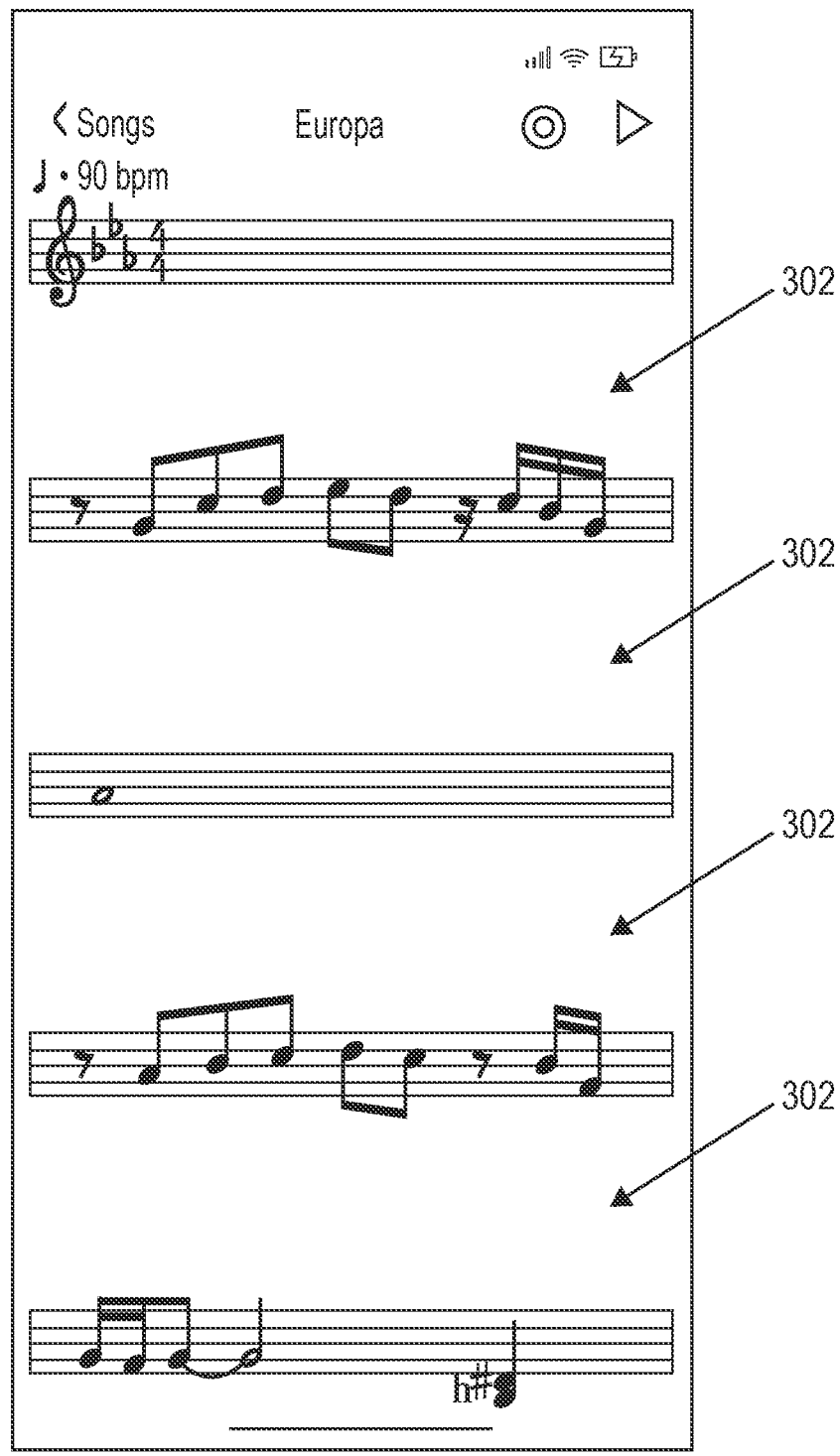
FIG. 20 is an exemplary interface illustrating a multi-measure view mode according to certain embodiments.

Additionally, in certain embodiments, a user may perform another type of gesture 250 (e.g., a vertical swipe or scroll gesture) on the output staff 311 to activate a multi-measure view mode (e.g., as illustrated in FIG. 20). As described in further detail below, the multi-measure view mode presents multiple measures 302 associated with a music composition on an interface 300 in an ordered list for viewing and/or editing.

Thus, similar to the note selection options 321, different types of gestures 250 can be performed on the output staff 311 to activate different functions. For example, a first gesture (e.g., a tap gesture) performed on the output staff 311 can be used to activate notations 125, a second gesture (e.g., a horizontal scroll or swipe gesture) performed on the output staff 311 can be used to access and view the various measures 302 included in the music composition 120, and third gesture (e.g., a vertical scroll or wipe gesture) performed on the output staff 311 can be used to activate the multi-measure view mode. This multi-gesture functionality 199 associated with the output staff 311 serves to compact the options presented on the interfaces 300, which can be particularly useful for scenarios in which the music composition applications 150 are utilized by mobile electronic devices 210 and other types of computing devices 110.

Figure 16:
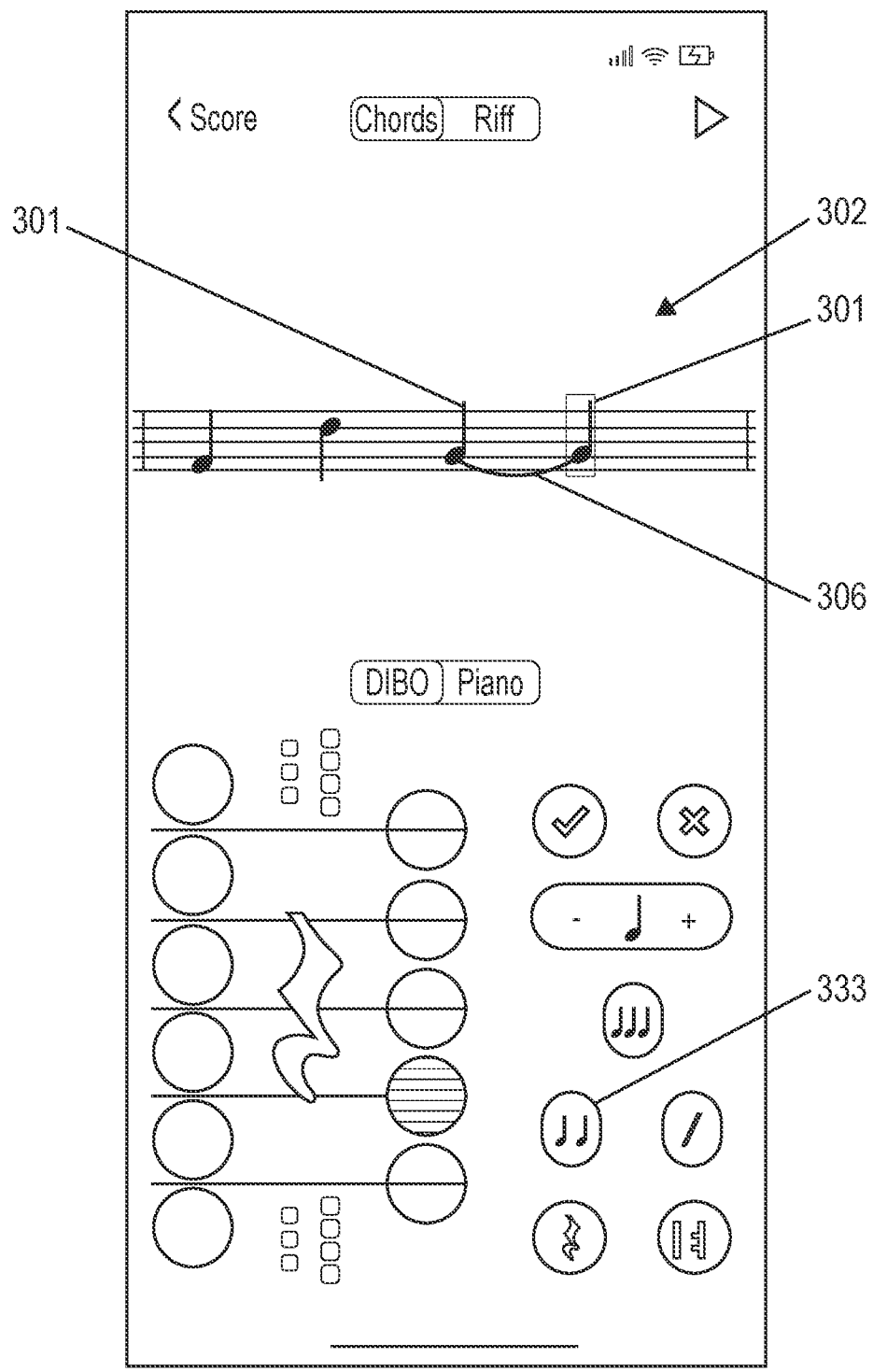
FIG. 16 is an exemplary interface illustrating the functionality of a tie option according to certain embodiments.

FIG. 16 is an exemplary interface 300 illustrating the functionality of the tie option 333 in the actions section 330 according to certain embodiments. The tie option 333 enables users to insert notations 125 for ties 306 between or among notes 301 included in the output staff 311. Generally speaking, a tie 306 can be denoted as a curved line connecting two notes 301 of the same pitch and may be used to indicate that the second note 301 is a continuation of the first note 301.

In certain embodiments, selection of the tie option 333 (e.g., using a tap gesture and/or other input) will duplicate a note 301 that is currently activated or highlighted in the output staff 311, and will insert a tie 306 between the two notes. If desired, a user may individually select and edit each of the staff notes 301 that are connected by a tie 306. Additionally, the tie option 333 can permit ties 306 to be span multiple continuous notes 301 and operate across measures 302.

Figure 17:
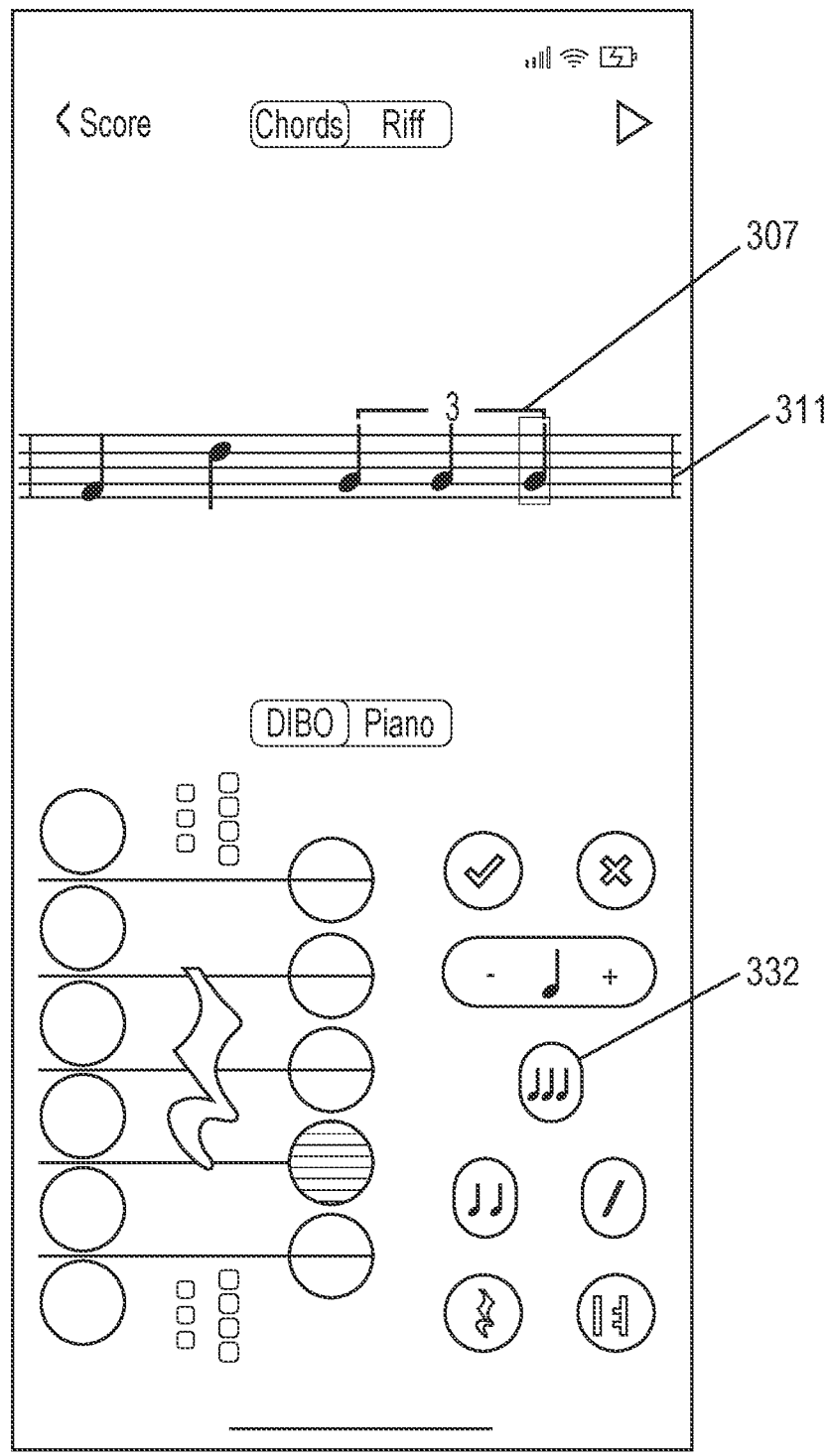
FIG. 17 is an exemplary interface illustrating the functionality of a triplets option according to certain embodiments.

FIG. 17 is an exemplary interface 300 illustrating the functionality of the triplet option 332 included in the actions section 330 according to certain embodiments. The triplet option 332 can be used to add notations 125 for triplets 307 to the output staff 311.

In certain embodiments, selection of the triplet option 332 (e.g., using a tap gesture and/or other input) will replicate a note 301 that is currently activated or highlighted in the output staff 311, and a subscript (labeled "3") will appear above the three notes 301 included in the triplet 307. If desired, a user may individually select and edit each of the notes 301 that are included in the triplet 307. Additionally, the time value of each note 301 belonging to a triplet 307 can be automatically adjusted to what is typically expected of a triplet 307 (e.g., based on traditional music publishing standards). If desired, the user can adjust the time value associated with the notes 301. In some embodiments, deleting a note 301 belonging to a triplet 307 automatically reverts the time value of the remaining time points of the triplet 307.

Figure 18:
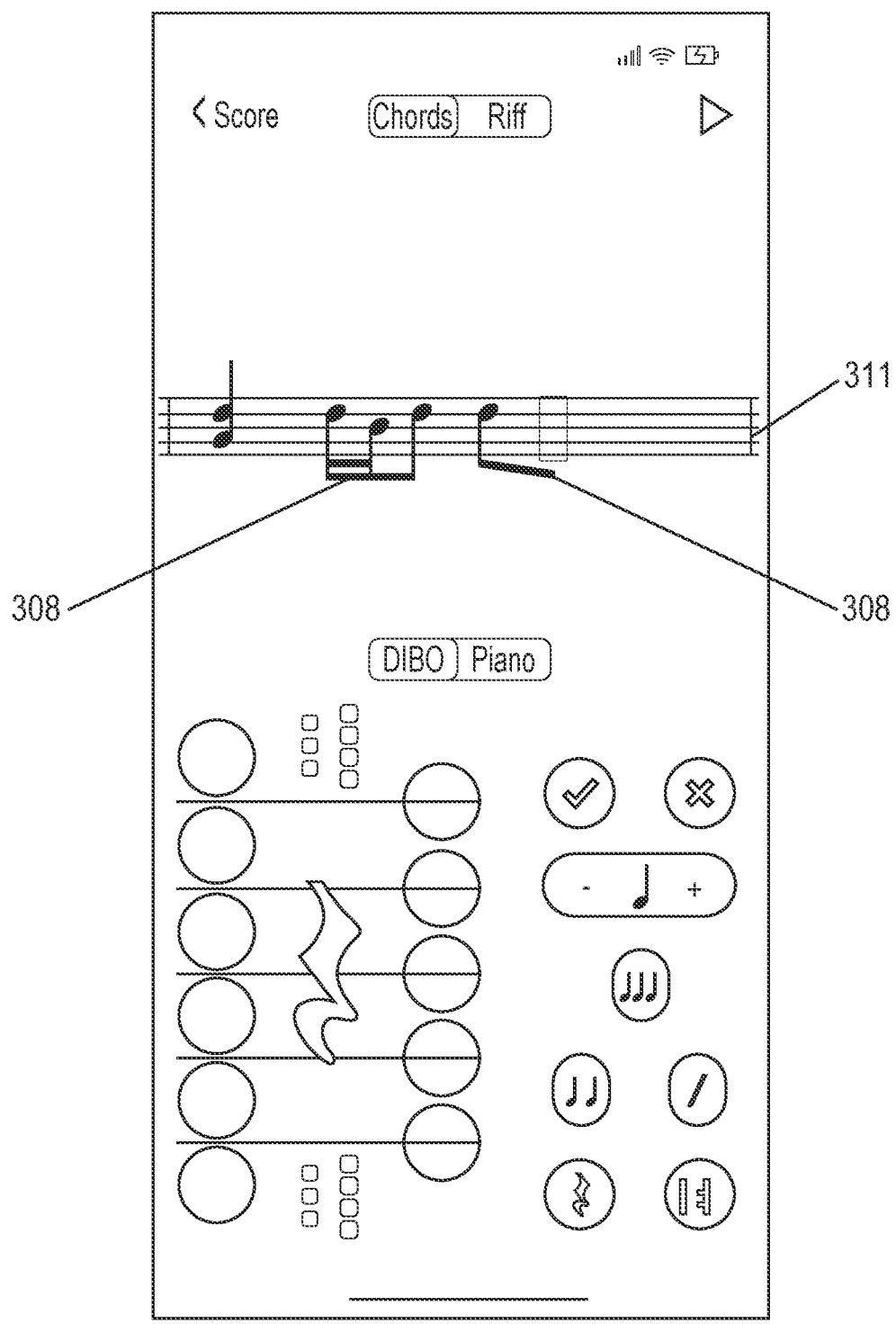
FIG. 18 is an exemplary interface illustrating the functionality of a run insertion function option according to certain embodiments.

FIG. 18 is an exemplary interface 300 illustrating a run insertion function 186 associated with music composition applications 150 according to certain embodiments. A run insertion function 186 may be executed in the background of the music composition applications 150 to insert notations 125 for runs 308 into the output staff 311. Runs 308 representing concatenations of multiple notes 301 can be automatically configured and added to the output staff 311 based on generally accepted music publishing standards. For example, as notes 301 less than a quarter note are entered, the run insertion function 186 can automatically create runs 308 with beams connecting notes 301 that are entered. Runs 308 can be inserted automatically in other scenarios as well.

Figure 19:
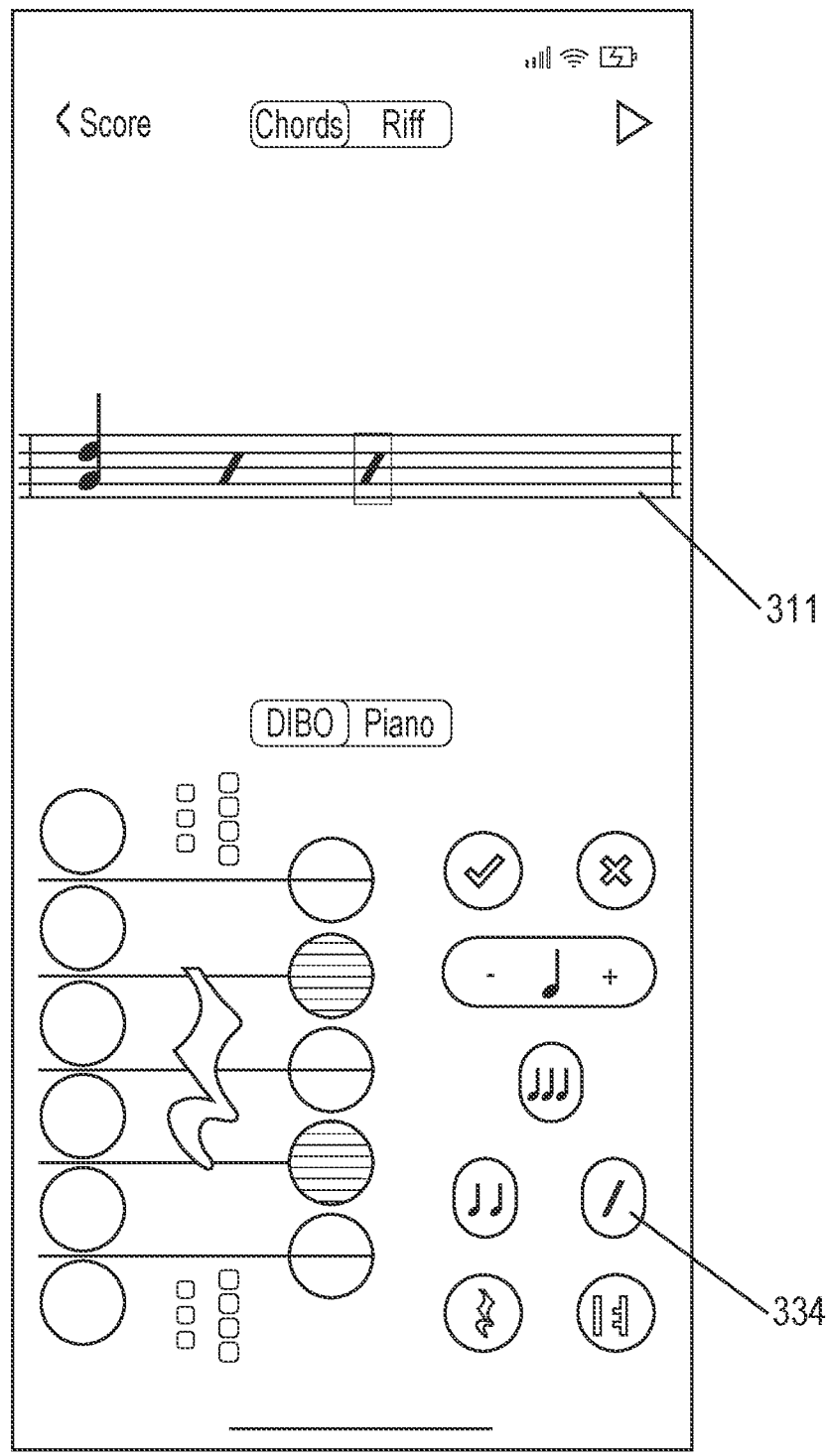
FIG. 19 is an exemplary interface illustrating the functionality of a note repeat option according to certain embodiments.

FIG. 19 is an exemplary interface 300 illustrating the functionality of the note repeat option 334 included in the actions section 330 according to certain embodiments. Selecting the note repeat option 334 enables users to add a notation 125 for a note repeat symbol to the output staff 311.

Figure 33:
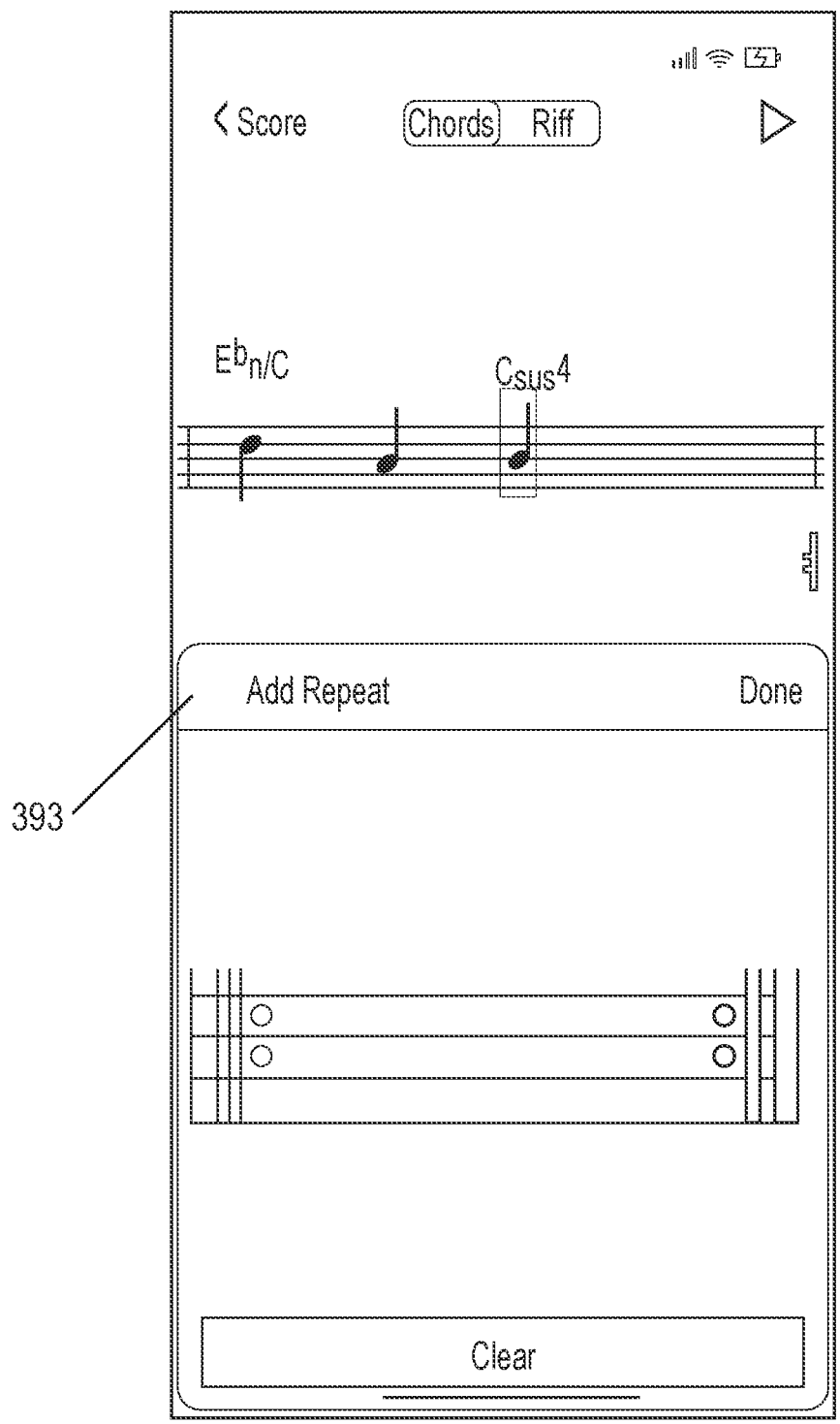
FIG. 33 is an exemplary interface illustrating the functionality of a repeats and ending option according to certain embodiments.

FIG. 33 is an exemplary interface 300 illustrating the functionality of the repeats and ending option 336 according to certain embodiments. The repeats and ending option 336 permits users to add start repeat notations and end repeat notations to the measure 302 and/or musical composition 120 being created or edited. In response to selecting the repeats and ending option 336, a tray or menu 393 may provide a user with options for selecting and inserting the notations 125 corresponding to the start repeats and end repeats. When the user has finalized the selections, the user may select the confirm option 137 to add or append the start repeats and end repeats to the output staff 311.

Figure 37:
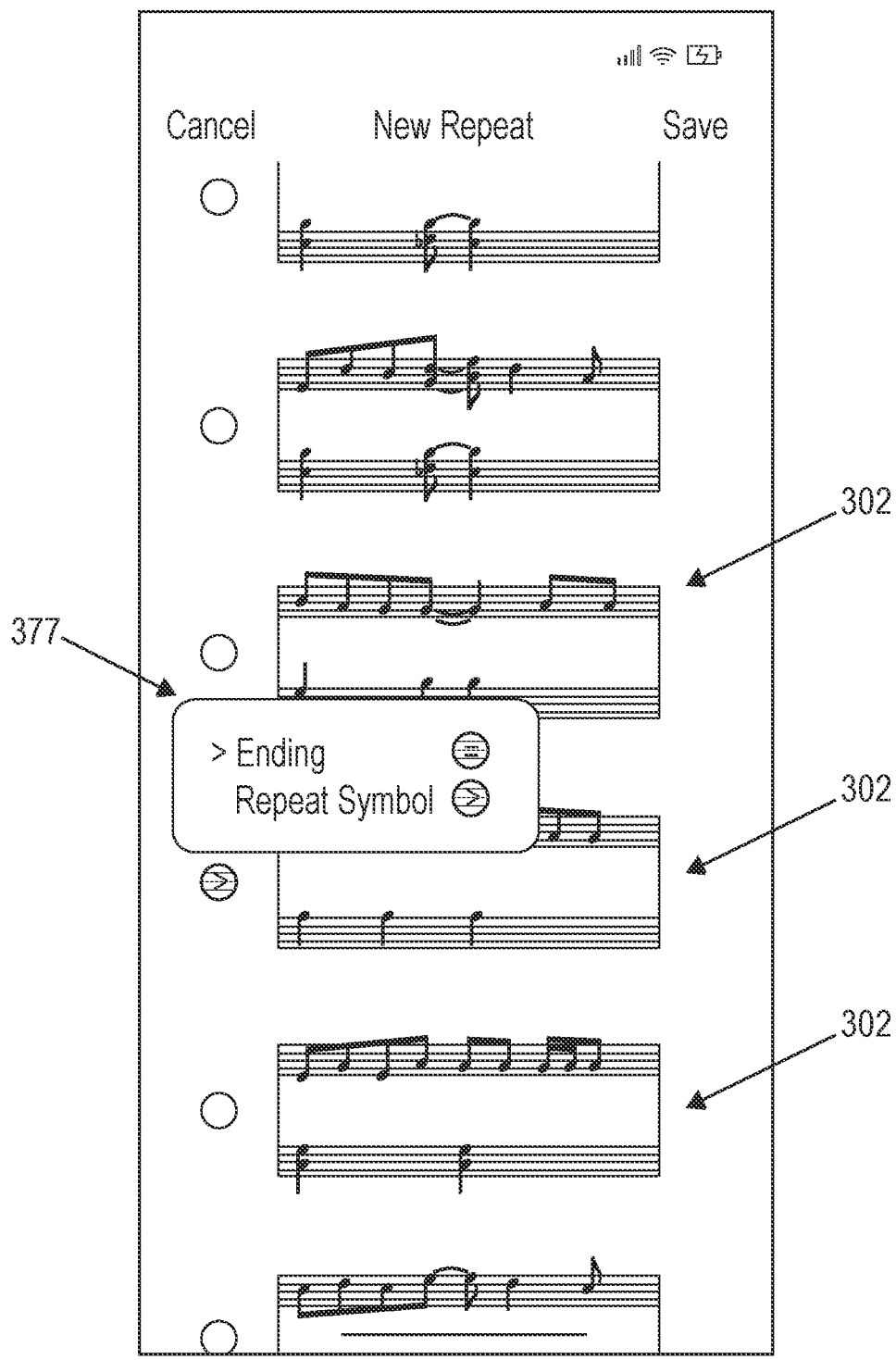
FIG. 37 is an exemplary interface illustrating of a repeats and ending wizard according to certain embodiments.
Figure 38:
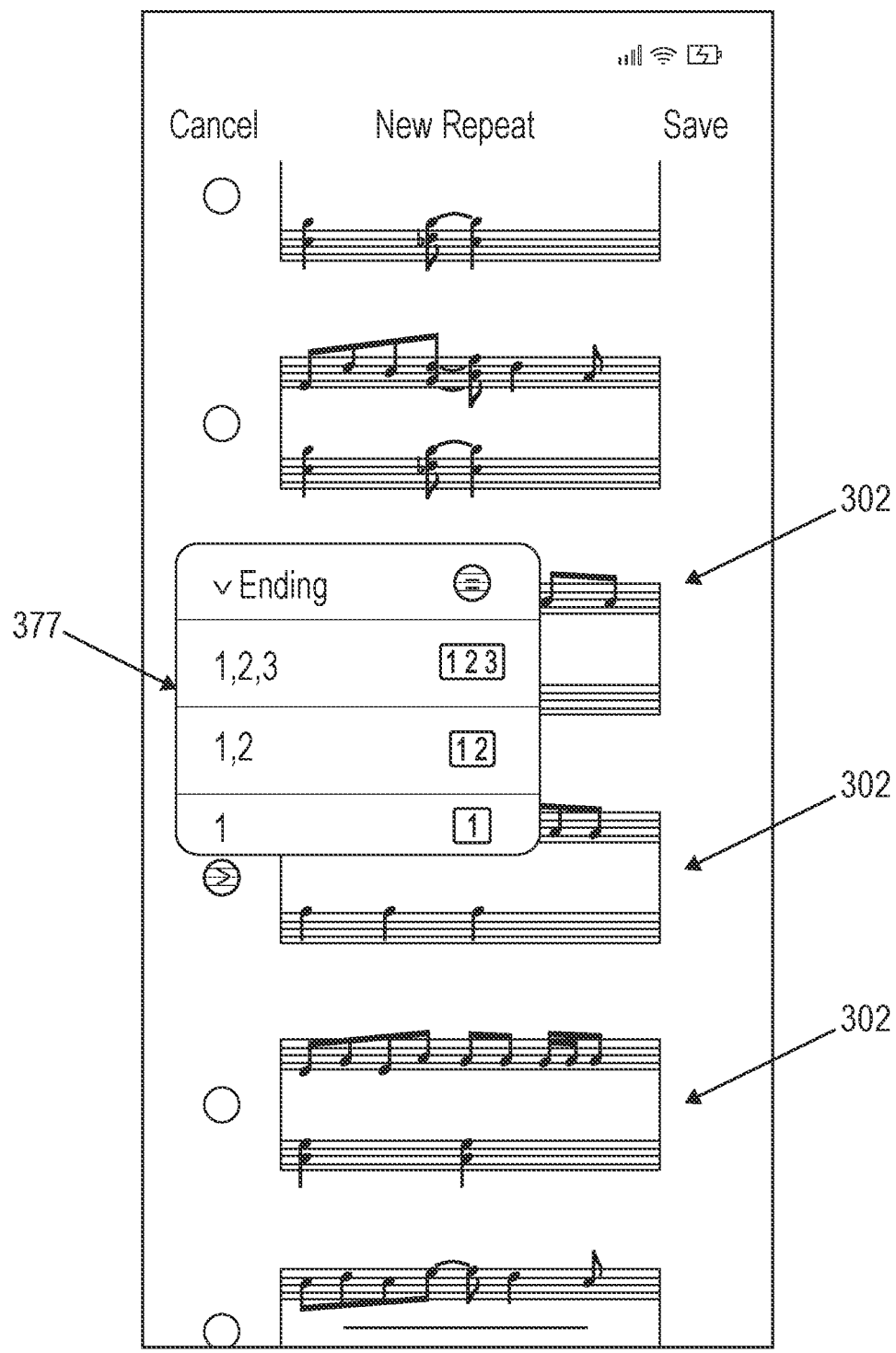
FIG. 38 is an exemplary interface illustrating of a repeats and ending wizard according to certain embodiments.

FIGS. 37 and 38 are exemplary interfaces 300 illustrating a repeats and endings wizard according to certain embodiments. The repeats and endings wizard enables users to easily add or insert repeat and ending notations into a digital music composition 120 (e.g., into selected measures 302 and/or bars) in a manner that minimizes the inputs (e.g., gestures) needed from the user. In certain embodiments, the repeats and endings wizard can automatically calculate or determine possible locations and notations for ending notations in response to a user inserting a repeat notation.

The example illustrated in FIGS. 37 and 38 demonstrates how the repeats and endings wizard can be used to insert repeat and ending notations into a measure 302. In certain embodiments, the repeats and endings wizard can be accessed from a menu that is presented on an interface when the music composition is operated in a multi-measure view mode (described in further detail below), and/or presented on any other interface described herein.

When the repeats and endings wizard is accessed, the measures 302 of a digital music composition 120 may be presented in a listing, and a user may initially select a measure 302 (e.g., via a tap gesture) to add repeat and ending notations. In response to selecting the measure 302, a menu 377 may be displayed with options to define the repeat and ending notations. The menu 377 may include a repeat option and an ending option. Upon selecting the repeat option on the menu 377, a sub-menu menu may be displayed that provides a listing of available repeat notations, and the user can select one of the available repeat notations to be inserted into the measure 302. Similarly, upon selecting the ending option on the menu 377, a sub-menu menu may be displayed that provides a listing of available ending notations, and a user can select one of the available ending notations to be inserted into the measure 302.

In some cases, the repeats and endings wizard may determine one or more intended locations for inserting an ending notation based on the location of where a repeat notation had been inserted. Additionally, in certain embodiments, the repeats and endings wizard also may automatically insert volta brackets where applicable and/or assist the user with inserting volta brackets. In this manner, the repeats and endings wizard allows users to add repeat and ending notations to the measure 302 in a user-friendly manner.

FIG. 26 is an exemplary interface 300 that may be displayed when the music composition applications 150 are configured in a keyboard operational mode according to certain embodiments. In the keyboard operational mode, a digital keyboard 350 replaces the input staff interface 320, and the digital keyboard 350 enables users to add notes 301 and other notations 125 to the output staff 311. For example, the digital keyboard 350 can include a plurality of digital keys 351 spanning the entire range of available notes 301. A user may perform a gesture 250 (e.g., a swipe or scroll gesture) or provide other inputs to scroll and access all available digital keys 351 and corresponding notes. Selection of a digital key 351 included on the digital keyboard 350 can cause a corresponding note 301 (or other notation 125) to be added or appended to the output staff 311.

The actions section 330 is located above the digital keyboard 350 and includes a duration option 331, triplets option 332, tie option 333, note repeat option 334, confirm option 337, and cancel option 338 described throughout this disclosure. Any additional options described in this disclosure also can be displayed and utilized in the keyboard operational mode. The output staff 311 can be located above the actions section 330.

As mentioned above, a user can select (e.g., using a gesture 250 and/or other input) a mode selection option 380 to switch or toggle between the DIBO operational mode 195 and the keyboard operational mode 196. In creating a digital music composition 120, notes 301 and/or other notations 125 can be created and editing using either or both of the operational modes. For example, a user may utilize the input staff interface 320 in the DIBO operational mode 195 to create or edit one or more measures 302 for a digital music composition 120, and then may switch to the keyboard operational mode 196 to create one or more additional measures 302 for the digital music composition 120 using the digital keyboard 350. As explained in other portions of this disclosure, the music composition applications 150 utilize a specially designed data model 170 to store notations 125 for digital music compositions 120, which permits the notations 125 to be compatible across both the DIBO operational mode and the keyboard operational mode.

The entry mode option 340 also permits a user to switch or toggle between a riff entry mode and a chord entry mode. In the keyboard operational mode, a user can rapidly add single or individual notes 301 to the output staff 311 in the riff entry by selecting corresponding digital keys 351 on the digital keyboard 350. Each time a digital key 351 is selected, the cursor on the output staff 311 may automatically advance to the next time point in the measure 302 (e.g., without requiring a user to select the confirm option 337). In some embodiments, a user may be permitted to adjust the duration of notes 301 in the riff mode, but some or all of the other options presented in the actions section 330 may be disabled.

In the chord entry mode, a user can access more granular functionalities and customization options provided on the interface 300 (e.g., all of the options included in the actions section 330). Additionally, the digital keyboard may be utilized to add chords 303 to the output staff 311. For example, in the chord entry mode, a user can select multiple digital keys 351 and those keys will remain highlighted on the digital keyboard 350. After the user has selected all of the desired digital keys 351 to be included in the chord 303, the user may then select the confirm option 337 to append the specified chord 303 to the output staff 311. A user can switch or transition to the riff entry mode to rapidly enter individual notes 301 when desired, and can switch or transition back to the chord entry mode when more granular control and customization is desired.

FIGS. 20-25 are exemplary interfaces 300 that may be presented in connection with a multi-measure view mode 197 of the music compositions applications according to certain embodiments. As mentioned above, in some cases, a user may perform a gesture 250 (e.g., a vertical swipe or scroll gesture) on the output staff 311 to activate, or navigate to, the multi-measure view mode 197 (e.g., in either the DIBO operational mode or keyboard operational mode).

In the multi-measure view mode 197, a user can view multiple measures 302 of a musical composition 120 on the interface 300. In many cases, the measures 302 may be presented in an ordered listed based on the order in which they occur in the music composition 120. Users may utilize swipe gestures, scroll gestures, and/or other inputs to scroll (e.g., up and down) or view all of the measures 302 included in the musical composition 120.

In certain embodiments, users may utilize different gestures 250 to manipulate and interact with the measures 302 displayed in the multi-measure view mode 197. For example, in some cases, performing a first gesture (e.g., a tap gesture) on a measure 302 can cause a transition to the DIBO operational 196 mode and allow the user to edit the selected measure. Performing a second gesture (e.g., a tap and hold gesture) can cause a measure action sheet view (e.g., as illustrated in FIGS. 21-23) to appear which presents the user with various options for editing the measure 302 and/or music composition 120.

Figure 21:
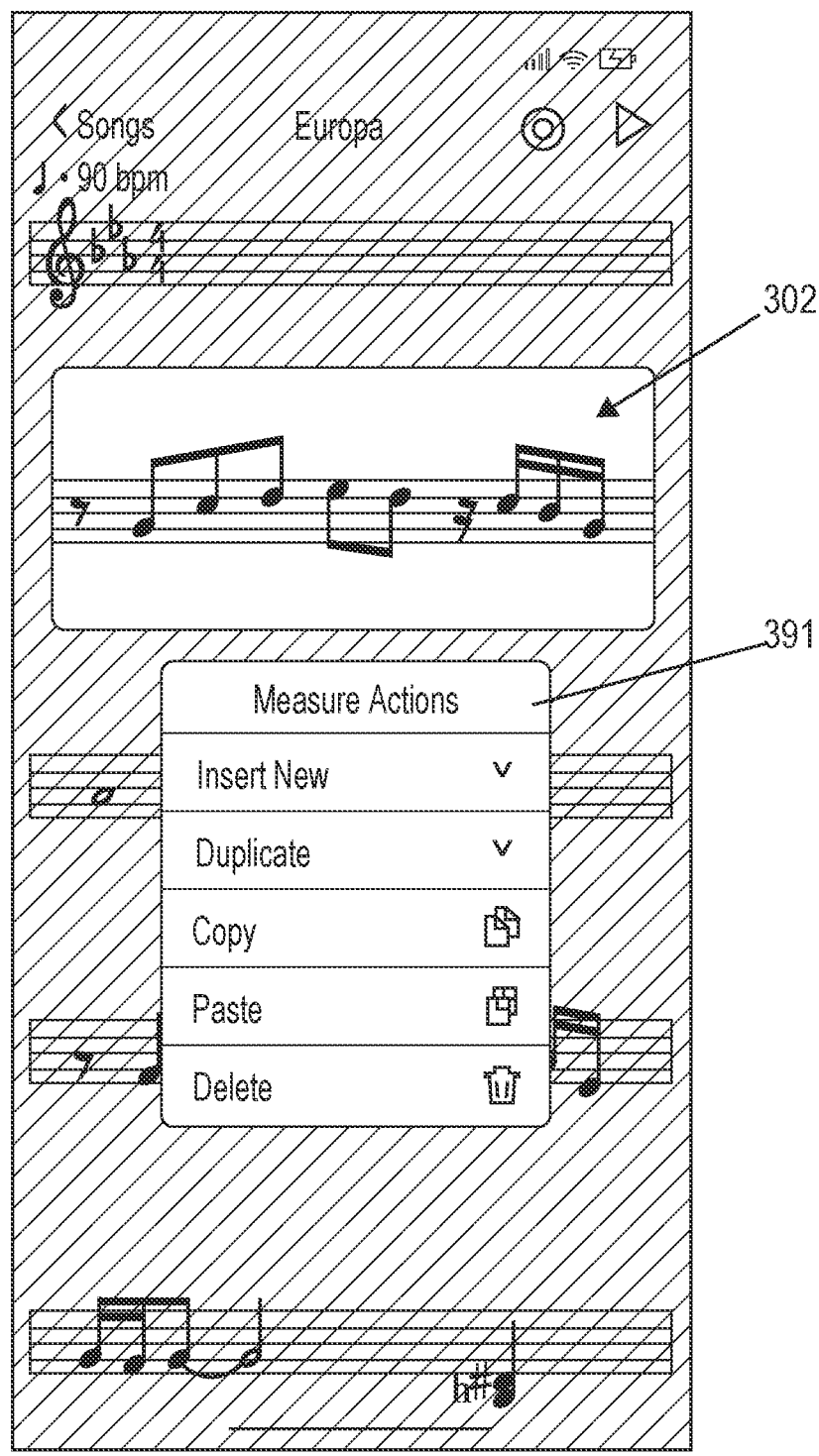
FIG. 21 is an exemplary interface illustrating a menu that may be displayed in the multi-measure view mode according to certain embodiments.

For example, as shown in FIG. 21, the measure action sheet view can display the measure along with a menu 391 that includes editing options. The editing options presented on the menu 391 can enable the music composition 120 to be edited at the measure level. The menu 391 may include options for copying the selected measure 302 (e.g., copying to a virtual clipboard), duplicating the selected measure 302, pasting or appending a measure 302 that was previously copied, and/or deleting the selected measure 302. The menu 391 can include other measure level editing options as well (e.g., such as a paste over option that deletes the selected measure 302 and replaces the selected measure with a previously copied measure 302).

Figure 22:
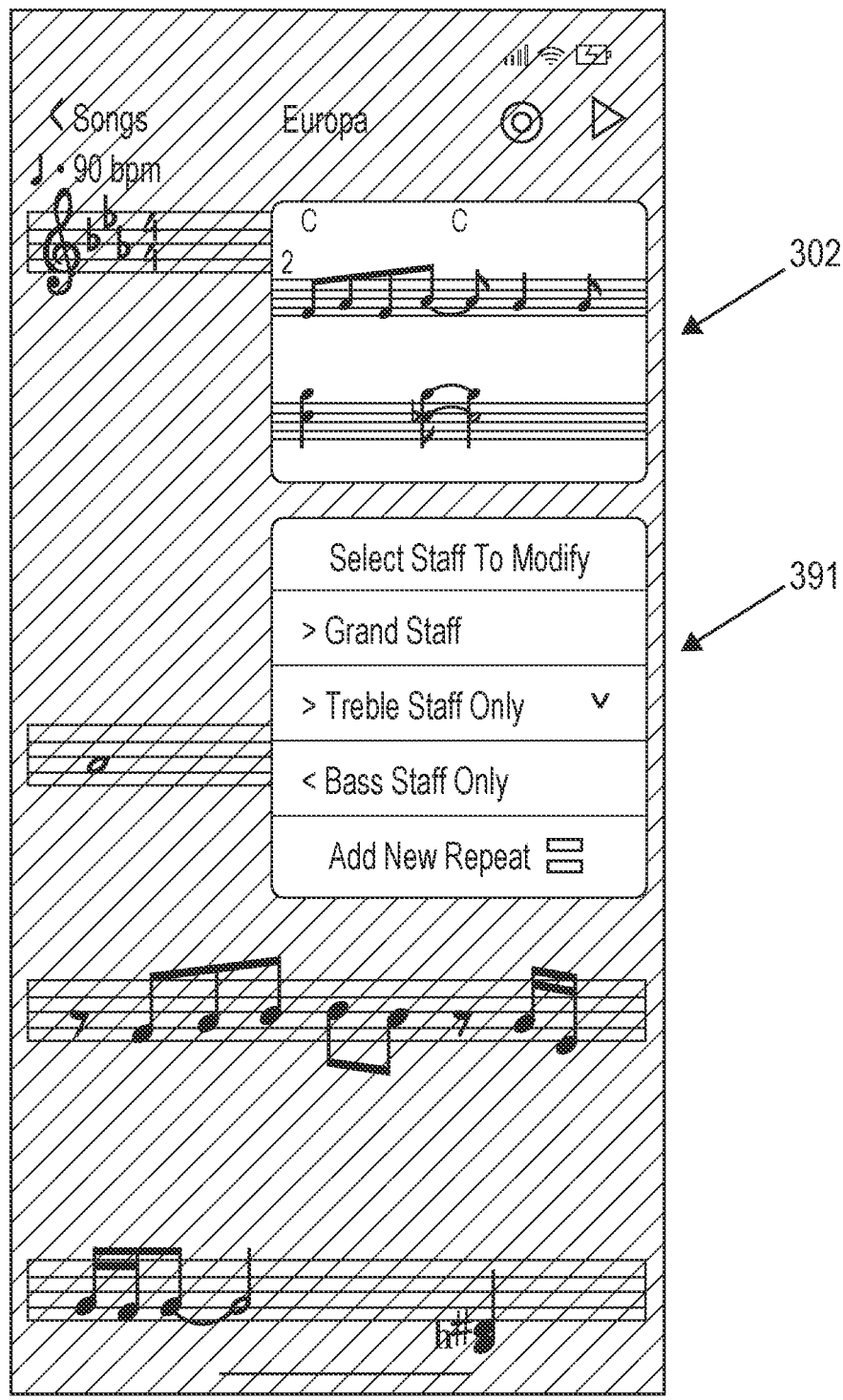
FIG. 22 is an exemplary interface illustrating another menu that may be displayed in the multi-measure view mode according to certain embodiments.
Figure 23:
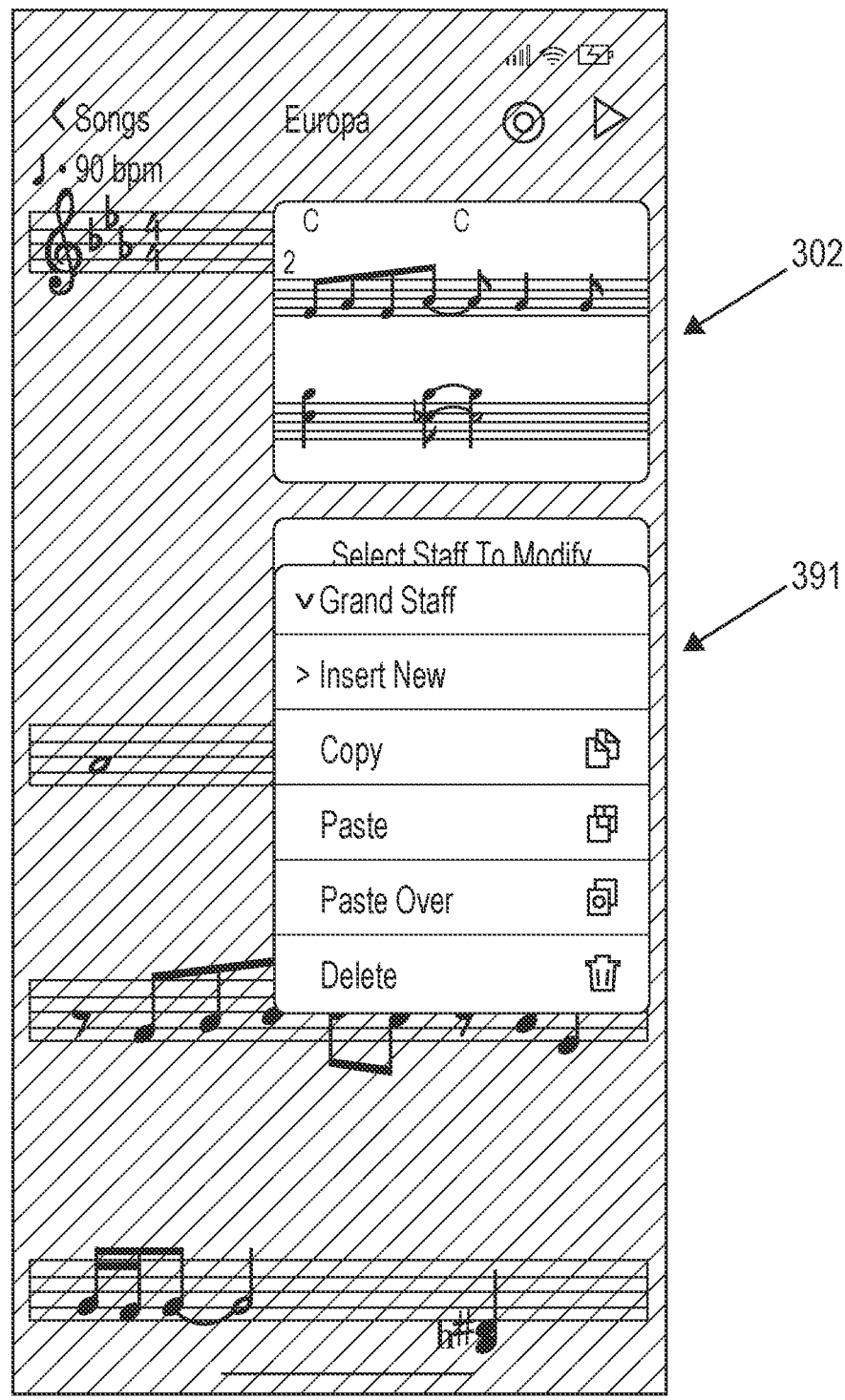
FIG. 23 is an exemplary interface illustrating another menu that may be displayed in the multi-measure view mode according to certain embodiments.

FIGS. 22 and 23 illustrate another exemplary measure action sheet view that displays the measure 302 along with a menu 391 of editing options. In this example, the menu 391 initially displays options for editing a treble staff of a selected measure 302, a bass staff of the selected measure 302, and/or a grand staff of the selected measure 302 (e.g., which can enable editing of both the treble staff and the bass staff). As shown in FIG. 23, upon selecting one of the options included in the menu 391, the user may be presented with options for copying, duplicating, pasting, pasting over, and/or deleting the staff, or pair of staves, corresponding to the selected option.

Figure 24:
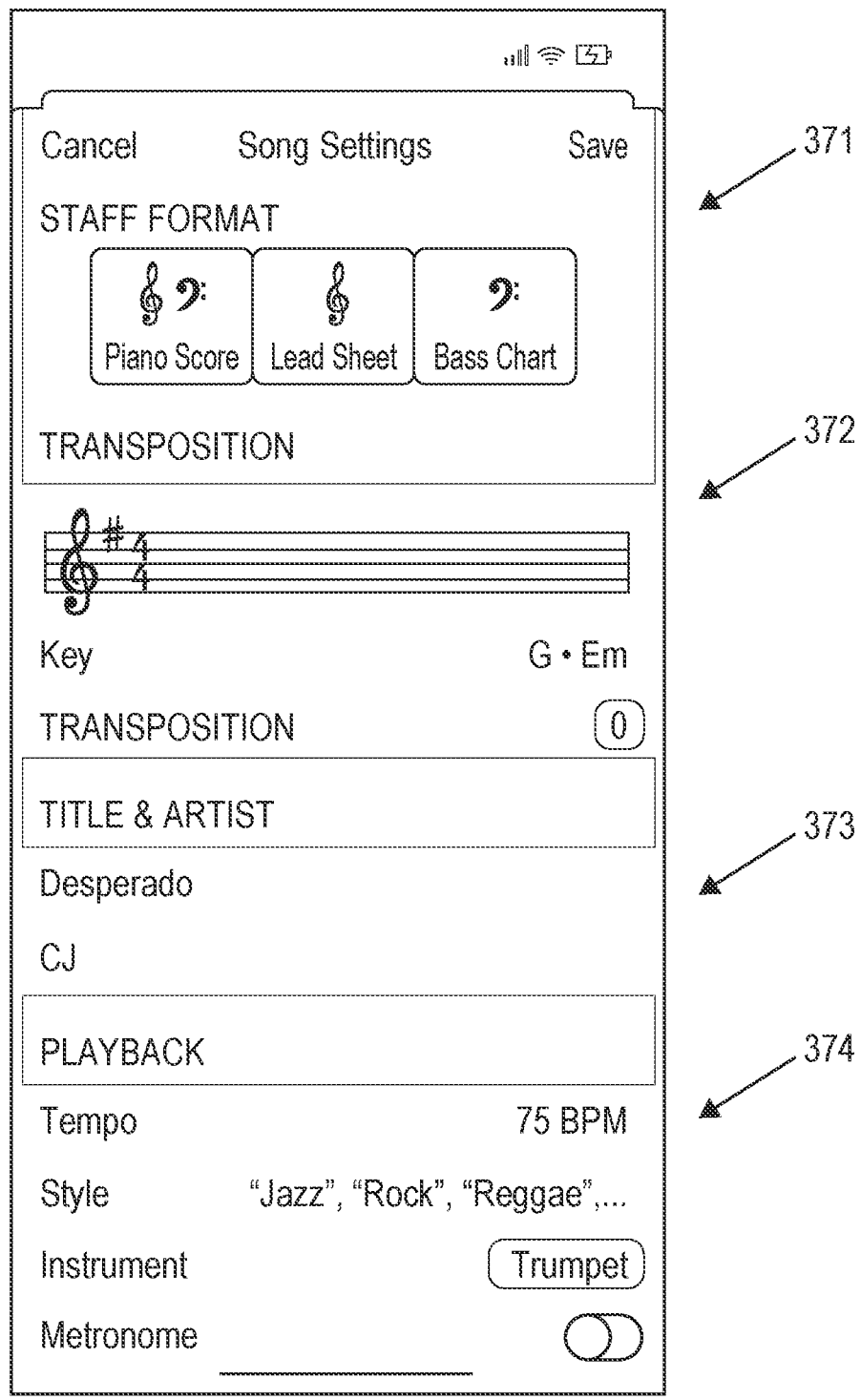
FIG. 24 is an exemplary interface that enables configurations and settings associated with a music composition to be configured according to certain embodiments.

FIG. 24 illustrates another exemplary interface 300 that permits a user to configure the settings associated with a digital music composition 120. The interface 300 can include a staff format section 371, a transposition section 372, a title and artist section 373, and a playback section 374.

The staff format section 371 permits a user to configure the presentation or arrangement of a staff (or staves) for a digital music composition 120. For example, when a digital music composition 120 is viewed in a multi-measure view mode 197, the music composition 120 will be displayed in accordance with the staff format option selected in the staff format section 371. The data model 170 stores notations 125 for a digital music composition 120 in manner that enables the staff format, and notations included thereof, to be adapted according to the staff format option that is selected.

In this example, the staff format section 371 includes a piano score option, a lead sheet option, and a bass chart option. In some cases, the staff format section 371 can include other options as well. When a piano score option is selected, a digital music composition 120 can be displayed on a grand staff (e.g., comprising both a treble staff and bass staff) along with all corresponding notations. When the lead sheet option is selected, a digital music composition 120 can be displayed in a lead sheet format, which includes an abbreviated form of notations featuring certain core musical information. For example, in the lead sheet format, a treble staff of the digital music composition 120 may be displayed with a subset of notations (e.g., such as chords and melodic notations), while omitting the bass staff and certain notations (e.g., instrumentation and/or form notations) on the treble staff. When the bass chart option is selected, only the bass staff of a digital music composition 120 may be displayed with corresponding notations 120. The data model 170 described herein stores the notations 125 in a manner that enables the music composition applications 150 to easily transition the format and display of the digital music composition 120 in multi-measure view mode based on the piano score option, lead sheet option, and bass chart option.

The transposition section 372 enables a user to transpose the digital music composition 120 into a different key and/or change the pitch of the digital music composition 120. The title and artist section 373 enables a user to specify the title and author of the music composition. The playback section 374 enables a user to configure how the digital music composition 120, or portion thereof, is output or played (e.g., in response to selecting an audio mode option 395). Options are included that enable a user to customize the tempo, style (e.g., jazz, rock, reggae, etc.), and instrument (e.g., piano, trumpet, guitar, etc.) of a digital music composition 120 that is output or played back. A metronome option also can be activated, which outputs a steady pulse during playback.

Figure 25:
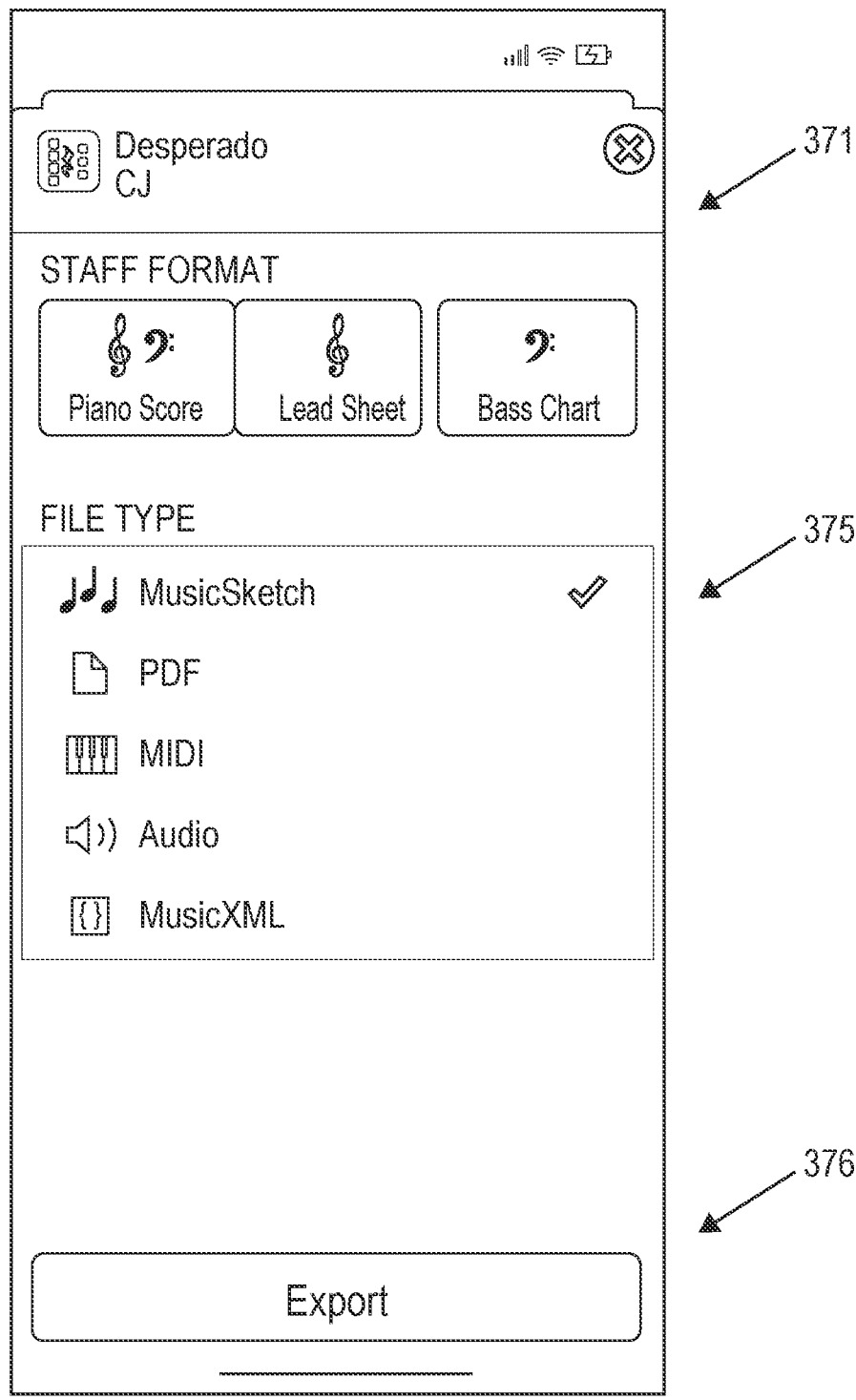
FIG. 25 is an exemplary interface that permits a user to configure settings for exporting a music composition according to certain embodiments.
Figure 26:
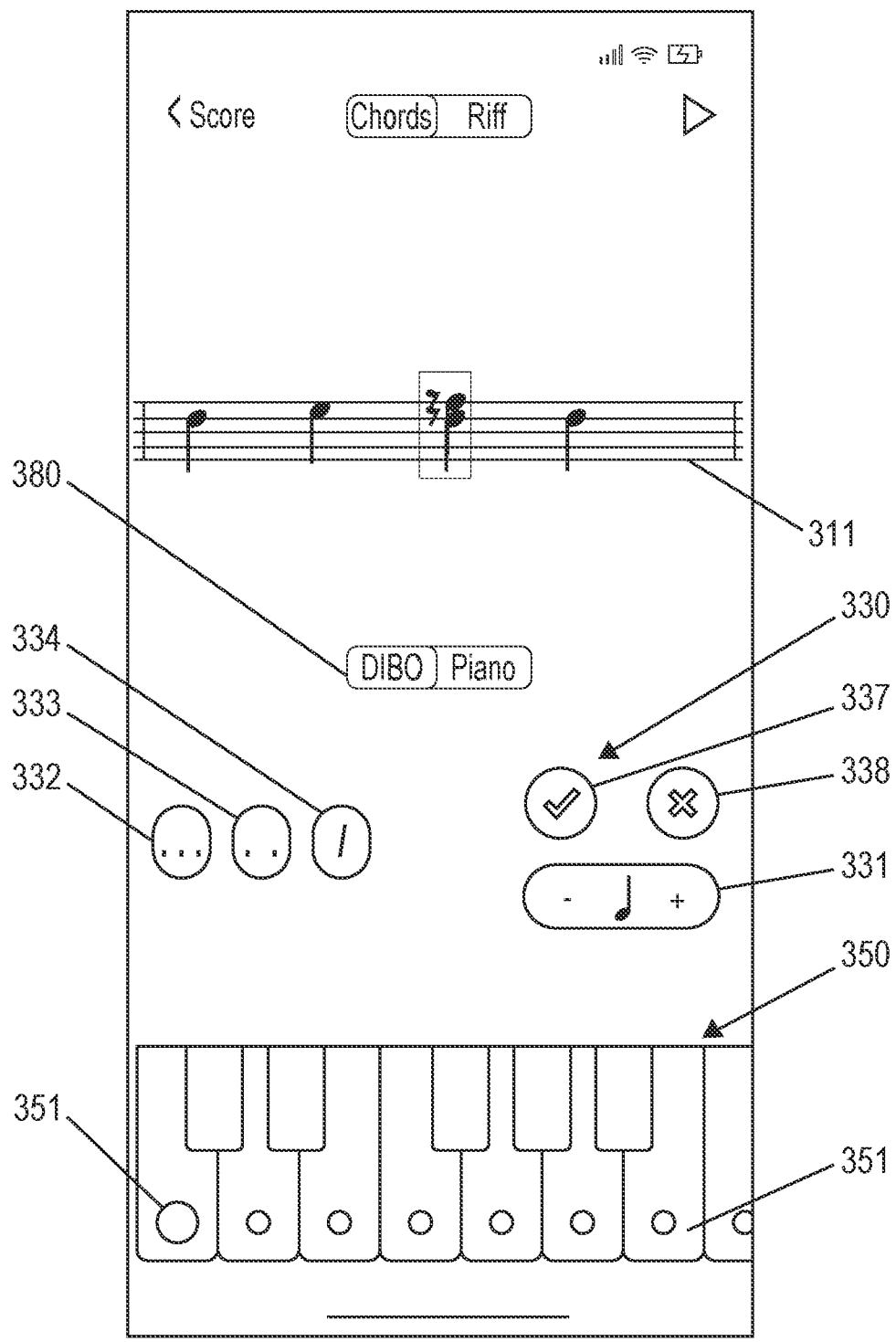
FIG. 26 is an exemplary interface that may be displayed when a music composition application is configured in a keyboard operational mode according to certain embodiments.

FIG. 25 illustrates another exemplary interface 300 that permits a user to export a digital music composition 120. The interface 300 includes a staff format section 371, a file type section 375, and an export option 376.

The staff format section 371 includes the same options described above (e.g., a piano score option, a lead sheet option, and a bass chart option), and enables the user to customize the staff format of the file being generated and/or exported. Selection of the piano score option permits a user to specify that the digital music composition 120 is to be output on a grand staff (e.g., comprising both a treble staff and bass staff) along with all corresponding notations. Selection of the lead sheet option permits a user to specify that the digital music composition 120 is to be output in a lead sheet format that includes an abbreviated form of notations. Selection of the bass chart option permits a user to specify that only the bass staff of the digital music composition 120 is to be output in the file that is being generated and/or exported.

The file type section 375 permits a user to specify a format of the file to be exported. The user can select a first option that enables the digital music composition 120 and corresponding notations 125 to be stored in a custom format (e.g., in accordance with the data model 170 described herein) that is used by music composition application 150. The digital music composition 120 can be exported to other formats as well, including, but not limited to, a portable document format (PDF), a musical instrument digital interface (MIDI) format, an audio file format, a MusicXML format, and/or other formats.

After customizing and selecting the options presented in the staff format section 371 and file type section 375, the export option 376 can be selected to export a file according to the selected parameters or preferences.

Figure 27:
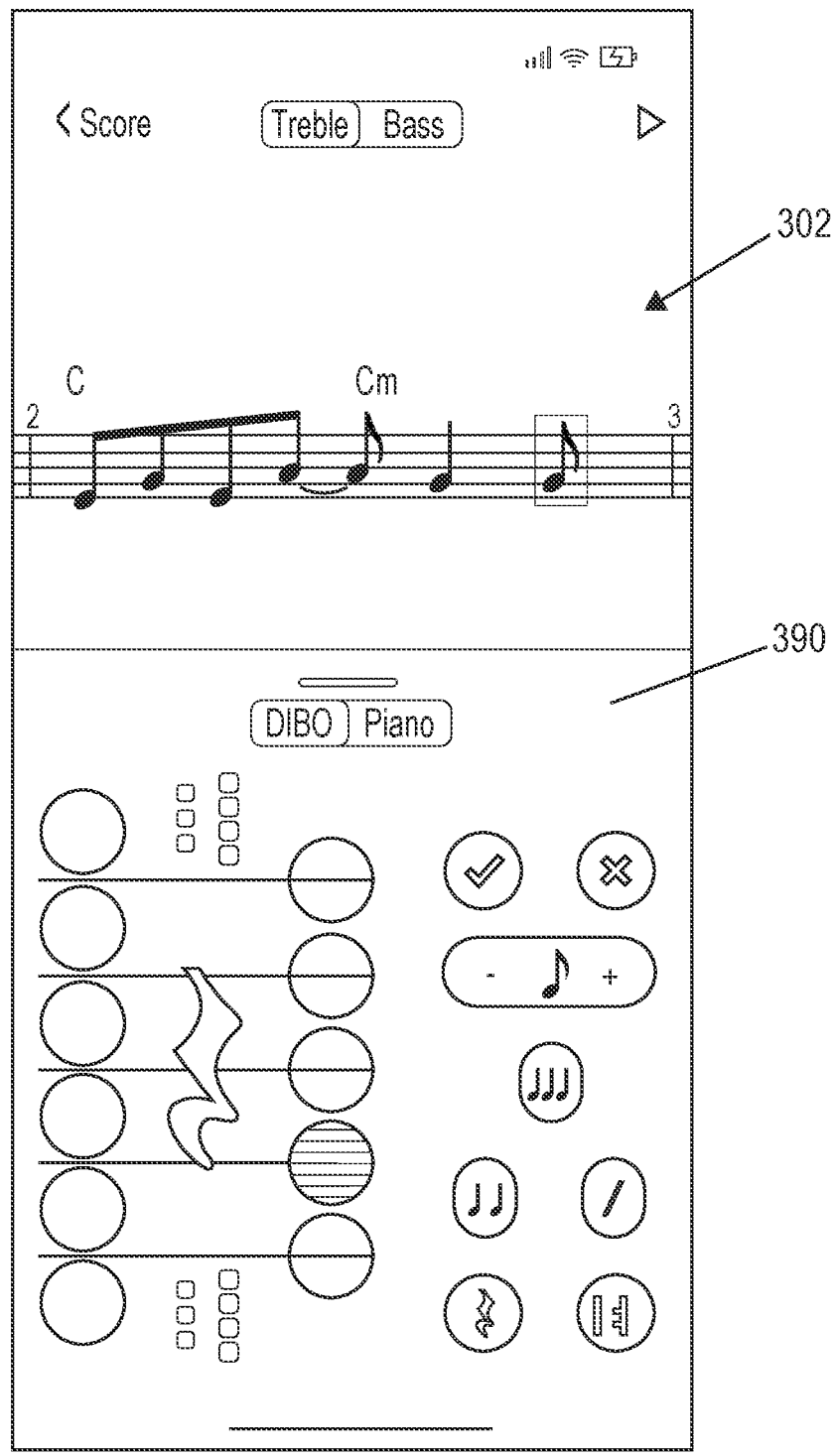
FIG. 27 is an exemplary interface illustrating an editor interface tray that may be displayed when a music composition application is operating in a multi-measure view mode according to certain embodiments.
Figure 28:
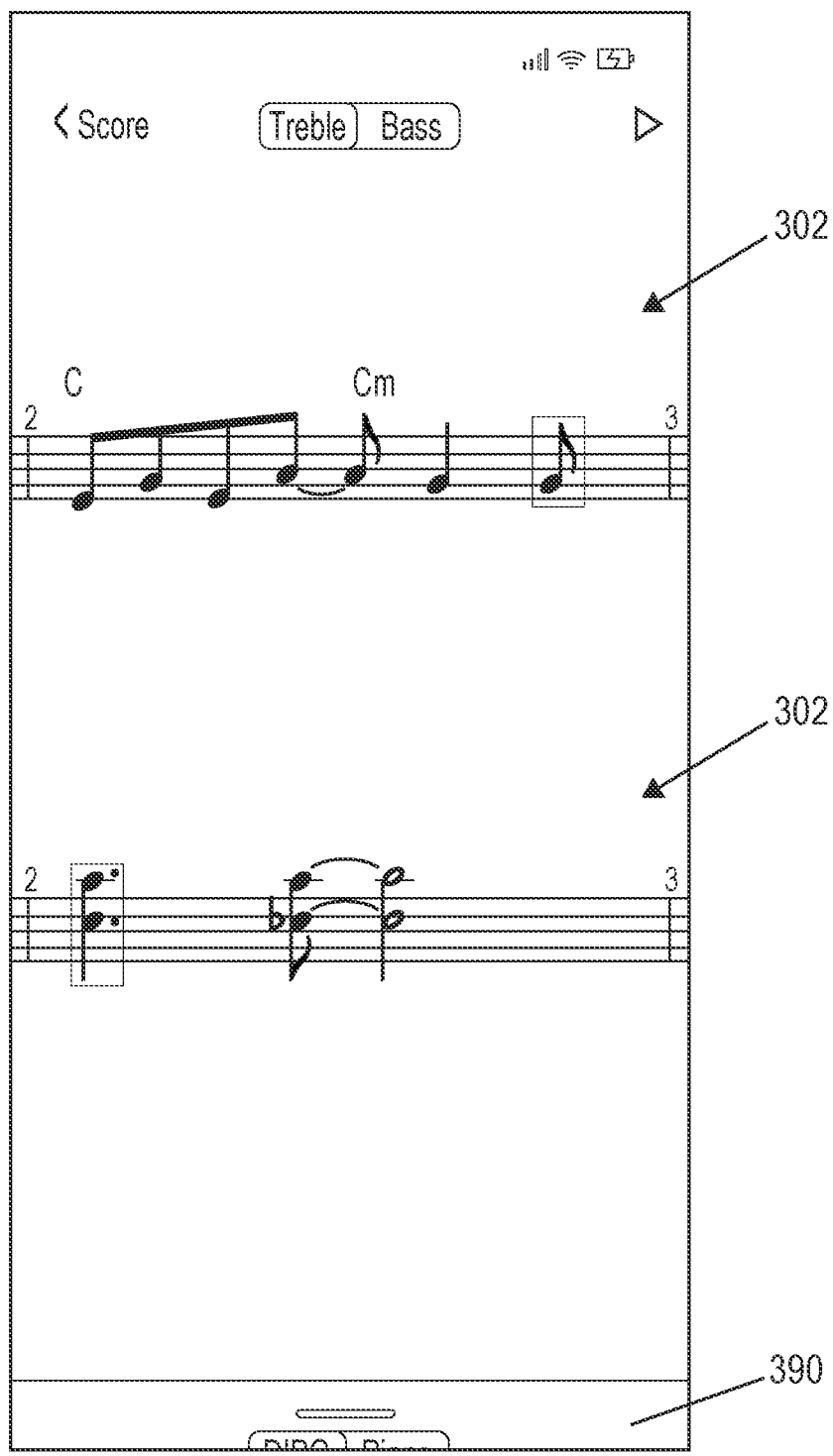
FIG. 28 is an exemplary interface illustrating an editor interface tray that may be displayed when a music composition application is operating in a multi-measure view mode according to certain embodiments.

FIGS. 27 and 28 illustrate an exemplary editor interface tray 390 that can be expanded and retracted when a music composition application 150 is configured in a multi-measure view mode 197 according to certain embodiments. FIG. 27 illustrates the editor interface tray 390 in an expanded position, and FIG. 28 illustrates the editor interface tray 390 in a retracted position. The expandable and retractable functionality of the editor interface tray 390 can be particularly beneficial in scenarios where a music composition application is executed on a mobile electronic device 210 and/or other computing device 110 that has a limited display screen size.

The editor interface tray 390 can permit the functionalities associated with the DIBO operational mode 195 and keyboard operation mode 196 to be accessed when the music composition application 150 is operated in a multi-measure view mode 197. For example, the editor interface tray 390 can display the input staff 322 and/or the digital keyboard 350 to allow users to add, delete and/or edit individual notations 125 included in the measures 302 that are displayed in a multi-measure view mode. The editor interface tray 390 also can display some or all of the options included in the actions section 330.

In one example, a user may vertically scroll (e.g., using a swipe or scroll gesture) in the multi-measure view mode to a desired measure 302, and select (e.g., using a tap gesture)

a notation 125 (e.g., a note, rest, chord, etc.) included in the measure 302. The user may then utilize the input staff 322, digital keyboard 350, and/or action section options included in the editor interface tray 390 to edit the selected notation 125, or to add additional notations 125. When the user is done editing the selected measure 302, the user may hide or retract the editor interface tray 390 (e.g., by performing a downward swipe gesture and/or using another input).

FIGS. 29 and 30 disclose an alternative interface layout for the DIBO operational mode 195. FIGS. 31 and 32 disclose alternative layouts for interfaces 300 that is configured in the keyboard operational mode. In FIGS. 29-32, the chord option 335 and repeats and ending option 336 are presented on a menu with the mode selection options 380 (e.g., which enable switching to the DIBO and keyboard operational modes). Additionally, in this embodiment, the entry mode option 340 is presented as a single option that can be activated and deactivated when desired to switch between the riff entry and chord entry modes described above.

Figure 34:
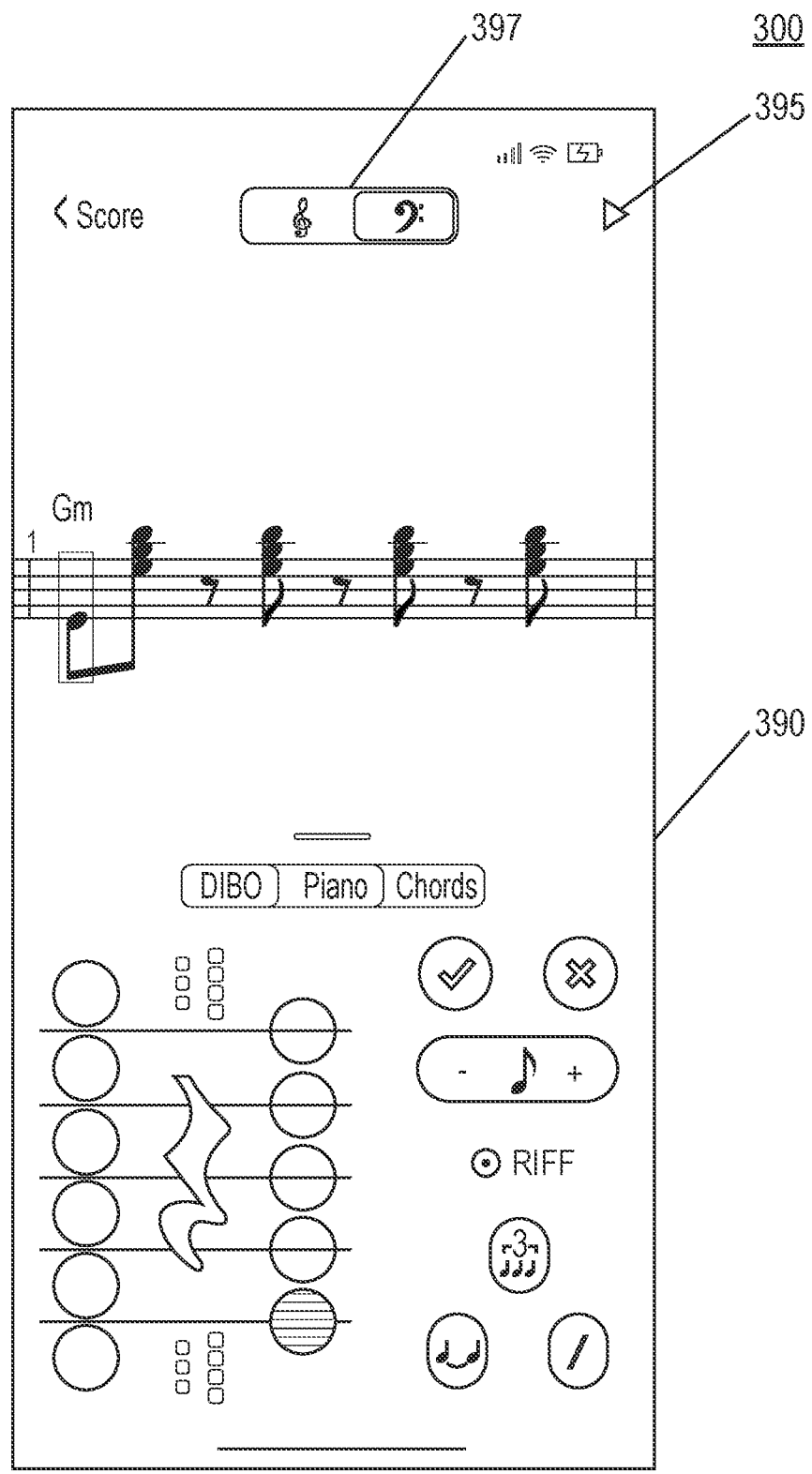
FIG. 34 is an exemplary interface illustrating the functionality of a stave switching option according to certain embodiments.
Figure 35:
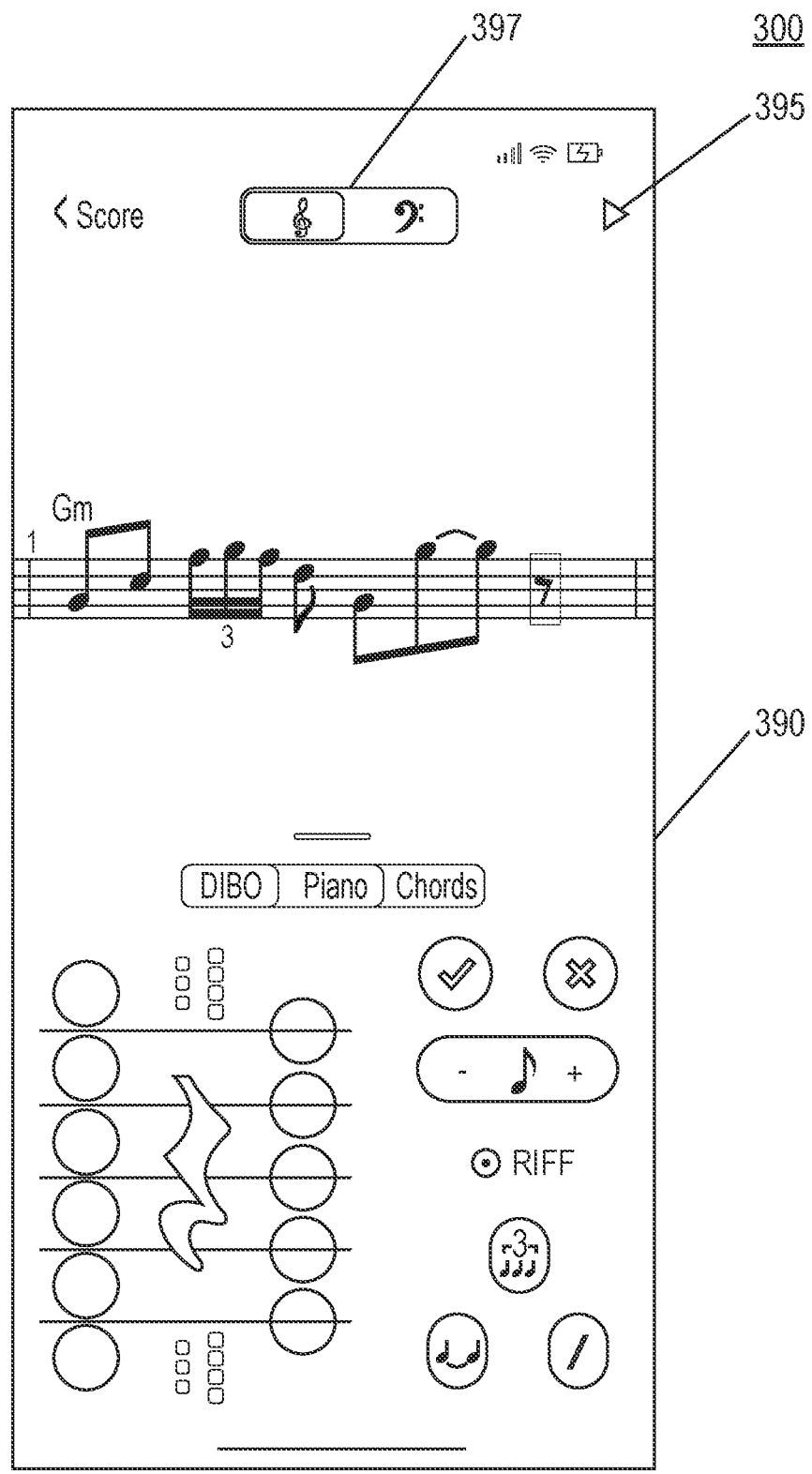
FIG. 35 is another exemplary interface illustrating the functionality of the stave switching option according to certain embodiments.
Figure 36:
FIG. 36 is another exemplary interface illustrating the functionality of the stave switching option according to certain embodiments.

FIGS. 34-36 illustrate the functionality of a stave switching option 397 according to certain embodiments. The stave switching option 397 permits users to easily switch or toggle between or among different staves included a digital musical composition 120. The stave switching option 397 can be incorporated into any of the interfaces described herein. In this example, the stave switching option 397 is incorporated onto an interface that is generated when a music composition application 150 is configured in a DIBO operational mode, and the input staff interface 320 and action section 330 are included in an editor interface tray 390 that can be collapsed and expanded.

In many cases, sheet music can group together or include two or more staves that are intended to be played or output simultaneously. For example, the sheet music may display a first stave in the treble clef and second stave in the bass clef above one another, and notes included in the same columns of both staves may be intended to be played or output simultaneously. The stave switching option 397 can enable users to quickly and easily switch between the staves for viewing and/or editing.

In FIG. 36, the editor interface tray 390 is in a retracted position and a user is able to view a pair of staves, one of which is in the treble clef and the other of which is in the bass clef. In FIGS. 34 and 35, the editor interface tray 390 is in an expanded position and only one of the staves is visible. The user can select the stave switching option 397 to toggle between the treble clef stave (FIG. 34) and the bass clef stave (FIG. 35).

The user may select the audio output option 395 to listen to all or a portion of the digital music composition 120. The music composition application 150 can output the digital music composition 120 such that notes in the same columns across grouped staves are output simultaneously. Additionally, music composition application 150 can permit users to specify that only one of the staves should be output via audio. In either scenario, the music composition application 150 can determine and generate appropriate audio signals 194 that enable the digital music composition 120 (and corresponding notes) to be output via an audio device 115.

As discussed briefly above, the music composition applications 150 can include a data model 170 that facilitates the storage of staff notes 301, notations 125, and/or other components of music compositions 120 in a particular format. The data model 170 permits the notes and/or other notations to be accessed and compatible across various operational modes (e.g., such as the DIBO operational mode 195, keyboard operational mode 196, and multi-measure view mode 197). Additionally, the data model 170 enables the music composition applications 150 to precisely determine an appropriate pitch to be played when the digital music compositions 120 are output or played back (e.g., via audio devices 115). The data model 170 enables further enables users to adjust the sizes of notations to allow for easy viewing of the notations. Further details and benefits of exemplary data models 170 that can be utilized by the music composition applications 150 are described in further detail below.

Figure 39:
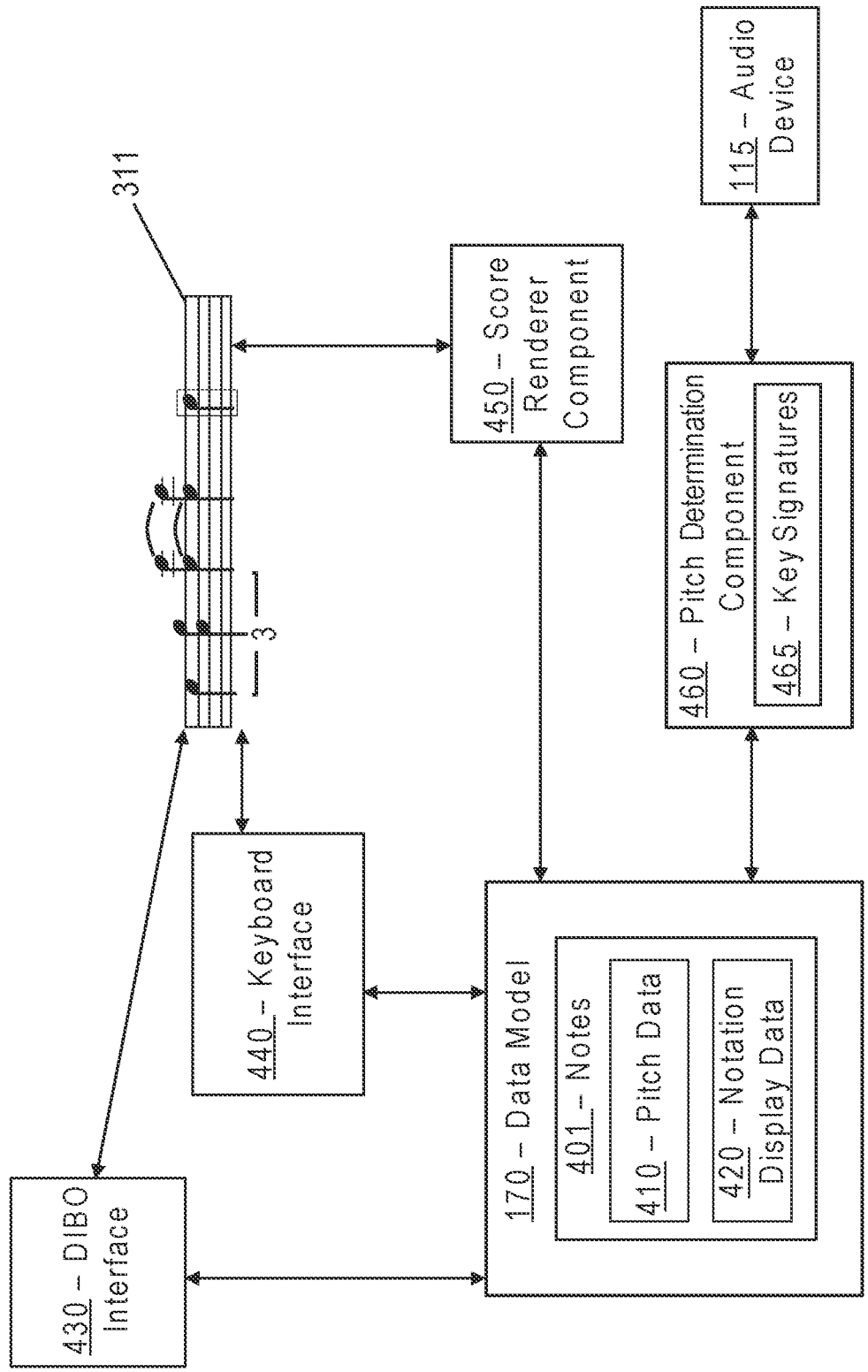
FIG. 39 is a block diagram illustrating exemplary components of a music composition application according to certain embodiments.

As illustrated in FIG. 39, inputs or selections (e.g., made using gestures 250 or other inputs) for defining staff notes 301 and/or other notations 125 may be specified via a DIBO interface 430 (e.g., which includes a input staff interface 320) and/or a keyboard interface 440 (e.g., which includes a digital keyboard 350).

The data model 170 can utilize a data structure to store information pertaining for each staff note 301. Each staff note 301 included in a digital music composition 120 can correspond to a single time point for the digital music composition 120, and each staff note 301 can comprise a single note or multiple notes (e.g., in the case of a chord 303).

The data structure for a staff note 301 can store pitch data 410 and/or notation display data 420 associated with the staff note 301. The notation display data 420 can represent the underlying data that is used to determine how a staff note 301 is visually displayed or rendered on the output staff 311. The pitch data 410 can include data that represents the actual sound that corresponds to the staff note 301 (e.g., when the staff note 301 is output or played via an audio device 115) and/or the underlying data and functions that are utilized to determine the sound for the staff note 301 (e.g., the hertz value or frequency of the audio pitch).

By separating the data used to determine how the staff note 301 is displayed from particular sound of the staff note 301, the data model 170 enables the staff notes 301 to be used across both the DIBO operational mode 195 and keyboard operational mode 196. This separation of the pitch data 410 and the notation display data 420 overcomes technical problems associated with how the pitches 410 of staff notes 301 are determined in different operational modes. For example, in the keyboard operational mode 196, each digital key 351 can unambiguously indicate a corresponding pitch 410 (e.g., frequency) that is to be associated with a staff note 301 that is added to the output staff 311. However, in the DIBO operational mode 195, the music composition application 150 operates as an editor that permits defining and editing of staff notes 301 (and other notations 125). When staff notes 301 are defined in the DIBO operation mode, the appropriate pitch 410 of a staff note 301 can vary based on accidentals that are applied to the staff note 301, as well as the context and key signature of the staff note 301 within a corresponding music composition, score and/or measure. Thus, separating the notation display data 420 from the pitch 410 enables staff notes 301 created in one operational mode to be accessed and utilized in the other operational mode, and allows the music composition applications 150 to accurately output the staff notes 301 with their corresponding pitches 410.

In the DIBO operational mode 195, the notation display data 420 can be used to display the staff notes 301 on the output staff 311. Each of the note selection options 321 and rest options can be mapped to a particular key type (or key letter) and a particular octave. For example, in certain embodiments, the data model 170 can represent each note selection option 321 (and corresponding staff note 301) using a first integer value (e.g., 0, 1, 2, . . . N) that corresponds to a musical key type (C, D, E, F, G, A, B) and a second integer value that corresponds to an octave associated with the staff note 301. In some scenarios (e.g., in which note selection options 321 correspond to keys of an electronic keyboard instrument), the first integer values may be within a range 0-25, where each musical key type across three octaves is represented by a value between 1-25 and rests are represented by a value 0. Larger or smaller ranges of values can be used for mapping the note selection options 321 to other instruments (e.g., 0-88 can be used for mapping to a piano).

In certain embodiments, the notation display data 420 can store data for staff notes 301 (and/or other notations) in a manner that enables users to increase or decrease the size of the staff notes 301 and/or notations. This ability to adjust the size of the notations can be particularly useful to accommodate users who may be visually impaired or have limited eyesight. In some scenarios, the music composition applications 150 can include accessibility options that allow the users to manipulate and adjust the sizes of the notes and/or other notations that are displayed on interfaces.

In some embodiments, the notation display data 420 can store data indicating Bezier curves that are used to display or represent the note heads associated with staff notes 301. This permits the sizes of the note heads and staff notes to be scaled according to user preferences. For example, in response to a user specifying a size preference (e.g., small, normal, large, etc.) via an accessibility option, the Bezier curves can be adjusted accordingly to increase or decrease the sizes of the note heads and corresponding staff notes. The sizes of the other notations associated with the digital music composition also can be scaled accordingly.

Figure 40C:
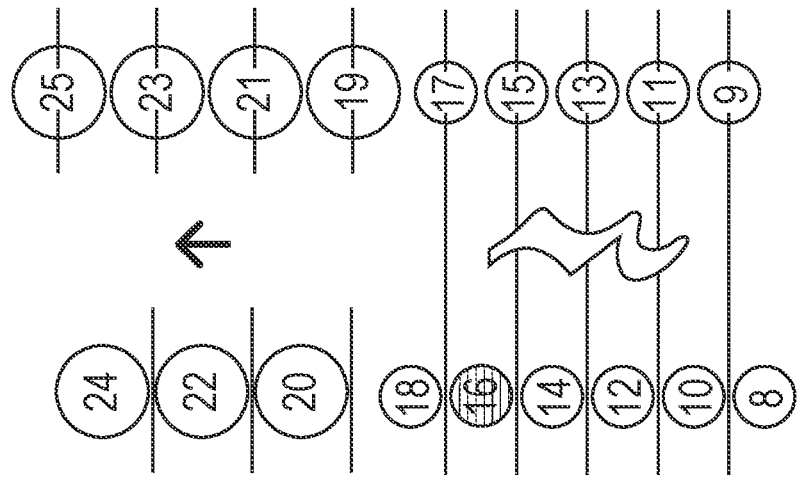
FIG. 40C illustrates exemplary values that can be assigned to note selection options in accordance with a data model for a music composition application according to certain embodiments.
Figure 40B:
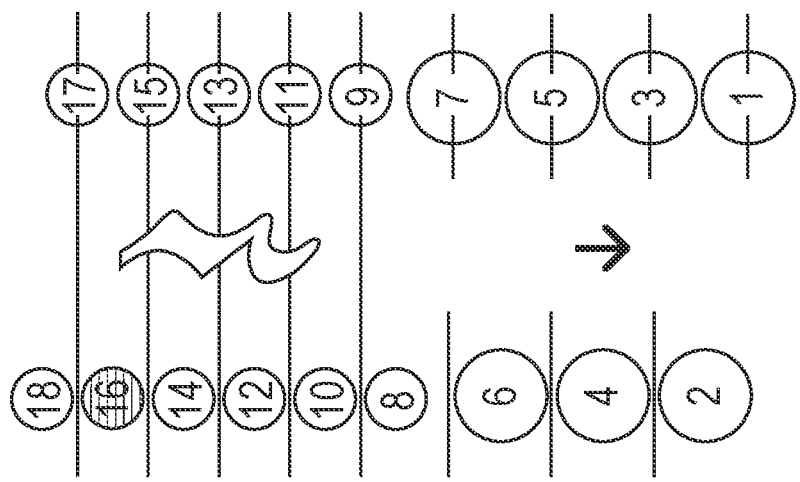
FIG. 40B illustrates exemplary values that can be assigned to note selection options in accordance with a data model for a music composition application according to certain embodiments.
Figure 40A:
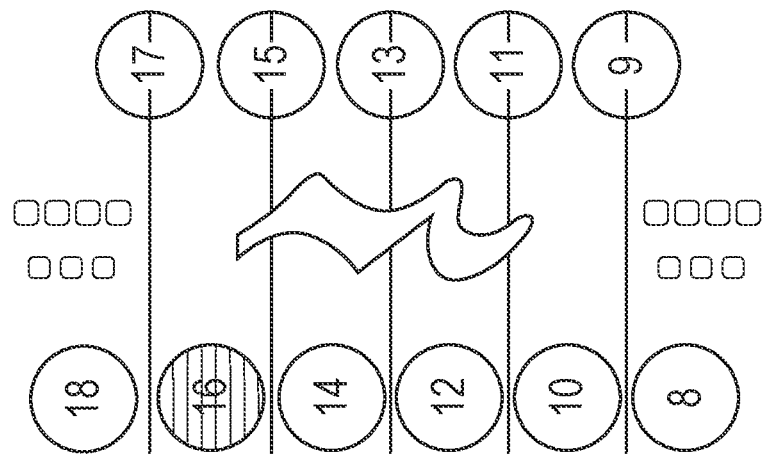
FIG. 40A illustrates exemplary values that can be assigned to note selection options in accordance with a data model for a music composition application according to certain embodiments.
Figure 41:
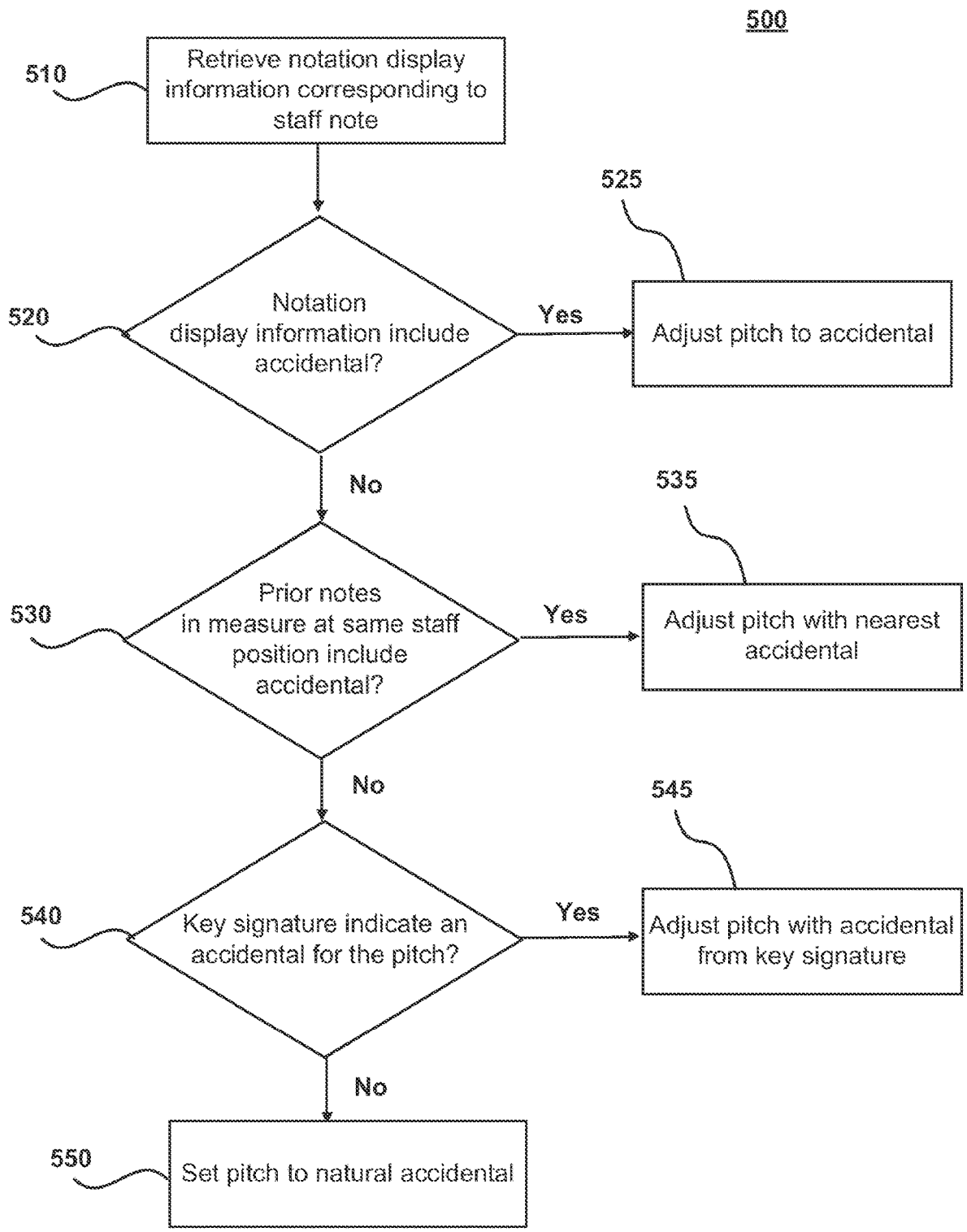
FIG. 41 is a flow diagram of an exemplary process for determining a pitch for a staff note in accordance with certain embodiments.

FIGS. 40A-C illustrate an exemplary mapping of musical key type integer values to the note selection options 321. In this example, the ledger extender options 360 options enable the input staff 322 to display a wider range of notes (e.g., an additional seven notes above and an additional seven notes below the original input staff 322). In other embodiments, the ledger extender options 360 options can enable the input staff 322 to display and provide access to greater or fewer ranges of note selection options 321 (and/or corresponding staff lines), and the mapping of the integer values can be adapted accordingly. As mentioned above, the ledger extender options 360 can be configured to provide access to any and all notes (and corresponding note selection options 321), and a user can scroll (e.g., using a scroll gesture) to desired notes.

Below is exemplary pseudocode demonstrating values associated with each of the note selection options 321 included on an input staff 322 for the treble clef.

case 1: keyType=.d; octave=3
case 2: keyType=.e; octave=3
case 3: keyType=.f; octave=3
case 4: keyType=.g; octave=3
case 5: keyType=.a; octave=3
case 6: keyType=.b; octave=3
case 7: keyType=.c; octave=4
case 8: keyType=.d; octave=4
case 9: keyType=.e; octave=4
case 10: keyType=.f; octave=4
case 11: keyType=.g; octave=4
case 12: keyType=.a; octave=4
case 13: keyType=.b; octave=4
case 14: keyType=.c; octave=5
case 15: keyType=.d; octave=5
case 16: keyType=.e; octave=5
case 17: keyType=.f; octave=5
case 18: keyType=.g; octave=5
case 19: keyType=.a; octave=5
case 20: keyType=.b; octave=5
case 21: keyType=.c; octave=6
case 22: keyType=.d; octave=6
case 23: keyType=.e; octave=6
case 24: keyType=.f; octave=6
case 25: keyType=.g; octave=6

Below is exemplary pseudocode demonstrating values associated with each of the note selection options 321 included on an input staff 322 for the bass clef.

case 1: keyType=.f; octave=1
case 2: keyType=.g; octave=1
case 3: keyType=.a; octave=1
case 4: keyType=.b; octave=1
case 5: keyType=.c; octave=2
case 6: keyType=.d; octave=2
case 7: keyType=.e; octave=2
case 8: keyType=.f; octave=2
case 9: keyType=.g; octave=2
case 10: keyType=.a; octave=2
case 11: keyType=.b; octave=2
case 12: keyType=.c; octave=3
case 13: keyType=.d; octave=3
case 14: keyType=.e; octave=3
case 15: keyType=.f; octave=3
case 16: keyType=.g; octave=3
case 17: keyType=.a; octave=3
case 18: keyType=.b; octave=3
case 19: keyType=.c; octave=4
case 20: keyType=.d; octave=4
case 21: keyType=.e; octave=4
case 22: keyType=.f; octave=4
case 23: keyType=.g; octave=4
case 24: keyType=.a; octave=4
case 25: keyType=.b; octave=4

Similar values can be associated with, or assigned to, note selection options 321 that are presented for other clef notations (e.g., alto clef, tenor clef, neutral clef, guitar cleft, etc.).

Returning to FIG. 39, when a user selects (e.g., using a tap gesture) a particular time point or staff note 301 in a measure 302 displayed on the output staff 311, any existing notes (e.g., individual notes or multiple notes included in a chord) at that time point can be arranged into an array of staff notes 301 and the corresponding note selection options 321 on the input staff 322 can be highlighted. The user can unselect the highlighted note selection options 321 (e.g., by performing a tap gesture) to remove one or more notes from that time point, and/or can add additional notes to the staff note 301 at that time point by selecting additional note selection options 321 on the input staff 322. As a user selects or unselects the note selection options 321 for the staff note at a particular time point, the array of staff notes for that time point is updated and stored in accordance with the data model 170.

A score renderer component 450 utilizes the information stored in the data model 170 and the data structures associated with the staff notations 125 to visually render the output staff 311. When changes are made to the staff notes 301 (e.g., when changes are made to the array comprising each of the notes at a particular time point), the score renderer component 450 is notified and updates the rendering of the output staff 311 with corresponding staff notes 301 and/or other notations 125.

In certain embodiments, the data model 170 communicates with, or includes, a pitch determination component 460 this is configured to determine an appropriate pitch 410 to be output for each of the staff note 301 at a particular time point. Each of the staff notes 301 that are defined in the keyboard operational mode can be associated with a particular pitch 410 based on the digital key(s) 351 that were selected to define the staff note 301. In the DIBO operational mode, the notation display data 420 is stored for each staff note 301 in accordance with the data model 170, but the notation display data 420 may be insufficient by itself to determine an appropriate pitch for the staff note 301.

The pitch determination component 460 can be configured to determine an appropriate pitch for each staff note 301. To determine the pitch for a staff note 301, the pitch determination component 460 can analyze information indicating whether accidentals were explicitly specified (e.g., via the input staff 322) for the staff note 301, the context of the staff note 301 in a particular measure or score, and a key signature 365 associated the staff note 301. In certain embodiments, the key signature 365 can be selected based on user inputs when a user initially creates a digital music composition 120 or portion thereof. The key signature 365 can indicate whether accidentals are to be associated with particular staff notes 301 throughout the entirety of the digital music composition 120 and/or a particular portion of the digital music composition 120. For each staff note 301, the pitch determination component 460 can analyze the key signature 365 and other information to accurately determine an appropriate pitch for the staff note 301. The determined pitch can then be stored in the pitch data 410.

FIG. 5 illustrates a flow chart for an exemplary method 500 that can be utilized to determine a pitch for a staff note 301 according to certain embodiments. Method 500 is merely exemplary and is not limited to the embodiments presented herein. Method 500 can be employed in many different embodiments or examples not specifically depicted or described herein. In some embodiments, the steps of method 500 can be performed in the order presented. In other embodiments, the steps of method 500 can be performed in any suitable order. In still other embodiments, one or more of the steps of method 500 can be combined or skipped. In many embodiments, system 100, computing device 110, server 130, music composition application 150, data model 170, mobile electronic device 210, and/or pitch determination component 460 can be suitable to perform method 500 and/or one or more of the steps of method 500. In these or other embodiments, one or more of the steps of method 500 can be implemented as one or more computer instructions configured to run on one or more processing devices and configured to be stored at one or more non-transitory memory storage devices. Such non-transitory memory storage devices can be part of a computer system, such as system 100, computing device 110, server 130, and/or mobile electronic device 210.

At block 510, notation display information 420 for a corresponding staff note 301 is retrieved. The staff note 301 may represent an individual note or multiple notes (e.g., a chord 303) at a particular time point in a measure 302 or music composition 120.

At block 520, a determination is made regarding whether or not the notation display information 420 specifies or includes an accidental for the staff note 301. For example, this may include determining whether a staff note 301 specified in the DIBO operational mode was explicitly defined with an accidental (e.g., using a tap and hold gesture). If an accidental was specified or included in the notation display information 420, then the method 500 proceeds to block 525 and the pitch of the staff note 301 is adjusted to use or incorporate the accidental that was explicitly specified. Otherwise, the method 500 proceeds to block 530.

At block 530, a determination is made regarding whether or not any previous staff notes 301 included in the same measure 302 at the same staff location (e.g., same key) includes an accidental. If an accidental was specified or included in one or more of the previous staff notes, then the method 500 proceeds to block 535 and the pitch of the staff note 301 is adjusted to use or incorporate the accidental. Otherwise, the method 500 proceeds to block 540.

At block 540, a determination is made regarding whether or not a key signature 465 associated with the staff note 301 includes an accidental. For example, this may involve determining whether a key signature 465 was specified for the digital music composition 120, and whether that key signature 465 indicates an accidental should be applied to the staff note 301. If the key signature 465 indicates an accidental is to be applied to the staff note 301, then the method proceeds to block 545 and the pitch of the staff note is adjusted to use or incorporate the accidental. Otherwise, the method 500 proceeds to block 550.

At block 550, a natural accidental (♮) is selected or used for the pitch of the staff note 301.

As mentioned above, the music composition applications 150 can be configured in an audio mode 198 to output or playback digital music compositions 120 (or portions thereof) created using the music composition applications 150. To enable playback of the digital music compositions 120, the music composition applications 150 can convert the staff notes 301 to digital audio signals 194 that can be output by the audio devices 115. In many cases, the digital music applications 150 can utilize method 500 to determine an appropriate pitch and/or frequency for each of the staff notes 301 that are converted to audio signals 194.

As evidenced by the disclosure herein, the inventive techniques set forth in this disclosure are rooted in computer technologies that overcome existing problems in known music composition applications, including problems dealing with implementing music composition applications on mobile electronic devices. The technologies described in this disclosure provide a technical solution for overcoming the aforementioned limitations (as well as other limitations) associated with known techniques and systems. In many cases, the technologies provide improved gesture input mechanisms (e.g., including the multi-gesture functionality described above) and specially configured interfaces that allow for rapid entry of music notations on mobile electronic devices. Additionally, the technologies encompass improved data storage models that enable notation data to be accessed in multiple operational modes, and which allow for accurate determination of output pitches corresponding to staff notes and other notations. This technology-based solution marks an improvement over existing systems for these and other reasons.

As described above, the music composition applications can present specially configured interfaces that present notation selection options directly on a music staff or stave. The music composition applications also can be configured with improved gesture-based functionalities that facilitate rapid entry and customization of digital music composition via touch screen input devices. The music composition applications are capable of operating in multiple operational modes to permit digital music notations to be defined using various input techniques. The improved data model can be used to store the music notations in a manner that enables the music notations to be accessed across the multiple operational modes In certain embodiments, a method is disclosed. The method can be implemented via execution of computing instructions configured to run at one or more processors and configured to be stored at non-transitory computer-readable media, the method comprising: generate, on a mobile electronic device comprising a touch screen display, an interface configured to enable creation and editing of a digital music composition, wherein a portion of the interface includes an input staff interface that directly integrates note selection options onto lines and spaces of a musical staff or stave; detecting gestures on the touch screen display that indicate selections corresponding to the note selection options; and appending staff notes to an output staff interface based, at least in part, on the selections received via the touch screen display.

In certain embodiments, a method is disclosed. The method can be implemented via execution of computing instructions configured to run at one or more processors and configured to be stored at non-transitory computer-readable media, the method comprising: generate, on a computing device, an interface configured to enable creation and editing of a digital music composition, wherein a portion of the interface includes an input staff interface that directly integrates note selection options onto lines and spaces of a musical staff or stave; receiving, via an input device associated with the computing device, inputs corresponding to the note selection options; and appending staff notes to an output staff interface based, at least in part, on the selections received via the touch screen display.

In certain embodiments, a system is disclosed. The system can include: an application means configured to generate an interface that enables creation and editing of a digital music composition, wherein the interface comprises an output staff interface and an input staff interface that directly integrates note selection options onto lines and spaces of a musical staff or stave; and a computing device means configured to execute the application means, detect gestures on inputs corresponding to the note selection options, and render staff notes on the output staff interface based, at least in part, on the gestures on inputs.

In certain embodiments, a system is disclosed. The system can include: a mobile electronic device means configured to generate an interface that enables creation and editing of a digital music composition, wherein the interface comprises an output staff interface and an input staff interface that directly integrates note selection options onto lines and spaces of a musical staff or stave; and a touchscreen display means being integrated with the mobile electronic device means and being configured to detect gestures corresponding to the note selection options and render staff notes on the output staff interface based, at least in part, on the gestures received via the touch screen display.

In certain embodiments, a system is disclosed. The system can include:: a computing device means configured to generate an interface that enables creation and editing of a digital music composition, wherein the interface comprises an output staff interface and an input staff interface that directly integrates note selection options onto lines and spaces of a musical staff or stave; an input means being integrated with the computing device means and being configured to detect inputs corresponding to the note selection options; and a display means being integrated with the computing device means and being configured to display the input staff interface and the output staff interface, wherein the display means renders staff notes on the output staff interface based, at least in part, on the inputs corresponding to the note selection options.

In certain embodiments, a system is disclosed. The system can include one or more computing devices comprising one or more processors and one or more non-transitory storage devices for storing instructions, wherein execution of the instructions by the one or more processors causes the one or more computing devices to: generate, on a mobile electronic device, an interface configured to enable creation and editing of a digital music composition, wherein: the interface includes an input staff comprising first staff lines, first spaces located between the first staff lines, and note selection options that are incorporated into each of the first staff lines and each of the first spaces; the interface includes an output staff that is configured to display notations associated with the digital music composition, the output staff comprising second staff lines and second spaces located between the second staff lines; and the first staff lines and the first spaces included on the input staff correspond the second staff lines and second spaces included on the output staff; receive, via a touch screen device included on the mobile electronic device, a gesture in a location corresponding to one of the note selection options; and in response to detecting the gesture, update the digital music composition by appending a corresponding notation to the output staff.

In certain embodiments, a system is disclosed. The system can include: one or more computing devices comprising one or more processors and one or more non-transitory storage devices for storing instructions, wherein execution of the instructions by the one or more processors causes the one or more computing devices to: generate, on a computing device, an interface configured to enable creation and editing of a digital music composition, wherein: the interface includes an input staff comprising first staff lines, first spaces located between the first staff lines, and note selection options that are incorporated into each of the first staff lines and each of the first spaces; the interface includes an output staff that is configured to display notations associated with the digital music composition, the output staff comprising second staff lines and second spaces located between the second staff lines; and the first staff lines and the first spaces of the included on the input staff correspond to the second staff lines and second spaces included on the output staff; receive, via an input device associated with the computing device, an input in a location corresponding to one of the note selection options; and in response to detecting the input, update the digital music composition by appending a corresponding notation to the output staff.

In certain embodiments, a system is disclosed. The system can include: a computing device means configured to generate an interface that enables creation and editing of a digital music composition, wherein: the interface includes an input staff means comprising first staff lines, first spaces located between the first staff lines, and note selection options that are incorporated into each of the first staff lines and each of the first spaces; the interface includes an output staff means that is configured to display notations associated with the digital music composition, the output staff means comprising second staff lines and second spaces located between the second staff lines; and the first staff lines and the first spaces of the included on the input staff means correspond to the second staff lines and second spaces included on the output staff means; receive, via an input means associated with the computing device means, an input in a location corresponding to one of the note selection options;

and in response to detecting the input, update the digital music composition by appending a corresponding notation to the output staff means.

In certain embodiments, a method is disclosed. The method can be implemented via execution of computing instructions configured to run at one or more processors and configured to be stored at non-transitory computer-readable media, the method comprising: providing a music composition application that is configured to create and edit a digital music composition in both a first operational mode and a second operational mode, the first operational mode and the second operational mode both enabling entry of notations for the digital music composition; and store the notations for the digital music composition in accordance with a data model that enables the notations to be accessed in both the first operational mode and the second operational mode.

In certain embodiments, a system is disclosed. The system can include: an application means that enables creation and editing of a digital music composition in both a first operational mode and a second operational mode, the first operational mode and the second operational mode both enabling entry of notations for the digital music composition; a data model means that facilitates storage of the notations for the digital music composition and enables the notations to be accessed in both the first operational mode and the second operational mode; and a computing device means configured to execute the application means and store the notations for the digital music composition in accordance with the data model means.

In certain embodiments, a method is disclosed. The method can be implemented via execution of computing instructions configured to run at one or more processors and configured to be stored at non-transitory computer-readable media, the method comprising: generate, on a mobile electronic device comprising a touch screen display, an input staff interface wherein: the input staff interface directly incorporates note selection options onto lines and spaces of a musical staff or stave; and one or more ledger line extender options are presented on the input staff interface; detect, via the touch screen display, a gesture performed on the one or more ledger line extender options; and in response to detecting the gesture, expand the musical staff or stave included in the input staff interface.

In certain embodiments, a method is disclosed. The method can be implemented via execution of computing instructions configured to run at one or more processors and configured to be stored at non-transitory computer-readable media, the method comprising: generate, on a computing device, a input staff interface wherein: the input staff interface directly incorporates note selection options onto lines and spaces of a musical staff or stave; and one or more ledger line extender options are presented on the input staff interface; receive, via an input device associated with the computing device, an input on the one or more ledger line extender options; and in response to receiving the input, expand the musical staff or stave included in the input staff interface.

In certain embodiments, a system is disclosed. The system can include: a computing device means configured to generate an input staff means wherein: the input staff means directly incorporates note selection options onto lines and spaces of a musical staff or stave; and one or more ledger line extender options are presented on the input staff means; an input means associated with the computing means, the input means being configured to detected a gesture or input corresponding to the one or more ledger line extender options; and in response to detecting the gesture or input, expand the musical staff or stave included in the input staff means.

In certain embodiments, a system is disclosed. The system can include a mobile electronic device comprising a touch screen display that includes a capacitive sensing medium, one or more processing devices, and one or more non-transitory storage devices for storing instructions, wherein execution of the instructions by the one or more processing devices causes the mobile electronic device to: (i) generate, on the touch screen display of the mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond the second staff lines and second spaces included on the output staff interface; (ii) detect, via the capacitive sensing medium of the touch screen device, gestures executed on the note selection options included on the input staff interface; (iii) in response to detecting the gestures on the note selection options, update the output staff interface with corresponding notations, wherein gestures executed on the first staff lines and the first spaces of the input staff interface cause the notations to be added to the corresponding second staff lines and second spaces included on the output staff interface; (iv) determine pitches or frequencies associated with the notations included on the output staff interface; and (iv) convert the notations to digital audio signals based, at least in part, on the pitches or frequencies associated with the notations, the digital audio signals being configured to be output on one or more audio devices.

In certain embodiments, a method is disclosed. The method can be implemented via execution of computing instructions configured to run at one or more processing devices and configured to be stored on non-transitory computer-readable media, and the method can comprise: (i) generating, on a touch screen display of a mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond the second staff lines and second spaces included on the output staff interface; (ii) detecting, via a capacitive sensing medium of the touch screen device, gestures executed on the note selection options included on the input staff interface; (iii) in response to detecting the gestures on the note selection options, updating the output staff interface with corresponding notations, wherein gestures executed on the first staff lines and the first spaces of the input staff interface cause the notations to be added to the corresponding second staff lines and second spaces included on the output staff interface; (iv) determining pitches or frequencies associated with the notations included on the output staff interface; and (v) converting the notations to digital audio signals based, at least in part, on the pitches or frequencies associated with the notations, the digital audio signals being configured to be output on one or more audio devices.

In certain embodiments, a computer program product is disclosed. The computer program product can include a non-transitory computer-readable medium including instructions for causing a mobile electronic device to: (i) generate, on the touch screen display of the mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond the second staff lines and second spaces included on the output staff interface; (ii) detect, via the capacitive sensing medium of the touch screen device, gestures executed on the note selection options included on the input staff interface; (iii) in response to detecting the gestures on the note selection options, update the output staff interface with corresponding notations, wherein gestures executed on the first staff lines and the first spaces of the input staff interface cause the notations to be added to the corresponding second staff lines and second spaces included on the output staff interface; (iv) determine pitches or frequencies associated with the notations included on the output staff interface; and (iv) convert the notations to digital audio signals based, at least in part, on the pitches or frequencies associated with the notations, the digital audio signals being configured to be output on one or more audio devices.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system comprising:
a mobile electronic device comprising a touch screen display that includes a capacitive sensing medium, one or more processing devices, and one or more non-transitory storage devices for storing instructions, wherein execution of the instructions by the one or more processing devices causes the mobile electronic device to:
generate, on the touch screen display of the mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond to the second staff lines and second spaces included on the output staff interface;
detect, via the capacitive sensing medium of the touch screen device, gestures executed on the note selection options included on the input staff interface;
in response to detecting the gestures on the note selection options, update the output staff interface with corresponding notations, wherein gestures executed on the first staff lines and the first spaces of the input staff interface cause the notations to be added to the corresponding second staff lines and second spaces included on the output staff interface;

determine pitches or frequencies associated with the notations included on the output staff interface; and convert the notations to audio signals based, at least in part, on the pitches or frequencies associated with the notations, the audio signals being configured to be output on one or more audio devices;

wherein:
one or more ledger line extender options are integrated into the input staff interface included on the DIBO interface;
in response to detecting a gesture being executed on the one or more ledger line extender options, the input staff interface is expanded to display additional staff lines and additional staff spaces;
the note selection options are integrated into each of the additional staff lines and the additional staff spaces;
the additional staff lines and the additional staff spaces are presented in a fixed size space of the touch screen display;
the input staff interface is configured with an accordion-type functionality that causes the first lines, the first spaces, and the note selection options included a first portion input staff interface to contract or condense, while simultaneously causing the additional lines, the additional spaces, and the note selection options on a second portion of the input staff interface to expand; and
the accordion-type functionality compacts the presentation of the input staff interface in the fixed size space of the touch screen display.

2. The system of claim 1, wherein:
the output staff interface displays a measure associated with the digital music composition;
the output staff interface is configured with multi-gesture functionality;
execution of a first gesture type on the output staff interface enables viewing of additional measures associated with the digital music composition; and
execution of a second gesture type on the output staff interface associated with the digital music composition activates a multi-measure view mode.

3. The system of claim 1, wherein:
each of the note selection options are configured with multi-gesture functionality;
execution of a first gesture type on a note selection option causes a notation to be appended to the output staff interface; and
execution of a second gesture type on the note selection option permits the notation to be copied.

4. The system of claim 1, wherein:
the notations are stored in accordance with a data model;
the notations include staff note notations;
the data model separately stores pitch data and notation display data for each of the staff note notations;
the notation display data determines how the staff note notations are visually displayed or rendered on the output staff interface; and
the pitch data is used to determine the pitches or frequencies associated with the staff note notations.

5. The system of claim 4, wherein:
a pitch determination component is configured to analyze the pitch data and determine the pitches or frequencies associated with the staff note notations;

the pitch determination component determines the pitches or frequencies for the staff note notations, at least in part, by:
determining whether accidentals were explicitly specified for the staff note notations;
analyzing a context of the staff note notations within a particular measure or score; and
analyzing a key signature associated the staff note notations; and
the audio signals are generated, at least in part, using the pitches or frequencies determined by the pitch determination component.

6. The system of claim 1, wherein the digital music composition can be created or edited in multiple operational modes including:
a DIBO operational mode that enables the notations of the digital music composition to be created or edited using the DIBO interface;
a multi-measure view mode that enables measures of the digital music composition to be created or edited; and
a keyboard operational mode that enables the notations of the digital music composition to be created or edited using a digital keyboard.

7. The system of claim 6, wherein:
in the multi-measure view mode, a first gesture can be executed to scroll through the measures included in the digital music composition;
in the multi-measure view mode, a second gesture can be executed to select a measure included in the digital music composition; and
in the multi-measure view mode, one or more additional gestures can be executed to copy a selected measure, duplicate the selected measure, and delete a selected measure.

8. The system of claim 6, wherein:
the notations associated with the digital music composition are stored in accordance with a data model that enables the notations to be accessed across the multiple operational modes, including the DIBO operational mode, the multi-measure view mode, and the keyboard operational mode.

9. A method implemented via execution of computing instructions configured to run at one or more processing devices and configured to be stored on non-transitory computer-readable media, the method comprising:
generating, on a touch screen display of a mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond to the second staff lines and second spaces included on the output staff interface;
detecting, via a capacitive sensing medium of the touch screen device, gestures executed on the note selection options included on the input staff interface;
in response to detecting the gestures on the note selection options, updating the output staff interface with corresponding notations, wherein gestures executed on the first staff lines and the first spaces of the input staff interface cause the notations to be added to the corresponding second staff lines and second spaces included on the output staff interface;

determining pitches or frequencies associated with the notations included on the output staff interface; and converting the notations to audio signals based, at least in part, on the pitches or frequencies associated with the notations, the audio signals being configured to be output on one or more audio devices; wherein:

one or more ledger line extender options are integrated into the input staff interface included on the DIBO interface;

in response to detecting a gesture being executed on the one or more ledger line extender options, the input staff interface is expanded to display additional staff lines and additional staff spaces;

the note selection options are integrated into each of the additional staff lines and the additional staff spaces;

the additional staff lines and the additional staff spaces are presented in a fixed size space of the touch screen display;

the input staff interface is configured with an accordion-type functionality that causes the first lines, the first spaces, and the note selection options included a first portion input staff interface to contract or condense, while simultaneously causing the additional lines, the additional spaces, and the note selection options on a second portion of the input staff interface to expand; and the accordion-type functionality compacts the presentation of the input staff interface in the fixed size space of the touch screen display.

10. The method of claim 9, wherein:

the output staff interface displays a measure associated with the digital music composition;

the output staff interface is configured with multi-gesture functionality;

execution of a first gesture type on the output staff interface enables viewing of additional measures associated with the digital music composition; and execution of a second gesture type on the output staff interface associated with the digital music composition activates a multi-measure view mode.

11. The method of claim 9, wherein:

each of the note selection options are configured with multi-gesture functionality;

execution of a first gesture type on a note selection option causes a notation to be appended to the output staff interface; and execution of a second gesture type on the note selection option permits the notation to be copied.

12. The method of claim 9, wherein:

the notations are stored in accordance with a data model;

the notations include staff note notations;

the data model separately stores pitch data and notation display data for each of the staff note notations;

the notation display data determines how the staff note notations are visually displayed or rendered on the output staff interface; and the pitch data is used to determine the pitches or frequencies associated with the staff note notations.

13. The method of claim 12, wherein:

a pitch determination component is configured to analyze the pitch data and determine the pitches or frequencies associated with the staff note notations;

the pitch determination component determines the pitches or frequencies for the staff note notations, at least in part, by:

determining whether accidentals were explicitly specified for the staff note notations;

analyzing a context of the staff note notations within a particular measure or score; and analyzing a key signature associated the staff note notations; and the audio signals are generated, at least in part, using the pitches or frequencies determined by the pitch determination component.

14. The method of claim 9, wherein the digital music composition can be created or edited in multiple operational modes including:

a DIBO operational mode that enables the notations of the digital music composition to be created or edited using the DIBO interface;

a multi-measure view mode that enables measures of the digital music composition to be created or edited;

a keyboard operational mode that enables the notations of the digital music composition to be created or edited using a digital keyboard; and the notations associated with the digital music composition are stored in accordance with a data model that enables the notations to be accessed across the multiple operational modes, including the DIBO operational mode, the multi-measure view mode, and the keyboard operational mode.

15. The method of claim 14, wherein:

in the multi-measure view mode, a first gesture can be executed to scroll through the measures included in the digital music composition;

in the multi-measure view mode, a second gesture can be executed to select a measure included in the digital music composition; and in the multi-measure view mode, one or more additional gestures can be executed to copy a selected measure, duplicate the selected measure, and delete a selected measure.

16. A computer program product, the computer program product comprising a non-transitory computer-readable medium including instructions for causing a mobile electronic device to:

generate, on a touch screen display of the mobile electronic device, a direct input board (DIBO) interface that is configured to enable creation and editing of a digital music composition, wherein: (a) the DIBO interface includes an input staff interface comprising first staff lines, first spaces located between the first staff lines, and note selection options that are incorporated into each of the first staff lines and each of the first spaces; (b) the DIBO interface includes an output staff interface that is configured to display notations associated with the digital music composition, the output staff interface comprising second staff lines and second spaces located between the second staff lines; and (c) the first staff lines and the first spaces included on the input staff interface correspond to the second staff lines and second spaces included on the output staff interface;

detect, via a capacitive sensing medium of the touch screen device, gestures executed on the note selection options included on the input staff interface;

in response to detecting the gestures on the note selection options, update the output staff interface with corresponding notations, wherein gestures executed on the first staff lines and the first spaces of the input staff interface cause the notations to be added to the corresponding second staff lines and second spaces included on the output staff interface;

determine pitches or frequencies associated with the notations included on the output staff interface; and convert the notations to audio signals based, at least in part, on the pitches or frequencies associated with the notations, the audio signals being configured to be output on one or more audio devices; wherein:

one or more ledger line extender options are integrated into the input staff interface included on the DIBO interface;

in response to detecting a gesture being executed on the one or more ledger line extender options, the input staff interface is expanded to display additional staff lines and additional staff spaces;

the note selection options are integrated into each of the additional staff lines and the additional staff spaces;

the additional staff lines and the additional staff spaces are presented in a fixed size space of the touch screen display;

the input staff interface is configured with an accordion-type functionality that causes the first lines, the first spaces, and the note selection options included a first portion input staff interface to contract or condense, while simultaneously causing the additional lines, the additional spaces, and the note selection options on a second portion of the input staff interface to expand; and the accordion-type functionality compacts the presentation of the input staff interface in the fixed size space of the touch screen display.

\* \* \* \* \*